US012697780B2

(12) United States Patent
Feinberg et al.

(10) Patent No.: US 12,697,780 B2
(45) Date of Patent: Aug. 4, 2026

(54) TRANSPARENT SUPPORT BATH FOR EMBEDDED 3D PRINTING AND SYSTEM FOR IN PROCESS MONITORING

(71) Applicant: CARNEGIE MELLON UNIVERSITY, Pittsburgh, PA (US)

(72) Inventors: Adam W. Feinberg, Pittsburgh, PA (US); Daniel J. Shiwarski, Pittsburgh, PA (US); Joshua Tashman, Pittsburgh, PA (US); Frederick Lanni, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 546 days.

(21) Appl. No.: 18/246,225

(22) PCT Filed: Sep. 24, 2021

(86) PCT No.: PCT/US2021/051856
§ 371 (c)(1),
(2) Date: Mar. 22, 2023

(87) PCT Pub. No.: WO2022/066980
PCT Pub. Date: Mar. 31, 2022

(65) Prior Publication Data
US 2023/0356472 A1 Nov. 9, 2023

Related U.S. Application Data

(60) Provisional application No. 63/082,621, filed on Sep. 24, 2020.

(51) Int. Cl.
*B29C 64/393* (2017.01)
*B29C 64/40* (2017.01)
(Continued)

(52) U.S. Cl.
CPC ............ *B29C 64/393* (2017.08); *B29C 64/40* (2017.08); *B29K 2101/10* (2013.01);
(Continued)

(58) Field of Classification Search
CPC .................................................. B29C 64/393
See application file for complete search history.

(56) References Cited

U.S. PATENT DOCUMENTS 10,150,258 B2 12/2018 Feinberg et al.
11,320,323 B2 * 5/2022 McAlpine .............. B33Y 50/02
(Continued)

FOREIGN PATENT DOCUMENTS

CN 207386561 U * 5/2018
JP 2020-138535 A 9/2020
WO WO-2019199971 A1 * 10/2019 ............. B33Y 70/00

OTHER PUBLICATIONS

International Search Report and Written Opinion of the International Searching Authority for International Application No. PCT/US2021/051856 mailed Mar. 25, 2022.

*Primary Examiner* — Suresh Suryawanshi
(74) *Attorney, Agent, or Firm* — K&L Gates LLP

(57) ABSTRACT

An additive manufacturing method, an additive manufacturing system (1200), a support material for additive manufacturing, an assembly of the support material and a structure material, and a product thereof are provided. The method comprises depositing, by a nozzle (1210*a*), a structure material into a support material based on a computer model of an object, thereby forming a portion of the object. Image data of at least the portion of the object can be obtained in-process by a detector (1240). The image data is compared to the computer model. Based on the comparison, the method can comprise modifying the computer model, modifying a print parameter, modifying machine path instructions for an additive manufacturing machine that
(Continued)

1302 — Receive a computer model
1304 — Create machine path instructions and store in memory
1306 — Deposit a layer of support material onto the material deposition region
1308 — Deposit structure material into the support material
1310 — Obtain image data
1312 — Compare image data to the computer model
1314 — Modify the computer model, modify a print parameter, modify machine path instructions, abort the additive formation, indicate a discrepancy, indicate validation, and/or continue the print
1320
1316 — Cure structure material
1318 — At least partially remove support material from the object comprises the nozzle, aborting the additive formation, indicating a discrepancy, indicating validation of the shape, or a combination thereof. The depositing of the structure material is repeated by the nozzle (1210a) as necessary to additively form the object.

47 Claims, 30 Drawing Sheets

(51) Int. Cl.

| | |
|---|---|
| B29K 101/10 | (2006.01) |
| B29K 101/12 | (2006.01) |
| B33Y 10/00 | (2015.01) |
| B33Y 30/00 | (2015.01) |
| B33Y 50/02 | (2015.01) |
| B33Y 70/00 | (2020.01) |

(52) U.S. Cl.
CPC ........... *B29K 2101/12* (2013.01); *B33Y 10/00* (2014.12); *B33Y 30/00* (2014.12); *B33Y 50/02* (2014.12); *B33Y 70/00* (2014.12)

(56) References Cited

U.S. PATENT DOCUMENTS

| | | | | |
|---|---|---|---|---|
| 11,619,779 | B1 * | 4/2023 | Guillou | G02B 6/08 |
| | | | | 385/116 |
| 2014/0271964 | A1 * | 9/2014 | Roberts, IV | B29C 64/393 |
| | | | | 425/150 |
| 2015/0348320 | A1 * | 12/2015 | Pesach | A61C 9/006 |
| | | | | 382/128 |
| 2016/0167312 | A1 * | 6/2016 | Feinberg | A61L 27/54 |
| | | | | 264/239 |
| 2017/0066193 | A1 * | 3/2017 | Kim | B29C 64/241 |
| 2018/0304370 | A1 | 10/2018 | Myerberg et al. | |
| 2019/0072439 | A1 | 3/2019 | McAlpine et al. | |
| 2019/0329322 | A1 * | 10/2019 | Preston | H04N 1/00037 |
| 2020/0047399 | A1 | 2/2020 | Guvendiren et al. | |
| 2020/0230939 | A1 | 7/2020 | Hull | |
| 2021/0031455 | A1 * | 2/2021 | Feinberg | A61L 27/52 |
| 2021/0370610 | A1 * | 12/2021 | Elgali | H04N 1/60 |

\* cited by examiner

A

B

C

D    G-code

E    Micrograph

F   OCT in Support

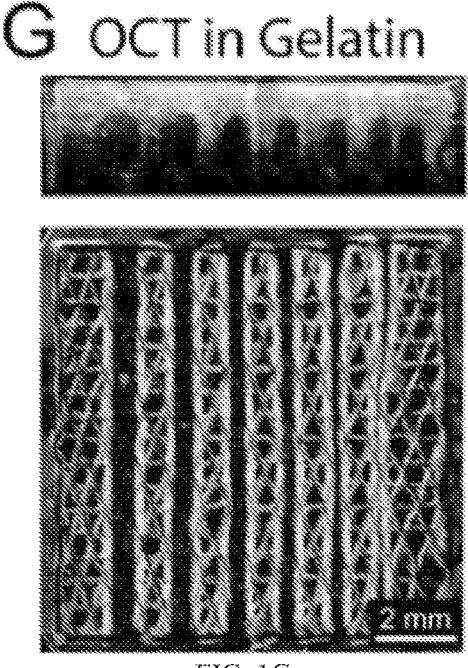
FIG. 1G
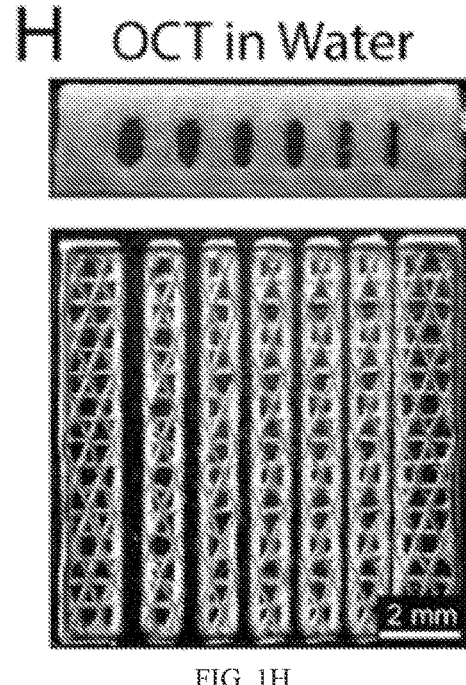
FIG. 1H
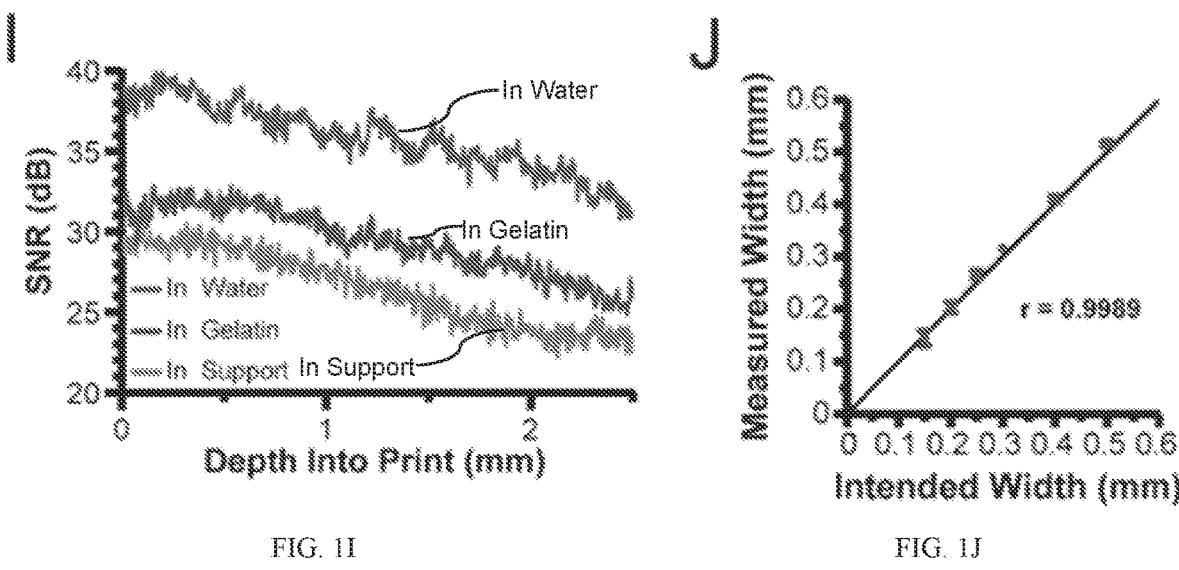
FIG. 1I
FIG. 1J

B

C

D

E    G-code for Printing FRESH Support

F    Printing Support    Printing Collagen    Imaging with OCT

G

H

I

J

K

L

C

D

E

F

D  OCT Reveals Channel Occlusion Defect in Print

E  3D Image From Composite

Bottom Surface

F  3D Gauging of Printed Construct

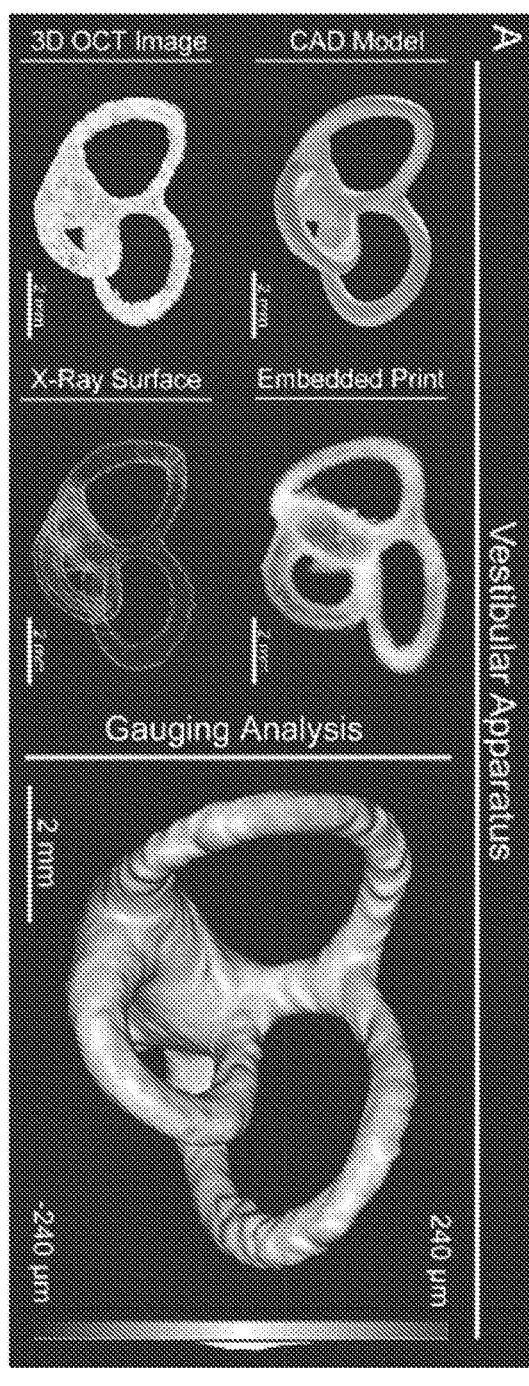
FIG. 5A
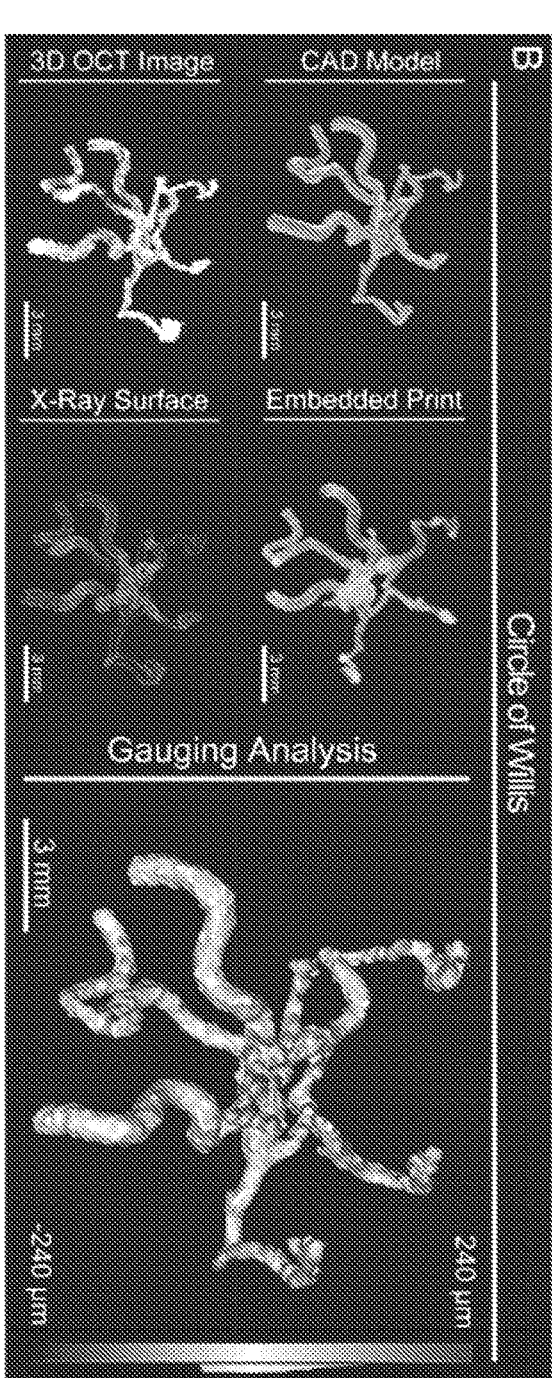
FIG. 5B

B

| Iodixanol Concentration (%) | Refractive Index (n) |
|---|---|
| 0.0 | 1.3328 |
| 5.0 | 1.3411 |
| 10.0 | 1.3466 |
| 15.0 | 1.3547 |
| 20.0 | 1.3652 |
| 25.0 | 1.3729 |
| 30.0 | 1.3807 |
| 35.0 | 1.3885 |
| 40.0 | 1.3961 |
| 45.0 | 1.4050 |
| 47.5 | 1.4083 |
| 50.0 | 1.4130 |
| 55.0 | 1.4205 |
| 60.0 | 1.4288 |

$$Y = 0.001611 * X + 1.332$$
$$R^2 = 0.9993$$

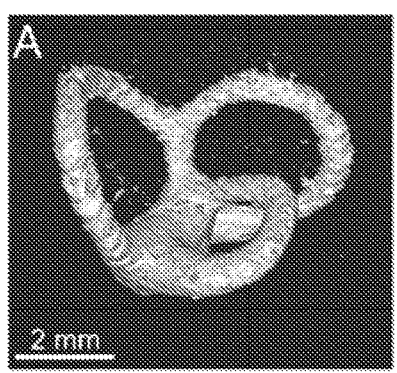
FIG. 10A
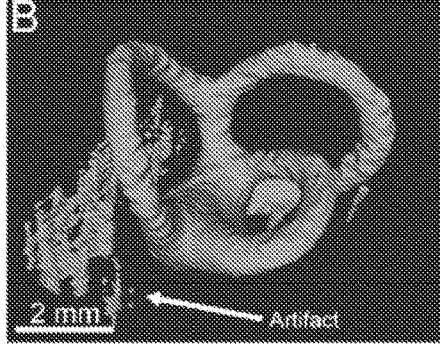
FIG. 10B
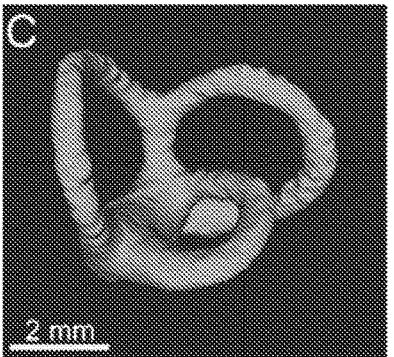
FIG. 10C
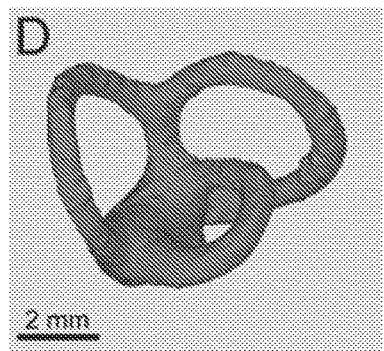
FIG. 10D
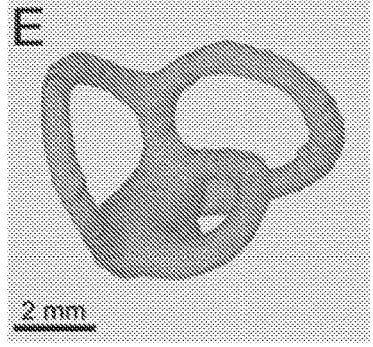
FIG. 10E
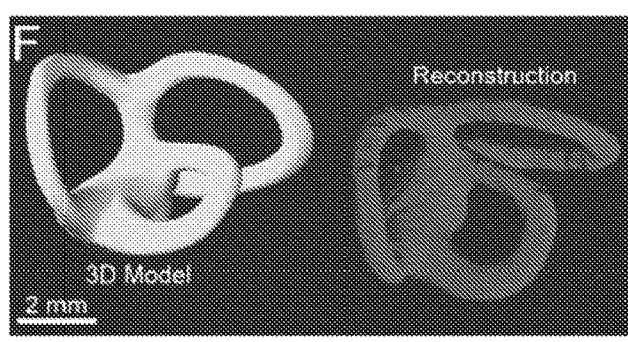
FIG. 10F
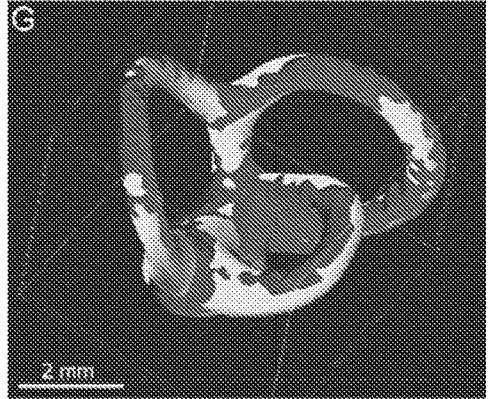
FIG. 10G
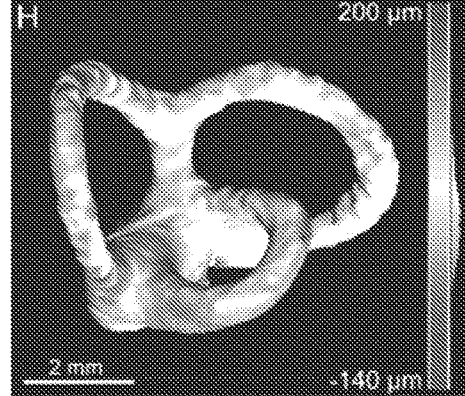
FIG. 10H

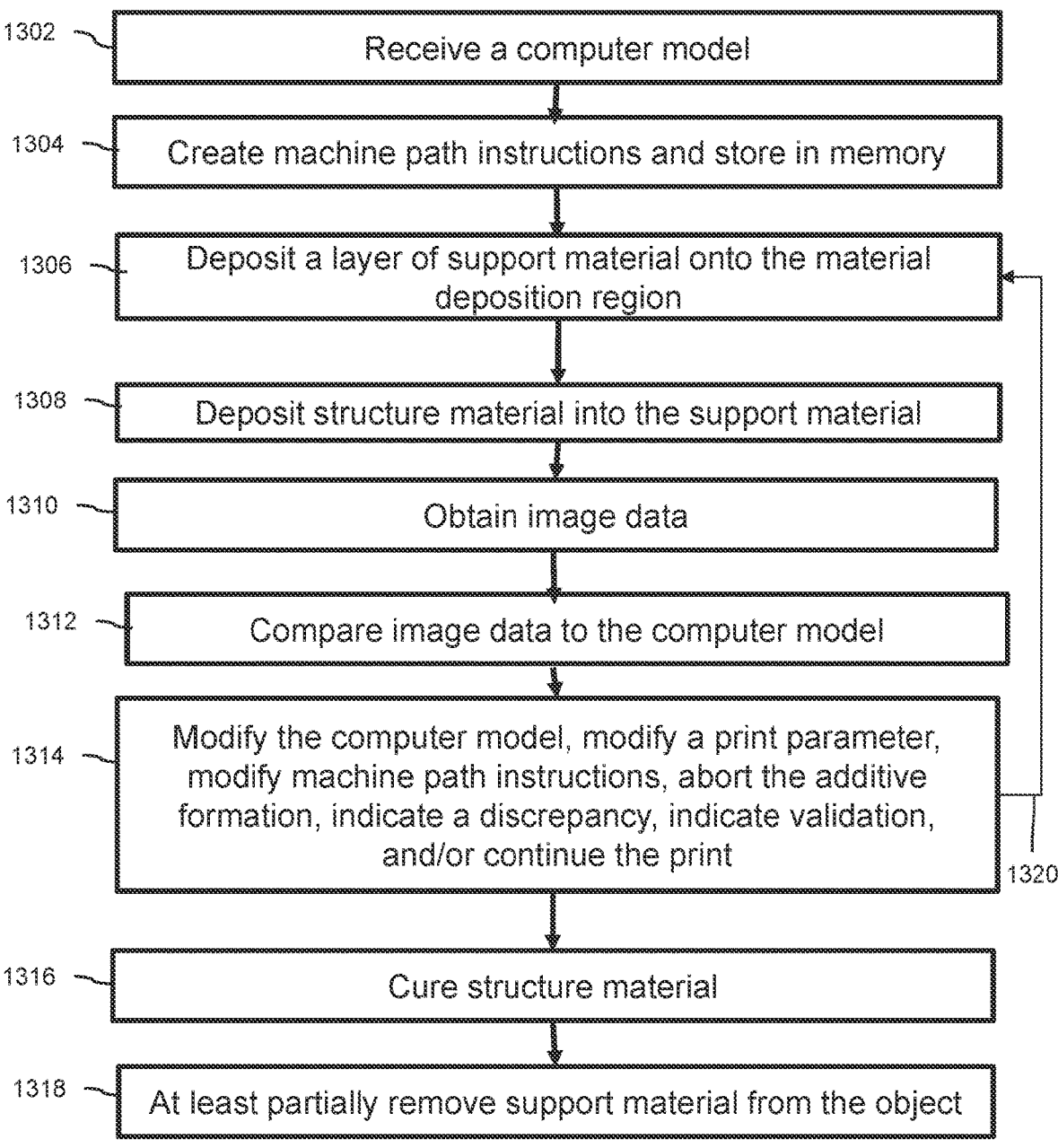

1302 — Receive a computer model

1304 — Create machine path instructions and store in memory

1306 — Deposit a layer of support material onto the material deposition region

1308 — Deposit structure material into the support material

1310 — Obtain image data

1312 — Compare image data to the computer model

1314 — Modify the computer model, modify a print parameter, modify machine path instructions, abort the additive formation, indicate a discrepancy, indicate validation, and/or continue the print

1320

1316 — Cure structure material

1318 — At least partially remove support material from the object

FIG. 13

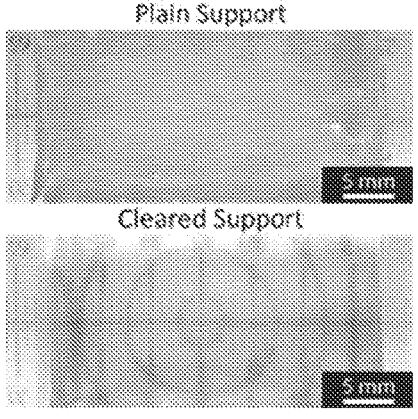
FIG. 15A
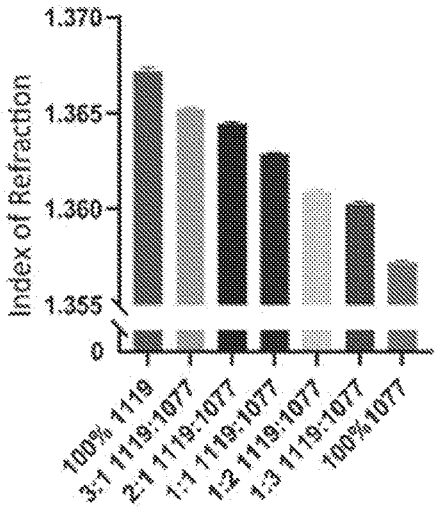
FIG. 15B
FIG. 15C
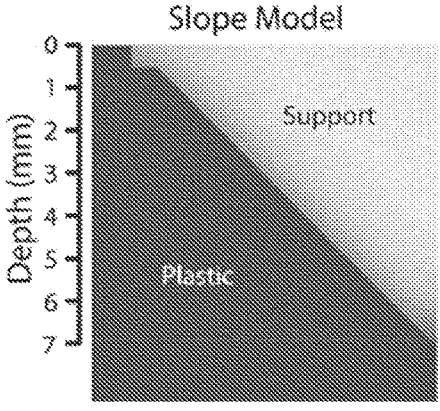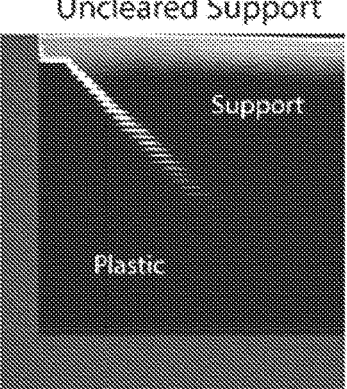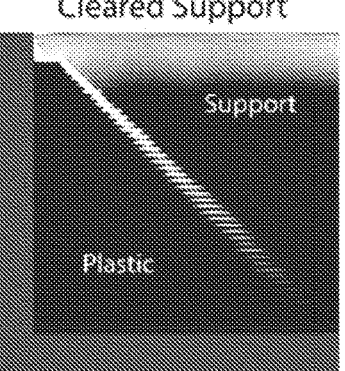
FIG. 15D

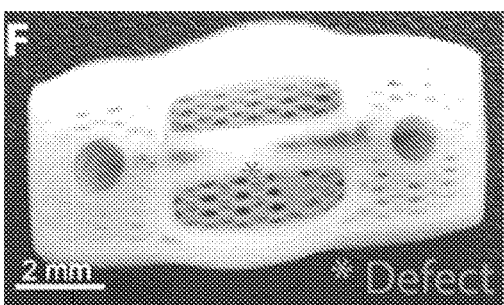
FIG. 16F
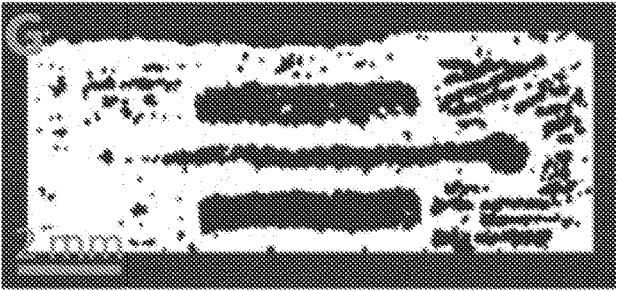
FIG. 16G
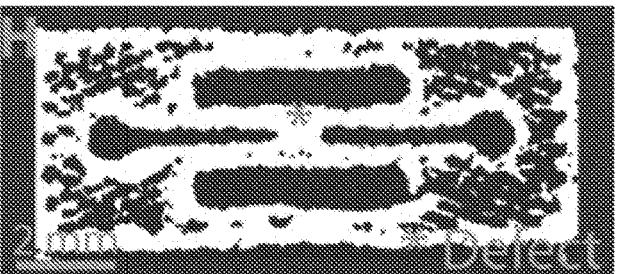
FIG. 16H
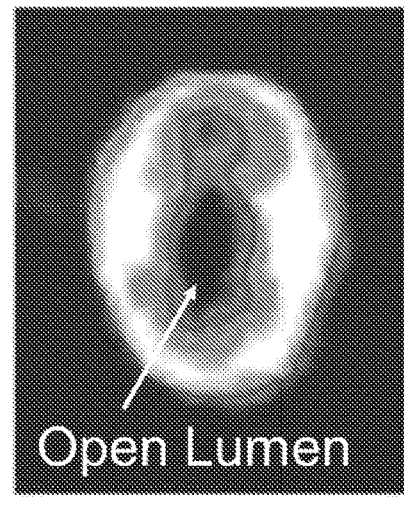
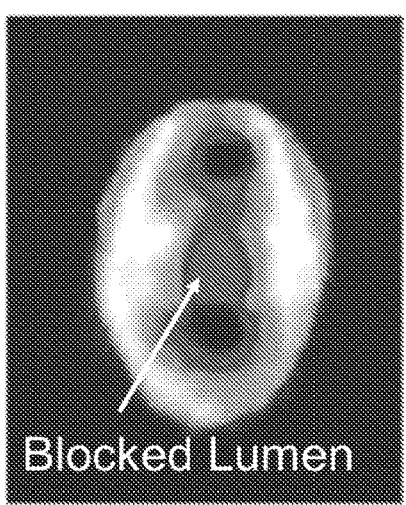
FIG. 17A　　　　　　　　　　　　FIG. 17B

TRANSPARENT SUPPORT BATH FOR EMBEDDED 3D PRINTING AND SYSTEM FOR IN PROCESS MONITORING

RELATED APPLICATIONS

The present application is a national stage application of International Patent Application No. PCT/US2021/051856, filed Sep. 24, 2021, which claims priority to U.S. provisional patent application Ser. No. 63/082,621, filed Sep. 24, 2020. The contents of each such application are hereby incorporated by references herein in their entireties.

GOVERNMENT SUPPORT

This invention was made with government support under Government Contract No. R21HD090679 awarded by the National Institutes of Health and Government Contract No. R01FD006582 awarded by the Food and Drug Administration. The government has certain rights in the invention.

BACKGROUND

Over the past 5 years, 3-dimensional (3D) bio-printing has emerged as a viable platform for engineering tissues, with exciting applications as platforms for drug discovery and disease modeling as well as new therapies for tissue regeneration. However, translation of these technologies from the laboratory into industry and the clinic has been limited, in large part due to the poor reproducibility of the 3D bio-printing process itself. A related challenge in 3D bio-printing is ensuring quality control and process reliability of visualized printed objects.

SUMMARY

In one general aspect, the present disclosure is related to an additive manufacturing method. The method comprises depositing, by a nozzle, a structure material into a support material based on a first computer model of an object, thereby forming a first portion of the object in the support material. The structure material can be deposited by a second nozzle or may be prefilled in a material deposition region. First image data of at least the first portion of the object can be obtained in-process by a detector such as a light-based camera, a brightfield microscope, a fluorescence microscope, a computerized tomography (CT) scanner, a magnetic resonance imaging (MRI) scanner, an optical coherence tomography (OCT) scanner, a laser scanner, an ultrasound scanner, or a combination thereof. The first image data is compared to the first computer model. Based on the comparison, the method can comprise modifying the first computer model, modifying a print parameter, modifying machine path instructions for an additive manufacturing machine that comprises the nozzle, aborting the additive formation of the object, indicating a discrepancy between the structure material and the computer model, indicating validation of the shape of the structure material, or a combination thereof. The depositing of the structure material is repeated by the nozzle as necessary to additively form the object.

In another general aspect, the present disclosure is related to an additive manufacturing system comprising a first extruder assembly, optionally a second extruder assembly, a material deposition, a detector, and a process coupled to non-transitory memory. The first extruder assembly comprises a first nozzle configured to deposit structure material and the second extruder assembly comprises a second nozzle configured deposit support material. The material deposition region is configure to receive the support material. The detector is configured to obtain image data of objects in the material deposition region in-process. The detector can be a light-based camera, a brightfield microscope, a fluorescence microscope, a computerized tomography (CT) scanner, a magnetic resonance imaging (MRI) scanner, an optical coherence tomography (OCT) scanner, a laser scanner, an ultrasound scanner, or a combination thereof. The processor is operatively coupled to the first extruder assembly, the second extruder assembly, and the detector. The non-transitory memory comprises machine executable instructions that when executed by the processor cause the processor to perform the additive manufacturing method as described herein.

A product can be fabricated by the method for additive manufacturing and/or the system for additive manufacturing described herein.

In yet another general aspect, the present disclosure is related to a support material for additive manufacturing. The support material comprises a hydrogel comprising particles (e.g., gelatin microparticles) in a diluent (e.g., an aqueous diluent comprising polysucrose, ficoll, and/or iodixanol). The diluent comprises a first index of refraction, the particles comprise a second index of refraction, and the difference between the first index of refraction and the second index of refraction is no greater than 0.05, such as no greater than 0.02.

In yet another general aspect, the present disclosure is related to an assembly comprising the support material as described herein and a structure material. The structure material can comprise an index of refraction substantially similar to the index of refraction of the support material or the structure material can have an index of refraction different than the support material. For example, the structure material can comprise a contrast agent.

Various embodiments and implementations of the present invention provide many benefits and improvements relative to prior additive printing techniques, such as, for example, techniques related to embedded printing. For example, in-process monitoring of printing of the object can enable validation of the object, rejection of the shape of the object, and/or dynamic process modifications. Utilizing a high contrast structure material, a transparent support material, and layer-by-layer printing of the support material can enable enhanced signal-to-noise ratios of the obtained image data. These and other benefits that are potentially realizable through various implementations of the present invention will be apparent from the description that follows.

BRIEF DESCRIPTION OF THE DRAWINGS

FIG. 1G is OCT imaging of the benchmark model after melting and resolidification of the gelation microparticle support bath.

FIG. 1H is OCT imaging of the benchmark model in water.

FIG. 1I is an analysis of the OCT SNR for the collagen benchmark model within either gelatin microparticle support bath, melted and resolidified gelatin, or water. All three SNR curves are statistically significantly different from each other (p<0.0001, n=12 total measurements from 3 benchmark prints each, Wilcoxon signed-rank test).

FIG. 1J is a correlation between the intended internal channel width and the measured width via OCT (n=4, Pearson's correlation of r=0.9989).

FIG. 5A illustrates a vestibular apparatus with three orthogonal semicircular canals.

FIG. 5B illustrates a Circle of Willis showing vertebral arteries, anterior spinal artery, middle cerebral arteries, and posterior and anterior cerebral arteries.

FIG. 10A illustrates a composite OCT image represented as a cloud of intensity data.

FIG. 10B illustrates an initial segmentation of the OCT image data, with artifacts.

FIG. 10C illustrates a segmentation correction to remove artifacts, using raw OCT image data as reference.

FIG. 10D illustrates segmentation exported as an STL with many polygons.

FIG. 10E illustrates the STL mesh decimated to decrease the number of polygons.

FIG. 10F illustrates the original model and the decimated reconstruction are oriented incorrectly for comparison when loaded into CloudCompare.

FIG. 10G illustrates after manual translation and rotation, the two models are automatically registered.

FIG. 10H illustrates after registration, the two models can be compared to assess deviations from the original model.

FIG. 13 is flow chart of an example of an additive manufacturing FRE method according to the present disclosure.

FIG. 15A is plain uncleared gelatin microparticle support and polysucrose cleared support.

FIG. 15B is absorption measurements for plain slurry (uncleared) vs. different ratios of polysucrose cleared support material showing a decrease in absorption.

FIG. 15C is index of refraction measurements of the polysucrose dilution series.

FIG. 15D illustrates an engineered slope model to measure the difference in OCT penetration depth in uncleared vs. transparent gelatin support material.

FIG. 16F illustrates a defect tube model with dye perfused through the model.

FIG. 16G illustrates OCT imaging acquired during printing shows an open lumen in the defect-free model.

FIG. 16G illustrates OCT imaging acquired during printing shows a blockage in the defect tube model.

FIG. 17A illustrates an average intensity projection of the OCT data down the length of the tube of the defect-free model shows low signal in the center of the tube.

FIG. 17B illustrates an average intensity projection of the OCT data for the model with the defect shows high signal in the center of the tube, indicating a blockage.

DETAILED DESCRIPTION

Figure 1A:
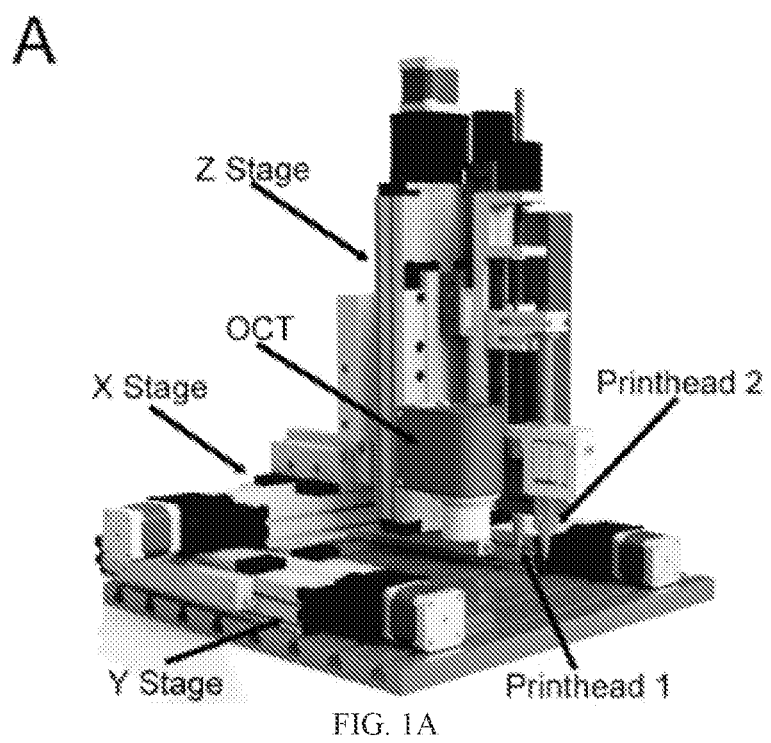
FIG. 1A is a 3D render of a custom-designed high-performance 3D bioprinter with dual extruders and an OCT scan head.

As used herein, "additive manufacturing" means a process of joining materials to make objects from 3D model data, usually layer upon layer, as opposed to subtractive manufacturing methodologies. For example, additive manufacturing can comprise fused deposition modeling (FDM) and Freeform Reversible Embedding (FRE). FDM can comprise extruding a material by heating it to a temperature above its melting temperature and depositing the extruded material in a pattern to form a layer of an object. Subsequent layers can be deposited on top of the previous layer as necessary to form an object.

FRE is similar to FDM, but instead of depositing a material on top of previous depositions or supports, FRE embeds structure material near other embedded deposits inside a support material and relies on the triggered assembly or reorganization of the material using targeted heating, photopolymerization, crosslinking, slow reaction kinetics, application of binders, and/or other curing technique. For example, the support material may provide divalent cations for crosslinking, such that when the structure material contact the support material, the structure material begins to cure.

For additive manufacturing techniques such as FDM, support materials are usually as stiff as the printed material, printed as part of the previous layer, and placed only underneath or neighboring the print layers to prevent deformations. In FRE, the support material can surround the extrusion nozzle and the print material can be deposited inside the support. The support material can be a non-newtonian fluid that allows for deposition of various materials while maintaining a buoyant, physical support for already embedded deposits of print material. When two embedded deposits of print material with a predetermined distance inside of the support material, they can fuse. After printing, the support material can be removed from the deposited print material to form a fully assembled object from the deposited print material.

In FRE, an object can be printed in any direction in 3D space and is not limited to layer-by-layer printing. For example, a structure can also be printed layer by layer in an X-Y plane, or a non-X-Y plane, such as the X-Z plane, or in a plane at any angle offset from the X-Y Plane. An object can also be printed utilizing FRE in a non-planar fashion, such as, for example, in a curved path such as a helix. Utilizing FRE can enable printing of objects with mechanical properties that are different in the plane of printing versus orthogonal to the plane of printing or other angle to the plane of printing. Additional details regarding the FRE process can be found in U.S. Pat. No. 10,150,258, titled ADDITIVE MANUFACTURING OF EMBEDDED MATERIALS, filed Jan. 29, 2016, which is hereby incorporated by reference herein.

As 3D bioprinting, such as, FRE, has grown as a fabrication technology, so too has the need for improved analytical methods to characterize these engineered constructs. This can be challenging for soft tissues composed of hydrogels and cells as these materials readily deform, posing a barrier when trying to assess print fidelity and other properties non-destructively. Indeed, given the importance of structure-function relationships in most tissue types, establishing that the 3D architecture of a bioprinted construct (e.g., object) matches its intended anatomic design (e.g., computer model) can be desirable. A multimaterial bioprinting platform has been developed with integrated imaging for in situ volumetric imaging, error detection, and 3D reconstruction. While the platform is generally applicable to extrusion-based 3D bioprinting, the platform can also improve FRE of Suspended Hydrogels (FRESH) bioprinting process through new collagen bioink compositions, support bath optical clearing, and machine pathing. This can enable high-fidelity 3D volumetric imaging with micron scale resolution over centimeter length scales, the ability to detect a range of print defect types within a 3D volume, and real-time imaging of the printing process at each print layer. These advances can provide FRESH and other extrusion-based 3D bioprinting approaches with a comprehensive methodology for quality assessment that has been lacking in the field to date, paving the way for translation of these engineered tissues to the clinic and ultimately to achieving regulatory approval.

As the demand for donor tissue and organs continues to outpace the supply, clinicians are turning to regenerative medicine and tissue engineering strategies to create tissue de novo. 3D bioprinting has emerged as a way to build these tissues using robotic control to precisely pattern cells and biological hydrogels in a layer-by-layer process. However, this technology has been slowed by the difficulty of printing these soft, deformable materials into complex 3D architectures that recapitulate anatomic structure from the micro to macro length scale, and by the lack of a quantitative approach to verify print fidelity. Embedded 3D bioprinting, such as FRESH, addresses this challenge by providing a sacrificial support that prevents tissue deformation during bioprinting to produce highly relevant constructs such as heart valves, cardiac tissue scaffolds, and perfusable vascular networks. These sophisticated bioprinted constructs could prove very useful as clinical diagnostic tools or direct tissue replacements. However, for an approved therapy, validation of the manufactured product may be desired. To continue to move bioprinting techniques such as FRESH towards clinical application, the present disclosure provides improved printing capabilities to allow for high-fidelity reproduction of patient-specific organic shapes, improved assessment and quantification of accuracy and precision of bioprinted tissues, and/or improved quality control of geometric fidelity and error detection utilizing feedback from in-process measurements of the tissue during printing can be implemented. In fact, for a medical device to be approved by the U.S. Food and Drug Administration, process validation and performance qualification, such as in-process monitoring during manufacturing, can be desired to ensure a product consistently meets predetermined specifications (FDA e-CFR § 820.70, § 820.72, § 820.75).

For most manufacturing, in-process monitoring can be performed using light-based camera systems or machine vision, and does not require true 3D reconstruction for validation. However, for FRESH, implementing these traditional approaches is challenging. The gelatin microparticle support bath typically used for the FRESH printing process can be translucent or opaque and highly light scattering. Micro Computed Tomography (μCT) can be been performed on FRESH printed samples to produce 3D reconstructions after they have been removed from the support bath, but this process may require sample fixation and embedding into an agarose solution which limits its use as a therapeutic device after imaging. 3D fluorescence imaging using laser scanning confocal or multi photon microscopy can be non-destructive and resolve micron scale features, but can be limited by slow acquisition speeds and small volumetric imaging (constructs less than 1 mm in thickness). An inspection solution according to the present disclosure can have a large imaging depth and field of view, a fast volumetric acquisition speed, can resolve features from the micron to centimeter scale, and can be non-destructive to the sample.

The present disclosure provides methods, systems, and materials that can improve visualization, quality control, and process reliability during the FRE process, other 3D bioprinting process, or other additive manufacturing process. For example, the present disclosure provides for a 3D printing process monitoring using a detector, such as, for example, an OCT scanner, during the FRE process. In various examples, the present disclosure provides a transparent support material for FRE and a system for in process monitoring thereof. In certain examples, the present disclosure provides a transparent support bath for embedded 3D printing, wherein a index of refraction can be actively controlled to manipulate transparency and opacity of single and multi-material mixtures for controlled visibility. In certain examples, the present disclosure provides increased visualization of printed objects in the support material by eye and/or with optical imaging techniques.

The transparent support material can be created by utilizing a cell compatible solution to modify the index of refraction of an aqueous phase (e.g., diluent) of a particle (e.g., microparticle) support bath. By matching the index of refraction of the particles and the diluent, the support material can become more transparent. The transparent support material can allow printed objects embedded in the support material to be viewed during the printing process prior to thermoreversal and removal of the support material. In various examples, index of refraction control of printed material can be utilized to create a index of refraction mismatch of printed material to the support material to enhance visualization by eye, and quantitative evaluation and process monitoring using various detectors.

Various implementations of the present disclosure can improve FRE additive manufacturing by enhancing the transparency of the support material, in-process imaging of structure material during and/or after deposition, and adding the support material on demand in a layer-by-layer fashion. It is also believed the present disclosure applies to other additive manufacturing techniques in addition to FRE.

Figure 12:
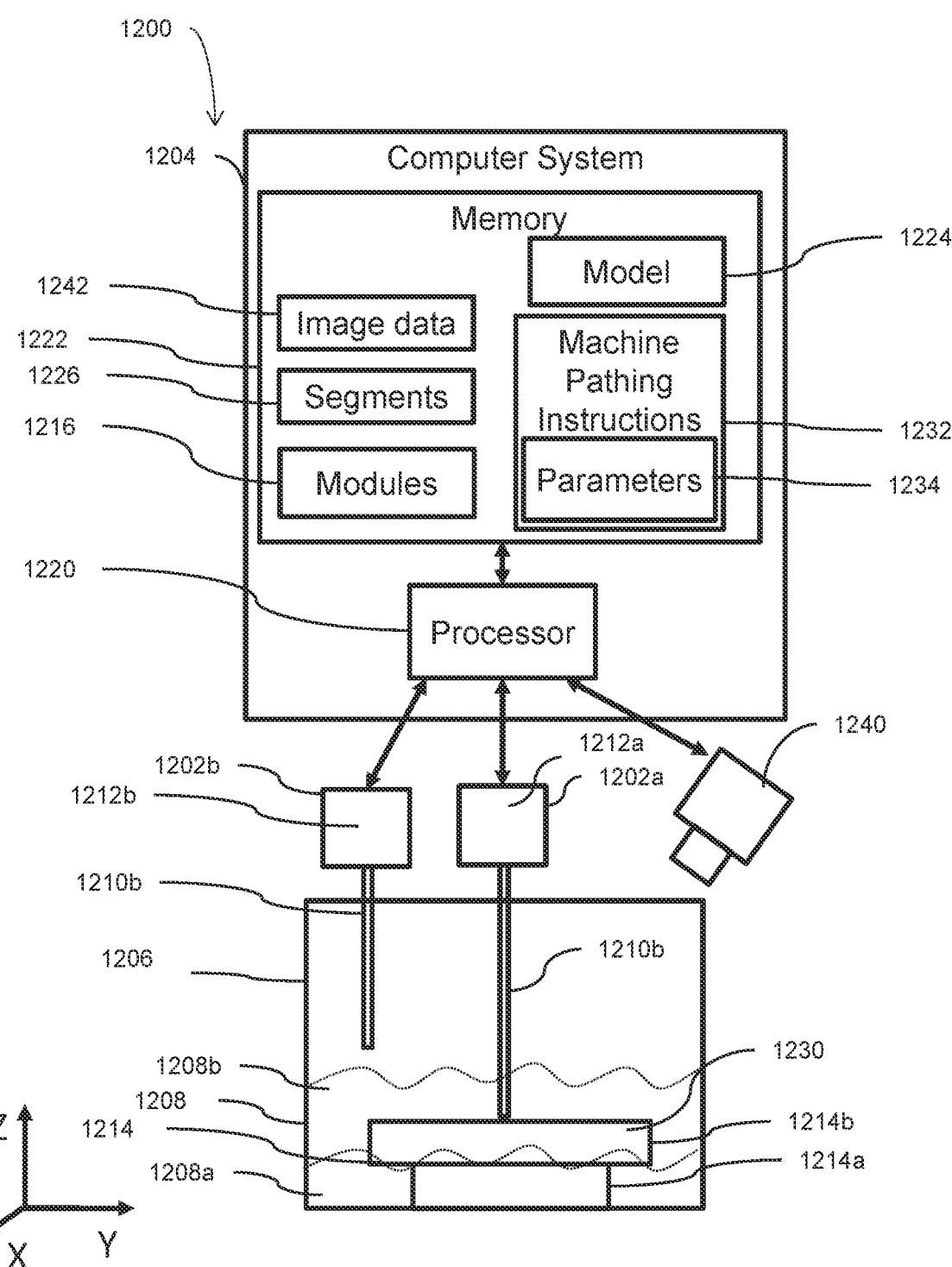
FIG. 12 is a block diagram of an example of an additive manufacturing FRE system according to the present disclosure, the X-axis is coming out of the page.

Referring to FIG. 12, a block diagram illustrating an example of an additive manufacturing system 1200 for FRE according to the present disclosure is provided. The system 1200 comprises a first extruder assembly 1202a, a computer system 1204, a material deposition region 1206, a detector 1240, and optionally a second extruder assembly 1202b. In various examples, additional extruders and/or nozzles may be added to the additive manufacturing system to increase the printing capabilities of the additive manufacturing system while still enabling in-process monitoring. The computer system 1204 is in signal/data communication with the first extruder assembly 1202a, the second extruder assembly 1202b, and the detector 1240 (such as via a wired and/or wireless data bus or link). The computer system 1204 can be configured through programming to control the operation of the first extruder assembly 1202a, the second extruder assembly 1202b, and the detector 1240. The computer system 1204 can also receive data from and send data (e.g. control data) to the extruder assemblies 1202a-b and the detector 1240. The components may be in communication with the computer system 1204 via any suitable type of data bus (e.g., parallel or bit serial connections).

Each extruder assembly 1202a and 1202b may be a syringe-based extruder, which can include a reservoir 1212a and 1212b, respectively, (e.g., a barrel of a syringe) for receiving and storing structure material or support material, and a nozzle 1210a and 1210b, respectively, (e.g., a needle) which can be in fluid communication with the respective reservoir 1212a or 1212b and can receive the structure material or the support material from the reservoir 1212a or 1212b. For example, the reservoir 1212a can comprise structure material and the structure material can be extruded through the nozzle 1210a and the nozzle 1210a can be configured to deposit the extruded structure material in the support material 1208 disposed in the material deposition region 1206. The reservoir 1212b can comprise support material and the support material can be extruded through the nozzle 1210b and the nozzle 1210b can be configured to deposit the extruded support material in the material deposition region 1206.

In various examples, the first extruder assembly 1202a, the second extruder assembly 1202b, the detector 1240, and/or additional components can comprise a gantry or other robotic device to support and/or move the first extruder assembly 1202a, the second extruder assembly 1202b, and/or the detector 1240 relative to the material deposition region 1206. Optionally, the first extruder assembly 1202a, the second extruder assembly 1202b, and/or the detector 1240 can comprise a motor assembly or other movement assembly configured to translate and/or rotate the gantry and/or robotic device. In various examples, each extruder assembly 1202a and 1202b comprises an actuator (e.g., a motor) configured to depress a plunger into the respective reservoir 1212a or 1212b to extrude material through the nozzle 1210a or 1210b into material deposition region 1206 as nozzle 1210a or 1210b is translated through the material deposition region 1206 to additively form an object 1214. In various examples, the first extruder assembly 1202a and/or the second extruder assembly 1202b are connected to the detector 1240.

The computer system 1204 comprises one or more processors 1220 operatively coupled to one or more nontransitory memories 1222 (only one processor 1220 and one memory 1222 are shown in FIG. 12 for simplicity). The processor 1220 may comprise one or multiple processing cores. The memory 1222 can comprise primary storage (e.g., main memory that is directly accessible by the processor 1220, such as RAM, ROM processor registers or processor cache); secondary storage (e.g., SSDs or HDDs that are not directly accessible by the processor); and/or off-line storage.

The memory 1222 stores computer instructions (e.g., software) that are executed by the processor 1220. The processor 1220 can be configured (through execution of the software stored in the memory 1222) to control operation of the extruder assemblies 1202*a-b* to thereby control the deposition of the structure material through the nozzle 1210*a-b*. For example, the processor 1220 can control the flow rate of material through the nozzle 1210*a* and/or 1210*b* (e.g., by the actuation rate of a plunger in the respective extruder assembly 1202*a* or 1202*b*) and/or the pose of the first extruder assembly 1202*a*, the second extruder assembly 1202*b*, and the detector 1240 relative to the material deposition region 1206.

The memory 1222 can store a digital or electronic computer model 1224 of the object 1214 to be manufactured by the additive manufacturing process. The processor 1220 can compare, through appropriate programming thereof, data from the detector 1240 to the computer model 1224 as described herein. The computer model 1224 can be loaded locally into the memory 1222 or can be downloaded from another device (e.g., another computer device, cloud) that is in data communication with the computer system 1204. To that end, the computer system 1204 may comprise a network interface controller (NIC) (not shown) that connects the computer system 1204 to a computer network. The computer model 1224 can be in a variety of different digital or electronic formats, such as an STL file, a OBJ file, a FBS file, a COLLADA file, a 3DS file, an IGES file, a STEP file, a VRML/X3D file, a point cloud, or another 3D model file format type. The computer model 1224 can be generated from image data of a biological structure, an engineered structure, a computationally derived structure, or a combination thereof. In various examples, the biological structure can be generated from the image data of a patient.

Through appropriate programming, the processor 1220 can receive a digital or electronic image data 1242 from the detector 1240. The processor 1220 can store the image data 1242 in the memory 1222 and compare the image data 1242 to the computer model 1224 and/or create a new model from the image data 1242 and compare the new model to the computer model 1224.

The detector 1240 can comprise a light-based camera, a brightfield microscope, a fluorescence microscope, CT scanner, a MM scanner, an OCT scan, a laser scan, an ultrasound scan, or a combination thereof. In various examples, the detector 1240 comprises an OCT scanner. The detector 1240 is configured to obtain image data of the material deposition region 1206 and/or object 1214 contained therein. The detector 1240 can obtain the image data in-process, such as, for example, during the print process and prior to completion of creation of the object 1214. For example, the image data can be obtained by the detector 1240 while the structure material and/or support material is being deposited or is not being deposited but prior to the last deposition of structure material and/or support material. In various examples, image data can also be obtained post process such that the creation of the object 1214 has been completed and no further deposition of structure material is needed. The detector 1240 can be configured for in-process monitoring, quality control, and as a feedback system for additive manufacturing.

The processor 1220 can be configured to separate (e.g., slice (utilizing Slic3r, Cura, Simplify3D, Skeinforge, KIS Slicer software, etc.)) the computer model 1224 into different segments 1226, each segment containing a portion of the computer model 1224. In various examples, the processor 1220 can be configured to convert the computer model 1224 to a different 3D model file format prior to separating.

Each segment 1226 can be a layer, 1214*a* and 1214*b*, of the object 1214 to be deposited, a portion of a layer, 1214*a* and 1214*b*, of the object 1214 to be deposited, or other geometry of the object 1214. The segments 1226 can be created based on a design of the computer model 1224. For example, a segment of segments 1226 can comprise an overlapping region, an overhang region, an infill region, a perimeter region, another region of the object 1214, or a combination thereof. Each segment 1226 may or may not be in the X-Y plan and a segment can be in a non-X-Y plane, such as the X-Z plane, the Y-Z plane, other plane offset from the X-Y plane, or a non-planar segment, such as, for example, a curve. Utilizing various segments 1226 for different regions of the object 1214 can enable variations of machine path instructions and/or print parameters for each segment 1226. Therefore, the machine path instructions and/or print parameters can be selected to suit the particular geometry to be printed in the respective segment 1226.

From the segments 1226, the processor 1220 can be configured to create machine path instructions (e.g., G-code instructions) 1232 for the segments 1226 based on the design of the portion of the computer model 1224 in the respective segment 1226. The machine path instructions 1232 can be stored in the memory 1222. The machine path instructions 1232 can comprise print parameters 1234 and can be executed by the processor 1220 to cause the processor 1220 to control the operation (e.g., pose, extrusion, suction, cure) of the first extruder assembly 1202*a*, the second extruder assembly 1202*b*, the detector 1240, or other device (e.g., structure material removal device such as a suction tube). The print parameters 1234 can be a flow rate of the structure material through the nozzle 1210*a*, a flow rate of support material through the nozzle 1210*b*, a structure material removal instruction, an alignment parameter, a cell (e.g., biological living cell) deposition parameter, a direction of extrusion, an infill parameter (e.g., density, pattern), a translation rate of the nozzle 1210, a layer height, a direction of translation of the nozzle 1210*a*, a print pattern, a cure parameter, a combination thereof, or other print parameter.

The machine pathing instructions 1232 and print parameters 1234 can be associated with a respective segment 1226 and suited to the geometry and intended mechanical properties of the region of the computer model 1224 in the associated respective segment 1226 to be printed. The processor 1220 can be configured to modify a print parameter 1234 used for the control of the first extruder assembly 1202*a*, the second extruder assembly 1202*b*, the detector 1240, or other device based on the comparison of the image data 1242 to the computer model 1224 and/or comparison of a new model created from image data 1242 to the computer model 1224. For example, the processor 1220 can change the flow rate of the structure material through the nozzle 1210*a* based on the comparison, change the direction of extrusion, change an infill parameter (e.g., density, pattern), change a translation rates of the nozzle 1210*a* and/or nozzle 1210*b* between the first and second portions, change a deposition heights of the nozzle 1210*a* and/or 1210*b*, change a direction of translation of the nozzle 1210*a* and/or 1210*b*, change a print pattern, change a cure parameter, a combination thereof, or utilize various other different print parameters.

Based on the comparison, the processor 1220 can be configured to modify the computer model 1224, modify a print parameter 1234 that control the printing by the extruder assemblies 1202*a-b*, modify machine path instructions 1232, abort the additive formation of the object being printed, indicate a discrepancy between object as it is being additively printed and the computer model according to which it is being printed, indicate a validated shape for the object during or at the end of the additive printing process, continue printing of the object, or a combination thereof. For example, the processor 1220 can indicate (e.g., store data indicative of) the discrepancy or the validated shape in memory 1222. In certain examples, the processor 1220 can abort the additive formation of the object 1214 and indicate the discrepancy to an operator such that a new print can be started. The indication to the operator can be via a monitor, an audial or visual alarm, or via a mobile app of an operator mobile computing device.

The processor 1220 can be configured to modify the machine pathing instructions 1232. For example, based on the comparison of the image data 1242 to the computer model 1224 and/or comparison of a new model from the image data 1242 to the computer model 1224, the processor 1220 can determine a particular feature of the computer model 1224 may have been absent from the observed portion of the object 1214. Thus, the processor 1220 can add a new machine pathing instruction to machine pathing instructions 1232 to add the particular feature of the computer model 1224 that is missing. In various examples, the processor 1220 can determine a particular feature observed in the object 1214 is absent in the computer model 1224. Thus, the processor 1220 can add a new machine pathing instruction to machine pathing instructions 1232 to remove a particular feature of the object 1214 that should not be present. In certain examples, the processor 1220 can remove a machine pathing instruction from machine pathing instructions 1232 based on the comparison of the image data 1242 to the computer model 1224 and/or comparison of a new model from the image data 1242 to the computer model 1224. In various examples, the processor 1220 can be configured to modify the computer model 1224 based on the comparison of the image data 1242 to the computer model 1224 and/or comparison of a new model from the image data 1242 to the computer model 1224.

The nozzle 1210a can be configured to deposit a structure material into the support material 1208 by applying a force to the structure material in the reservoir 1212a such that the structure material can flow from the reservoir 1212a through the nozzle 1210a. The structure material can comprise a yield stress, a thixotropic property, an increased viscosity, or a combination thereof. In examples where the structure material comprises a yield stress, the force applied can be at least the yield stress. In certain examples, applying the force to the structure material can cause the structure material to flow through the nozzle. For example, with an increase viscosity, the force can overcome the increased viscosity and cause the material to flow through the nozzle. In examples wherein the structure material comprises a thixotropic property, the thixotropic property can cause the time scale to start flow of the structure material to be longer than the printing process.

The nozzle 1210b can be configured to deposit a support material into the material deposition region 1206 by applying a force to the support material in the reservoir 1212b such that the support material can flow from the reservoir 1212b through the nozzle 1210b.

In various examples, a plunger can be translated through the reservoir 1212a and/or the reservoir 1212b. In various examples, the force can be pneumatically applied or the deposition can be controlled by a cavity pump. The application of the force can cause the material in the respective reservoir 1212a or 1212b to change form a solid or semi-solid state into fluid state (e.g., liquid), so that the material can be deposited into the material deposition region 1206. The structure material can be suspended in the support material 1208 at a location where the structure material was deposited by the nozzle 1210a within the support material 1208. Since the processor 1220 can control the extruder assembly 1202a and nozzle 1210a, the deposition of the structure material by the nozzle 1210 can be based on the machine path instructions 1232 and associated print parameters 1234 as executed by the processor 1220.

The support material can be positioned in the material deposition region 1206 at a location where the support material was deposited by the nozzle 1210b within the material deposition region 1206. Since the processor 1220 can control the extruder assembly 1202b and nozzle 1210b, the deposition of the support material by the nozzle 1210b can be based on the machine path instructions 1232 and associated print parameters 1234 as executed by the processor 1220.

The extruder assembly 1202a can move the nozzle 1210a in two-dimensions when depositing structure material similar to FDM or in three-dimensions when depositing material, i.e., simultaneously in the X, Y, and Z directions. Further, the extruder assembly 1202a, nozzle 1210a, and/or material deposition region 1206 can be rotatable. The machine pathing instructions 1232 can be defined according to both Cartesian and polar coordinates, which can allow for the production of objects having complex geometries or very specific mechanical properties. 3D movement of the nozzle 1210a during deposition of the structure material can enable, for example, additive manufacture of a helical spring in one constant motion. In various examples, other complex geometries are achievable with robotic arm assemblies capable of simultaneously controlling movement with six degrees of freedom (i.e., in any Cartesian or rotational direction). The extruder assembly 1202b can move in the same or similar manner to extruder assembly 1202a.

The depositing of the structure material can be repeated as necessary to additively form an object. For example, the processor 1220 can control the nozzle 1210a to deposit the structure material in layers, such as layers 1214a and 1214b, in order to additively form the object 1214 in the support material 1208 based on the computer model 1224, another plane, and/or non-planar movement. In some examples, layer 1214a can be deposited prior to layer 1214b. Layer 1214a may not be partially and/or fully cured prior to deposition of layer 1214b. Thus, the processor 1220 can control the nozzle 1210a to deposit layer 1214b proximal to (e.g., adjacent, in contact with, directly on top of) the layer 1214a such that the deposition of the layer 1214b contacts the layer 1214a. For example, deposition of layer 1214b can change the shape of at least a portion of layer 1214a. The changed shape of at least a portion of layer 1214a can be one that cannot be achieved by simple extruding out of the nozzle 1210a. Changing the shape of the layer 1214a by deposition of layer 1214b can increase contact surface area between the layers, 1214a and 1214b, decrease void space between the layers, 1214a and 1214b, improve adhesion between the layers, 1214a and 1214b, or a combination thereof.

The detector 1240 can obtain or otherwise capture image data of the first layer 1214a of the object 1214 before the second layer 1214b is deposited. The processor 1220 can compare that image data to the computer model 1224 and determine the first layer 1214a should have a different shape. Thus, based on the comparison, the processor 1220 can change a machine pathing instruction of machine pathing instructions 1232 for layer 1214b to achieve a desirable shape of layer 1214a while printing layer 1214b and/or desirable adhesion between layer 1214a and 1214b.

In various examples, the deposition of the support material can occur in various stages. For example, a first layer 1208a of support material can be deposited by the extruder assembly 1202b and then the first layer 1214a of the object 1214 can be deposited into the first layer 1208a of support material. Then a second layer 1208b of the support material can be deposited by the extruder assembly 1202a and then the second layer 1214b of the object 1214 can be deposited into the second layer 1208b of support material. Thus, the support material can be deposited as needed, such that if the detector is positioned above the material deposition region 1206, the amount of support material intermediate the detector 1240 and the object 1214 can be minimized.

The structure material can comprise a yield stress material that transitions between a fluid (e.g., liquid) state to a solid or semi-solid state by application of a pressure. For example, the structure material can be in a solid or semi-solid state in the extruder assembly 1202a, a pressure can be applied to the structure material to transition the structure material to a fluid state such that the structure material can flow through the nozzle 1210a and can be deposited into the support material 1208. After leaving the nozzle 1210, the applied pressure to the structure material is removed and the structure material can transition into a solid or semi-solid state and thereby resisting deformation while in the material deposition region 1206.

The structure material can comprise a polymer, such as, for example, a hydrogel, a thermoset polymer, a thermoplastic, or a combination thereof. The polymer can comprise a polymeric resin (e.g., a pre-polymer resin), a curing agent, a contrast agent, and/or other additives. For example, the polymer can comprise a collagen material, an alginate material, a decelluarized extracellular matrix material, a fibrinogen material, a fibrin material, a hyaluronic acid material, a protein material, a polysaccharide hydrogel material, a synthetic gel material, an elastomeric polymer material, a rigid polymer material, a Matrigel, or a combination thereof. In various examples, the polymer can comprise a thermoset polymer. The polymer can comprise a silicone based polymer, such as, for example, polydimethylsiloxane (PDMS), an epoxy based polymer, a urethane based polymer, or a combination thereof. The structure material can comprise at least 70% polymer based on the total weight of the structure material, such as, for example, at least 80% polymer based on the total weight of the structure material or at least 90% polymer based on the total weight of the structure material. In various examples, the structure material comprises a fluid that transitions to a solid or semi-solid state after deposition. In various examples, a difference between an index of refraction of the structure material and an index of refraction of the support material is no greater than 0.05, such as, for example, no greater than 0.04, no greater than 0.03, or no greater than 0.02. Matching the index of refraction of the structure material and the index of refraction of the support material may enable imaging of particular elements of the object, such as, for example, cell growth on the structure material.

The contrast agent can increase the color difference, light scattering, absorbance, and/or index of refraction difference between the support material and the structure material such that the signal to noise ratio during imaging is enhanced. For example, the structure material can comprise an index of refraction that is at least 0.1 different than the index of refraction of the support material, such as, for example, at least 0.2 or at least 0.3 different than the index of refraction of the support material. In various examples, the contrast agent can be biologically compatible. For example, a structure material with a contrast agent yielding an index of refraction of 1.40 can be significantly visible in a support material with an index of refraction of 1.34. In certain examples, the contrast agent can comprise titanium oxide, barium sulfate, casein, another suitable biologically compatible compound to achieve contrast with the support material, or a combination thereof.

The material deposition region 1206 can be configured for mechanically supporting and/or holding the support material 1208 during FRE additive manufacturing. For example, the material deposition region 1206 can comprise a vessel in which the support material 1208 is disposed and a platform on which the vessel is supported. The material deposition region can comprise a motor and/or actuator that can move the platform in 3D space as needed.

The support material 1208 can mechanically support at least a portion of the embedded structure material (i.e., object 1214), maintain the intended geometry of the embedded structure material, and inhibit deformation of the structure material during the FRE additive manufacturing process. For example, the embedded structure material can be held in position within the support material 1208 until the structure material is cured. The support material 1208 can be stationary at an applied stress level below a threshold stress level and can flow at an applied stress level at or above the threshold stress level during the FRE additive manufacturing process.

The support material 1208 can be a viscoplastic material with Bingham plastic-like rheological behavior. The support material 1208 may demonstrate a significant shear thinning behavior such that the support material 1208 acts like a solid material during deposition of the structure materials and then acts like a fluid when the nozzle 1210a is moved through the support material 1208 such that the movement of the nozzle 1210a does not disturb the deposited structure material. A drop in viscosity of the support material 1208 under dynamic loading can make the support material 1208 suitable for FRE. For example, in FRE, the dynamic loading can be caused by the force of the nozzle 1210a through the support material 1208, affecting the support material 1208 in a number of ways. The extruder assembly 1202a can be configured to change the support material 1208 by imposing a mechanical load via shear, pressure, or vibration. The extruder assembly 1202a and/or the extruder assembly 1202b can be configured to irradiate or heat the support material 1208 to thin it. In various examples, the support material 1208 can reduce viscosity under vibration, heating, or irradiation that occurs locally to the extruder assembly 1202a and/or 1202b.

The support material 1208 can comprise other materials with viscoplastic behavior, such as Herschel-Bulkley fluid. Bingham plastics and Herschel-Bulkley fluids are viscoplastic materials included in the "shear-thinning" or "yield-stress fluid" category. Below a specific shear stress, these materials appear as a solid material. Above a threshold shear force, these materials behave as a fluid. A Bingham plastic may not necessarily "shear thin," but rather may act much like a Newtonian fluid once it begins to flow. In contrast, the Herschel-Buckley fluid undergoes shear thinning once it begins to flow.

The support material can comprise a hydrogel comprising, for example, particles (e.g., microparticles) in a diluent. The particles can comprise gelatin or other suitable particle forming compound. The diluent can be aqueous or non-aqueous depending on the desired properties of the support material. In various examples, where the diluent is aqueous, the diluent can comprise polysucrose ficoll, iodixanol, other component suitable for obtaining a desired index of refraction of the diluent, or a combination thereof. In various examples, the diluent is aqueous and the diluent comprises a component with an index of refraction greater than water (e.g., 1.333). In certain examples, the diluent can comprise polysucrose in a range of 0.5 grams (g)/milliliter (ml) to 2 g/ml based on the total volume of the diluent, such as, for example, 0.75 g/ml to 1.5 g/ml or 0.75 g/ml to 1.25 g/ml, all based on the total volume of the diluent. In various examples, the diluent can comprise ficoll in a range of 100 g/liter to 250 g/liter based on the total volume of the diluent, such as, for example, 150 g/liter to 225 g/liter or 150 g/liter to 220 g/liter, all based on the total volume of the diluent. In certain examples, the diluent can comprise iodixanol in a range of 5% to 60% by volume based on the total volume of the diluent, such as, for example, 30% to 60% by volume, or 45% to 55% by volume, or 47.5% to 50% by volume, all based on the total volume of the diluent. Matching the refractive index of the particles to the refractive index of the diluent is also applicable to any non-gelatin based FRE printing to improve the transparency of the support bath.

Depending on the detector and/or printing technique, the support material can be clear or opaque. For example, the diluent can comprise a first index of refraction, the particles can comprise a second index of refraction, and the difference between the first index of refraction and the second index of refraction can be no greater than 0.05, such as, for example, no greater than 0.04, no greater than 0.03, or no greater than 0.02, such that reflection and/or scattering at the interface of the particles and diluent is minimized resulting in a more transparent support material. A difference of no greater than 0.05 can lead to measureable and significant transparency of the support material and enhance the in-process monitoring of the object 1214. The support material can be substantially transparent. For example, the support material can have an absorbance of less than 1 absorbance unit over a wavelength range of 450 nm to 750 nm. Utilizing a transparent support material can enhance in-process imaging of the object 1214.

The structure material can be curable and after curing, the structure material can be considered cured. The object 1214 can be at least partially cured in the support material 1208 after deposition of the structure material. In various examples, the structure material can be at least partially cured prior to removing the support material 1208. In some examples, the structure material may not be cured until after removing the support material 1208. As used in this specification, the terms "cure" and "curing" refer to the chemical crosslinking of components in the structure material. Accordingly, the terms "cure" and "curing" do not encompass solely physical drying of structure material through solvent or carrier evaporation. In this regard, the term "cured," as used in this specification, refers to the condition of the structure material in which a component of the structure material forming the object 1214 has chemically reacted to form new covalent bonds in the structure material (e.g., new covalent bonds formed between a polymeric resin and a curing agent), new ionic bonds, new hydrogen bonds, new Vander walls bonds, or combinations thereof.

For example, curing of the object 1214 can comprise cross-linking. The object 1214 can be treated through various cross-linking techniques to selectively increase the rigidity of the overall object 1214 or portions thereof. Cross-linking can be induced by various mechanisms such as, for example, photo mechanisms (e.g., exposing the structure material to UV light), ionic mechanism, enzymatic mechanism, pH mechanisms (e.g., exposing the structure material to a different pH) or thermally driven mechanisms (e.g., cooling, heating). In various examples, the support material 1208 can include a cross-linking agent or pH suitable for curing the structure material as it is deposited into the support material 1208.

The mechanical properties of the object 1214 can be controlled by controlling the amount of curing that occurs within the object 1214. For example, the machine pathing instructions 1232 can be modified to control the amount of crosslinking that occurs within the object 1214. For example, the extruder assembly 1202a, the extruder assembly 1202b, and/or other assembly can comprise a UV light and can selectively subject the embedded structure material to the UV light as desired.

The object 1214 can be at least partially removed from the support material 1208. Removing the support material 1208 may include heating the support material 1208, cooling the support material 1208, removing cations to disrupt crosslinking of the support material 1208, physically removing the support material 1208, vibration, irradiation with ultraviolet, infrared, or visible light, application of a constant or oscillating electric or magnetic field, other mechanism, or a combination thereof. For example, the support material can comprise a thermoreversible material and removing the support material can comprise heating the support material to a threshold temperature at which the support material transitions from a solid or semi-solid state to a liquid state.

The methods for additive manufacturing herein, such as those illustrated in described in FIG. 13 below, can be implemented in whole or in part as computer-executable instructions stored in the memory 1222 of the computer system 1204 that, when executed by a processor 1220 of the computer system 1204, cause the computer system 1204 to perform the enumerated steps. The computer instructions can be implemented as one or more software modules 1216 stored in the memory 1222 that are each programmed to cause the processor 1220 to execute one or more discrete steps of the processes described herein or other functions. For example, the software modules 1216 can comprise a separation module programmed to convert the computer model 1224 into segments; a conversion module programmed to convert the segments 1226 into computer instructions (e.g., G-code) for controlling the movement of the extruder assembly 1202a and/or extruder assembly 1202b to fabricate the object 1214; an imaging module for controlling imaging parameters and movement of the detector 1240; a modeling module programmed to receive, store, create, and/or modify part files of objects to be fabricated; and a robotic control module programmed to control the extruder assembly 1202a and/or extruder assembly 1202b according to the instructions generated by the conversion module to fabricate the object 1214. Various other modules can be implemented in addition to or in lieu of the aforementioned modules. In certain examples, the processes described herein can be executed across multiple computer systems that are communicably connected together in a network, a computer system communicably connected to a cloud computing system configured to execute one or more of the described steps, and so on.

Referring to FIG. 13, a flow chart illustrating an additive manufacturing method according to certain implementations of the present disclosure is provided. The method comprises receiving, by the processor 1220, a computer model 1224 of an object 1214 at step 1302. At step 1304, the processor 1220, executing the separation module software, can separate (e.g., slice) the computer model into different part segments and the processor 1220, executing the conversion module, can create machine path instructions (e.g., G-code instructions) based on the design computer model. The machine path instructions can be stored in memory 1222. The method can optionally comprise, at step 1306, depositing, by the nozzle 1210*b*, under the control of the processor 1220, a first layer 1208*a* of the support material onto the material deposition region 1206 based on the machine path instructions 1232. In addition or alternatively, the support material can be placed in the material deposition region 1206 prior to printing of the object.

The method can comprise, at step 1308, depositing a structure material, by the nozzle 1210*a*, into the support material 1208 such as at least the first layer 1208*a* based on the machine path instructions 1232, thereby forming a first portion of the object 1214 in the support material 1208*a* such as the first layer 1208*a*. The structure material and the support material together are also referred to herein as an assembly. At step 1310, a first of image data 1242 of the assembly (e.g., object 1214) can be obtained or captured by the detector 1240 in-process. Obtaining the image data can comprise scanning at least a portion of the object with a light-based camera scan, a brightfield microscope scan, a fluorescence microscope scan, a CT scan, a MM scan, an OCT scan, a laser scan, an ultrasound scan, or a combination thereof. For example, the image data 1242 can be obtained prior to completion of the object 1214. The image data can be obtained during depositing of the structure at step 1308, after depositing the structure material at step 1310, or a combination thereof.

The method can comprise, at step 1312, comparing by the processor 1220 the image data 1242 to the computer model 1224. Based on the comparison, the processor 1220 can modify the computer model 1224, modify a print parameter, modify machine path instructions 1232, abort the additive formation of the object 1214, indicate a discrepancy between the structure material (e.g., object 1214) and the computer model 1224, indicate a validated shape of the structure material (e.g., object 1214), continue printing, or a combination thereof.

The depositing of the support material and/or structure material can be repeated over as many iterations as necessary to additively form the object 1214 as shown by feedback loop step 1320. Each iteration can deposit portions of the support material and structure material (steps 1306 and 1308) and the iterations can be repeated until additive formation of the object is complete (if not aborted earlier based on the analysis by the processor 1220 as described herein). The image data can be captured for each iteration. As such, image data 1242 may be obtained a plurality of times at different times and stages (e.g., iterations) of the additive formation of the object 1214 and compared to the computer model 1224. For example, a second image data of at least a second portion of the object can be obtained by the processor 1220 after depositing, by the nozzle 1210*a*, additional structure material into the support material based (e.g., a second layer 1208*b*) on the computer model 1224 of the object 1214, thereby forming the second portion of the object 1214 in the second layer 1208*b*. The second image data can be obtained by the detector 1240 at a different time in the additive formation of the object 1214 than the first image data. The first image data, the second image data, and optionally additional image data can be combined to create a second computer model of the object. The second computer model can be compared to the computer model 1224. Thereafter, at step 1316, the structure material can be at least partially cured after depositing and then, at step 1318, the support material can be at least partially removed from the object 1214. The curing can occur prior to, during, after, or a combination thereof, removal of the support material at step 1316. In various examples, additional image data can be obtained of the completed object 1214 post process.

The methods for additive manufacturing and systems for additive manufacturing described herein can be used to create various products. The products can be various product types, such as, for example, a soft structure, a bioprosthetic, a scaffold, a medical device, an implantable device, a gasket, a tube, a seal, an aerospace part, an automotive part, a building component, or other structures that may be additively manufactured. In various examples, the product (e.g., object 1214) can be surgically fit into a patient from whom the image data of the biological structure was captured.

EXAMPLES

Various aspects, benefits and features that are potentially realizable through implementation of the present invention will be more fully understood by reference to the following examples, which provide illustrative non-limiting aspects of the invention. It is understood that the invention described in this specification is not necessarily limited to the examples described in this section.

The in-process 3D imaging platform for bioprinting in the examples comprises a custom-built dual extruder 3D bioprinter (e.g., additive manufacturing system) with an integrated OCT system (e.g., detector) to perform real-time imaging during FRESH printing. A swept-source OCT was chosen for the examples for its large penetration depth due to a long wavelength (1300 nm) light source and fast scanning speed of 100 kHz which can image 1 cm³ 3D volumes in less than 5 minutes (Thorlabs Vega). In general, OCT works by splitting a coherent light source between two light paths, a reference and sample arm. As the light returns from each respective light path the interaction of the waveforms produces either constructive (displayed as a bright object) or destructive interference (displayed as a dark object). Therefore, if the sample is highly reflective it will appear as a bright object of high signal intensity, and if there is no reflection and the sample absorbs the light the signal will be low and appear dark.

In addition to developing the custom hardware, the OCT contrast of the collagen I bioink (e.g., structure material) was enhanced and a transparent support material was utilized to enhance the quality of the image data. As used herein, a support bath refers to a container filled with support material. During these examples, OCT imaging was performed dynamically during printing, intermittently between print layers, and following print completion. The advancements enabled visualization of the printed constructs (e.g., objects) while they are still embedded in the support material, thereby enabling in-process measurements of the as-printed geometry. The present disclosure also provides the use of OCT to assess the quality of large bioprinted constructs such as human-scale tissues and organs and can enable generation of 3D reconstructions of the actual bioprinted construct for dimensional measurements, error detection and/or correction, and to ensure that patient-specific geometries are accurately reproduced.

EXPERIMENTAL SETUP

Integrated OCT Bioprinter:

The bioprinter used for the experiments herein was built using four Parker Hannefin 404XR 100 mm travel precision stages in a gantry configuration (8 μm travel accuracy verified using Mitutoyo absolute digimatic indicator 543-792) mounted to an aluminum baseplate (www.world-ofclamping.com). The printer utilized two custom Replis-truder syringe pumps built with high-precision metric leadscrews (www.McMaster.com) and compact Nema 11 motors with planetary gearsets (www.stepperonline.com); both were mounted to the Z stage. A dovetail adapter was designed, 3D printed from PLA plastic, and mounted to the Z stage to receive the OCT scanhead (Thorlabs), which was controlled with its own dedicated PC. The X, Y, and Z axes as well as the two extruders were controlled using a Duet 3 motion controller with a Raspberry Pi 4 single board computer dedicated for the user interface.

Plain FRESH Gelatin Microparticle Support Bath and Generation:

FRESH v2.0 gelatin microparticle support bath was prepared using a complex coacervation method to produce gelatin microparticles. First, 2.0% (w/v) gelatin Type B (Fisher Chemical), 0.25% (w/v) Pluronic® F-127 (Sigma-Aldrich) and 0.1% (w/v) gum arabic (Sigma-Aldrich) were dissolved in a 50% (v/v) ethanol solution at 45° C. in a 1 L beaker and adjusted to 7.5 pH by addition of 1M hydrochloric acid (HCl). The beaker was then placed under an overhead stirrer (IKA, Model RW20), sealed with parafilm to minimize evaporation, and allowed to cool to room temperature while stirring overnight. The resulting gelatin microparticle support bath was transferred into 250 mL containers and centrifuged at 300 g for 2 min to compact the gelatin microparticles. The supernatant was removed and gelatin microparticles were resuspended in a 50% ethanol solution of 50 mM 4-(2-hydroxyethyl)-1-piperazineethane-sulfonic acid (HEPES) (Corning) at pH 7.4, to remove the Pluronic® F-127. The gelatin microparticle support bath was then washed three times with the same Ethanol HEPES solution and stored until use at 4 C. Prior to printing, the uncompacted support was centrifuged at 300 g for 2 minutes then washed with 50 mM HEPES and centrifuged at 750 g for 3 minutes a total of 4 additional times. After the last washing the gelatin microparticle support bath was again suspended in 50 mM HEPES and was degassed in a vacuum chamber for 15 min, followed by centrifugation at 1900-2100 g, depending on level of compaction desired, for 5 min. The supernatant was removed and the gelatin microparticle support bath was transferred into a print container.

Collagen Bioink Preparation:

All collagen bioinks were purchased as LifeInk 200 (Advanced Biomatrix). 35 mg/mL LifeInk was mixed with syringes in a 2:1 ratio with 0.24M acetic acid to produce a 23.33 mg/mL acidified collagen ink. The ink was then centrifuged at 3000 g for 5 minutes to remove bubbles. To produce high contrast collagen inks an appropriate amount of 0.3-1.0 μm $TiO_2$ powder (Atlantic Equipment Engineers) was then weighed out for a 250 PPM mixture with the acidified collagen bioink. The $TiO_2$ powder was then dissolved in 100 of 0.24M acetic acid. This $TiO_2$ solution was then aspirated into the collagen through a needle. The $TiO_2$ collagen mixture was then mixed 100 times between two syringes. The ink was then centrifuged at 3000 g for 5 minutes to remove bubbles. For printing the bioinks were transferred to a 500 μL gastight syringe (Hamilton Company).

OCT Imaging:

To acquire an image with the Thorlabs Vega 1300 nm OCT system (VEG210C1) the sample is first placed under the objective (OCT-LK4 objective). The system was started in the 2D mode with a scanline intersecting the sample. The sample's surface was then brought into focus and shifted using the reference stage to highlight the region of interest and to set further parameters. The amplification and reference intensity were then set to provide the highest signal without introducing image artifacts. The polarizing filters were then adjusted to optimize the signal intensity and minimize image artifacts. For a 2D image the averaging and z depth were then set, and the image was acquired at this point. For a 3D volume the mode was switched to 3D then the x, and y pixel dimensions were set to provide sufficient resolution while allowing for averaging and the amount of averaging was set (typically 16.22 μm or 20 μm with 10 averages). Finally, the image was acquired. When utilizing the OCT mounted to the bioprinter for in-process imaging this same process was executed after the printer automatically positioned the scan head and paused for imaging. Acquired images were exported as 32-bit Tiff files for further processing.

Printing Both Bioink and Gelatin Microparticle Support Bath with In-Process Imaging:

To generate print pathing for multimaterial printing with in-process imaging a combination of open-source software and custom code was used. First the object to be printed and the volume of gelatin microparticle support bath to be printed were generated using Autodesk Inventor (Autodesk) or acquired from another source. These models were then loaded into Ultimaker Cura (Ultimaker) and processed into G-code using print parameters appropriate to the needle and syringe diameter being used. Next the G-codes were imported into a custom MATLAB script (Mathworks) designed to interleave the support print, the collagen print, and the imaging steps (meshGcode_OCTandSupport.m). The script takes advantage of the ability built into the Duet 3 implementation of G-code to store multiple toolhead positions. Using an index of the layer change comments in the G-code (automatically generated by Cura) the MATLAB script inserts small G-code scripts that use these toolhead positions to swap between extruder 1 (bioink), extruder 2 (gelatin microparticle support bath), and the OCT scan head. This custom script also allows for selection of the number of initial layers of gelatin microparticle support bath prior to initializing the collagen print and the number of layers of collagen to print prior to a new layer of support. The OCT scan head is also automatically raised by the thickness of the new layers printed to maintain focus on them.

Prior to printing, the high contrast collagen bioink is centrifuged at 3000 g for 5 minutes in a 10 mL plastic BD syringe and 450 μL is transferred to a 500 μL Hamilton gastight syringe. The plain gelatin microparticle support bath is centrifuged at 2000 g for 5 minutes in a 10 mL plastic BD syringe and is transferred to a 10 mL Hamilton gastight syringe. These inks, in their syringes, are loaded into their dedicated Replistruder syringe pumps. Then, using the tip of the needle to measure the width and height, the first needle is aligned to the center of the print dish. For this first tool the origin is set using the G92 command. The first toolhead (T0) position is then set using the G10 command. Next, the second extruder's needle is centered on the dish and the position is again recorded using the G10 command, but for the second toolhead (T1). Finally, the OCT is aligned by centering its objective on the dish. Next the Z positions must be set. The first extruder (T0) is touched off to the bottom surface of the print dish and the G92 and G10 commands are used to set its Z offset. This process is repeated with the second extruder (T1) and the G10 command. Finally, the OCT is shifted in Z until the boundary at the bottom of the dish is in focus and the G10 command is used to set the offset of the focal plane. At this point the Duet 3 knows all the relative positions of the tools attached to the Z axis and is ready to print.

The second extruder (T1) is then returned to the center of the dish, using the measured offsets from the alignment process. Plastic dishes are filled with DI water (for collagen bioink) or 50 mM HEPES (for support ink) and placed such that the inactive extruder needle is submerged (to prevent drying out and clogging). At this point the print can be initiated by selecting the G-code on the Duet 3 interface. When the printer reaches the first pause for imaging the user can acquire an image using the Vega OCT's PC and then reinitiate printing using the Duet 3 interface.

Index of Refraction Measurement:

Index of refraction measurements for Iodixanol solutions were taken using a Hanna Instruments digital refractometer (HI96800). Briefly the refractometer was calibrated using deionized water, then the sample of interest was placed on the flint glass for measurement. The sample was allowed to equilibrate in temperature with the steel ring of the refractometer. Measurements were repeated until the $4^{th}$ digit was consistent across measurements.

Identification of Gelatin Microparticle Support Bath Index of Refraction:

Plain gelatin microparticle support bath was prepared as described above. A high viscosity pipette was used to transfer 100 uL of compacted gelatin microparticle support bath into 2 mL of prepared Iodixanol solutions ranging from 0% to 60% in a 12 well plate. The support was then dispersed thoroughly within the Iodixanol solutions using clean pipette tips. Coverslips were used to trap the particles against the bottom of the well, which was necessary as Iodixanol solutions above 30% were denser than the gelatin microparticle support bath and floated the particles. Images were then acquired using a Nikon Eclipse TS100 microscope using a 20× phase objective and a Photometrics CoolSnapES camera run by MicroManager. The images were captured with identical exposure and illumination settings to allow for direct comparison.

The Iodixanol solutions were measured with the digital refractometer as described previously. To compare the particle clarity at different indices of refraction the peak to trough difference of the high contrast phase boundary was quantified using a line scan analysis in FIJI ImageJ software for n=13 particles in each image. Then the absolute value of this was plotted against the index of refraction to identify the index of refraction and iodixanol concentration that resulted in the clearest support solution.

Transparent FRESH Gelatin Microparticle Support Bath Generation

To produce transparent gelatin microparticle support bath using iodixanol the initial process is the same as plain support, described above except 250 mM HEPES is used instead of 50 mM HEPES. After the plain support is prepared for printing (e.g., centrifuged at 2000 g for 5 minutes and supernatant removed), the supernatant is poured out and the remaining supernatant is absorbed with Kim wipes. The desired final concentration of Iodixanol ranged from 47.5% to 50% for optimal clarity and print characteristics, here we demonstrate bringing the concentration to 50%. First, Iodixanol reused from previous support preparations, at roughly 50%, is measured using our Hanna Instruments digital refractometer. The index of refraction is utilized to determine the exact Iodixanol concentration. Sufficient Iodixanol is added to the support to bring the mass ratio of Iodixanol to 26% (mass ratio of 1:1.1 support:~50% Iodixanol). The solution is then vortexed. After mixing the 26%

Iodixanol support is centrifuged at 3500 g for 5 minutes. After compaction, the Iodixanol supernatant is removed. At this point new 60% Iodixanol is added at a mass ratio sufficient to bring the final solution up to 50% Iodixanol (mass ratio of 1:2.3 support:60% Iodixanol). This 50% Iodixanol support solution is backfilled into capped 10 mL BD syringes (with plungers removed) and placed in a vacuum chamber for 15 minutes. The open barrel of the syringe was sealed with parafilm and then the syringes were centrifuged at 3500 g for 15 minutes. After centrifugation, the denser Iodixanol is on the luer lock side of the syringe, covered by the compacted, clear gelatin microparticle support bath. A plunger is reintroduced into the backside of the syringe using a thin wire to allow for the passage of air. The Iodixanol solution is removed to another 10 mL BD syringe using a luer coupler and collected for later use in the first Iodixanol wash. After the Iodixanol has been removed, the clear gelatin microparticle support bath is collected into as few BD syringes as can hold the total volume. The support is transferred back and forth 50 times between these syringes to homogenize the mixture. Finally, the support is transferred to new 10 mL BD syringes with their plungers removed. The open barrel is covered with parafilm and the syringes are centrifuged at 3500 g. The plungers are reinserted, again using a wire to break the seal, and the support is ready for use.

Ficoll Solution

First, 100 ml of deionized water was measured out with a graduated cylinder. The water was raised to 502 C on a stir plate. While maintaining the water temperature and stirring, 50 g of Ficoll PM400 (GE) was added in 10 g increments until fully dissolved. This solution was allowed to stir overnight at SOQC. The next day the final volume of the solution was assessed. Using this volume a correct amount of HEPES free acid was measured out to produce a 50 mM final concentration. This HEPES was then mixed into the Ficoll solution. After the HEPES was fully dissolved the pH of the solution was raised to pH 7.4 using 1M NaOH. The solution was then degassed for 15 minutes to remove bubbles. This 500 g/l solution was used as our stock for preparing more dilute Ficoll preparations. To dilute the master stock an appropriate amount of 50 mM HEPES at pH 7.4 was mixed in to bring the solution to the desired final Ficoll concentration. For example, to prepare 10 mL of a 200 g/L solution the 4 mL of the master stock was diluted with 6 mL of 50 mM HEPES.

Ficoll Cleared Support Material

To produce Ficoll cleared support material the initial process is the same as plain support, described above. After the plain support is prepared for printing (e.g. centrifuged at 2000 g for 5 minutes and supernatant removed), Ficoll at the desired concentration is added in a 1:1 volume ratio. The Ficoll support mixture is vortexed for 2 minutes, with the user ensuring that the entire volume of support has been mixed. The support is then degassed for 15 minutes. After degassing the support is centrifuged at 4500 g for 20 minutes, at which point is ready to be used.

Absorbance Spectra Measurement:

To measure the absorbance of different gelatin microparticle support bath preparations a spectrophotometer (Molecular Devices SpectraMax i3x) was used. For each preparation, an equal volume of gelatin microparticle support bath was deposited into the wells of a standard clear 24 well plate (thus producing an equal thickness). The spectrophotometer was set to acquire absorbance spectra from 230 nm to 980 nm in 30 nm steps for each filled well. The plastic dish absorbed light from 230-400 nm and so this range was excluded from the analysis. Measurements were taken at a consistent temperature of 24° C.

Printing in Transparent Gelatin Microparticle Support Bath with In-Process Imaging:

Generating print pathing for printing in clear gelatin microparticle support bath with in-process imaging is very similar to printing both the bioink and the support. Ultimaker Cura is utilized to generate the print pathing for the object to be printed. Next the G-code is imported into a custom MATLAB script (Mathworks) designed to interleave the collagen print and the imaging steps (meshGcode_OCT.m). The resulting G-code is uploaded to the Duet 3 printerboard via USB stick.

Prior to printing, the dish is filled with clear gelatin microparticle support bath and the top surface is scraped flat using a 20 mm×20 mm square 1.5 coverslip. The top surface of the support is then covered in a layer of light mineral oil to prevent drying out (Fisher Scientific). Next the offset between the bioink toolhead (TO) and the OCT scan head (T2) is measured and stored using the G10 tool offset command. The bioink extruder (TO) is then returned to the center of the dish, using the measured offsets from the alignment process. A plastic dish is filled with DI water (for collagen bioink) and placed such that the inactive extruder needle is submerged (to prevent drying out and clogging during imaging). At this point the print can be initiated by selecting the correct G-code on the Duet 3 interface. When the printer reaches the first pause for imaging the user can acquire an image using the Vega OCT's PC and then reinitiate printing using the Duet 3 interface.

Organic Model Creation

All models were created using Inventor Professional 2020 (Autodesk) or downloaded from online repositories. For the benchmark model and the 3D mixing model, the entire model was generated in Inventor then exported as an STL for printing. The vestibular apparatus was sourced from https://vestibularfirst.com/how-to-print-3d-vestibular-appa-ratus/and was derived from MM data acquired by the University of Dundee School of Medicine (https:// sketchfab.com/3d-models/anatomy-of-the-inner-ear-f80bda64666c4b8aaac8f63b7b82a0a0). The circle of Willis, derived from Mill data, was sourced from the NIH 3D Print Exchange (Model ID 3DPX-002604). The brain stem model, derived from MM data, was sourced from the NIH 3D Print Exchange (Model ID 3DPX-003892). The kidney model was sourced from the University of Pittsburgh School of Medicine.

Image Analysis

To assess signal to noise ratio in OCT images they were first opened in FIJI ImageJ. Then areas of the image with high signal and adjacent areas of background were sampled. The resulting averages and standard deviations for each area were utilized in the equation $$SNR(\text{dB}) = 10\log\left(\left(\frac{\mu_{Sig} - \mu_{BG}}{\sigma_{BG}}\right)^2\right)$$

to calculate the signal to noise ratio, where $\mu_{Sig}$ is the average of the signal, $\mu_{BG}$ is the average of the background, and $\sigma_{BG}$ is the standard deviation of the background.

To assess the signal intensity at different depths in plain and clear gelatin microparticle support bath a plastic dish was created with a sloped bottom that allowed for imaging through increasing depths of gelatin microparticle support bath. Images of the bottom of the dish were acquired using plain and clear gelatin microparticle support bath at the same imaging settings. Images were opened in FIJI and converted to 16-bit TIFFs using the same range of intensity values prior to conversion. The images were scaled to match each other, then regions of the same size were sampled at equivalent depths in each image. The resulting averages were utilized to create a curve of intensity at depth for plain and clear gelatin microparticle support bath.

To assess the quality of the printed resolution test object the acquired OCT images were opened in FIJI. The images were corrected for rotation about the x, y, and z axes. Cropped views of the middle 50% along the channel axis and 25% perpendicular to it were extracted from the images. These images were then 3D-median filtered with a 5-pixel filter width. The background intensity in the center of the channel was measured and used to perform background subtraction. The images were then automatically thresholded. The images were cropped to only include the channels and their walls. These stacks were saved and then imported into a custom MATLAB script that measured the width of the channel at each row in each slice of the segmented images and reported the average value of this width for all slices.

OCT Image Composites

To combine multiple OCT image stacks acquired throughout printing into a single composite image the pairwise stitching plugin was used in FIJI ImageJ with subpixel accuracy and linear gradient or maximum intensity fusion options set. First the raw images were rotated to orient the print to the pixel x, y, and z axes. Next the images were cropped to include the full last layer and the bottom of the print. These images were then resliced to a view perpendicular to the Z axis. The first stitching was performed with the first and second captured OCT stacks. The second stack was cropped to have approximately 10% overlap with the first. Overlapping regions of interest were highlighted to aid the plugin in registration. In subsequent stitching steps the same process was repeated but using the previously stitched image and the next stack to be incorporated, until the last stack was incorporated.

Gauging

To perform quantitative gauging of printed objects using the OCT images a full model of the printed object needed to be extracted. To do this the OCT images, either one acquired at the end of printing or a composite of multiple acquired throughout printing, were loaded into FIJI (NIH). These stacks were then filtered using the 3D-Median filter with a filter width of 3 pixels. The background subtraction tool was then used to remove background if necessary. The images were then converted into 16-bit tiffs and the histogram equalization was used. Local automatic thresholding was utilized to isolate the image data, using the savola method. Next erroneous spots were removed using the outlier removal tool. Finally, the segmented image stack was exported as a tiff.

The tiff was imported into 3D Slicer (http://www.slicer.org/). The integrated segmentation tools were used to isolate the print. The segmentation was manually edited to remove artifacts and islands and was then smoothed using a median filter with a 3 pixel width. After smoothing the reconstruction was exported as an STL file using the built-in exporter, taking care to set the pixel size to match the known pixel dimensions from OCT acquisition.

The reconstruction was loaded into 3D builder (Microsoft), where scaling was verified, and the mesh was simplified to aid with future processing. After saving the simplified mesh the reconstructed object was loaded, along with the digital model STL (which was used to generate the G-code for printing the object) into CloudCompare (http://www.cloudcompare.org/). Using built in tools the two objects were oriented relative to each other, registered, then surface deviations were calculated. This information was exported as false color images as well as mean and standard deviation.

3D Visualization in Imaris

Imaris (Bitplane, 9.5.1) was used for 3D rendering of the raw OCT data. The TIF file from the OCT data for each organic model was imported into Imaris. A surface object was created using the surface wizard function with local background subtraction and filtered using the "quality" filter to remove small non-specific objects. A mask of the surface object was created to act as a passthrough filter for the original OCT data to remove non-specific background from the 3D image. 3D renders of the background removed OCT data and the X-ray view of the surface object were exported as TIF images. Built in animation functionality was then used to make movies showing the internal features and highlighting internal complexity within the printed objects.

Statistics and Data Analysis

Figure 2A:
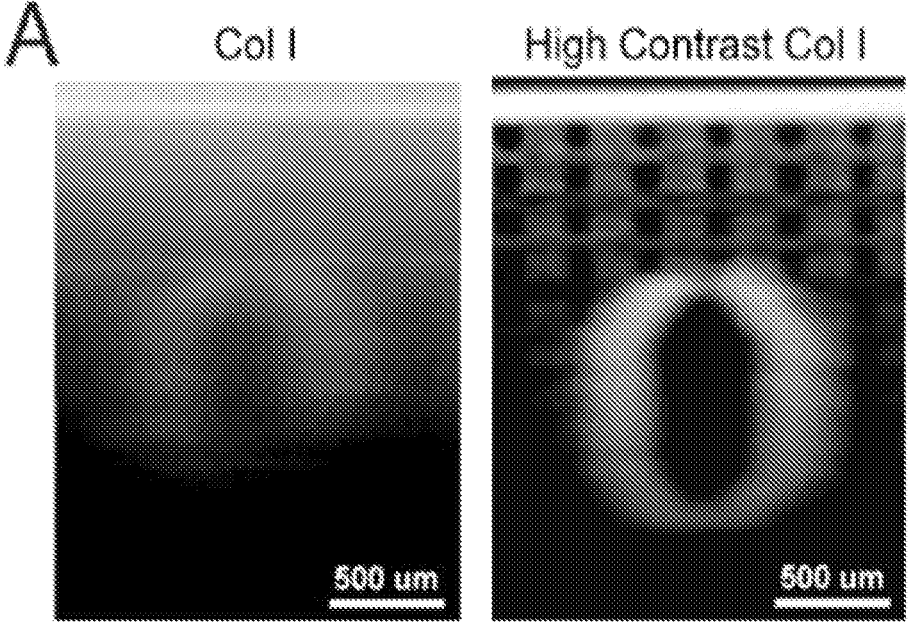
FIG. 2A is an OCT image cross-section of benchmark model channel printed from collagen-I or high contrast collagen-I embedded in the FRESH gelatin microparticle support bath.
Figure 2B:
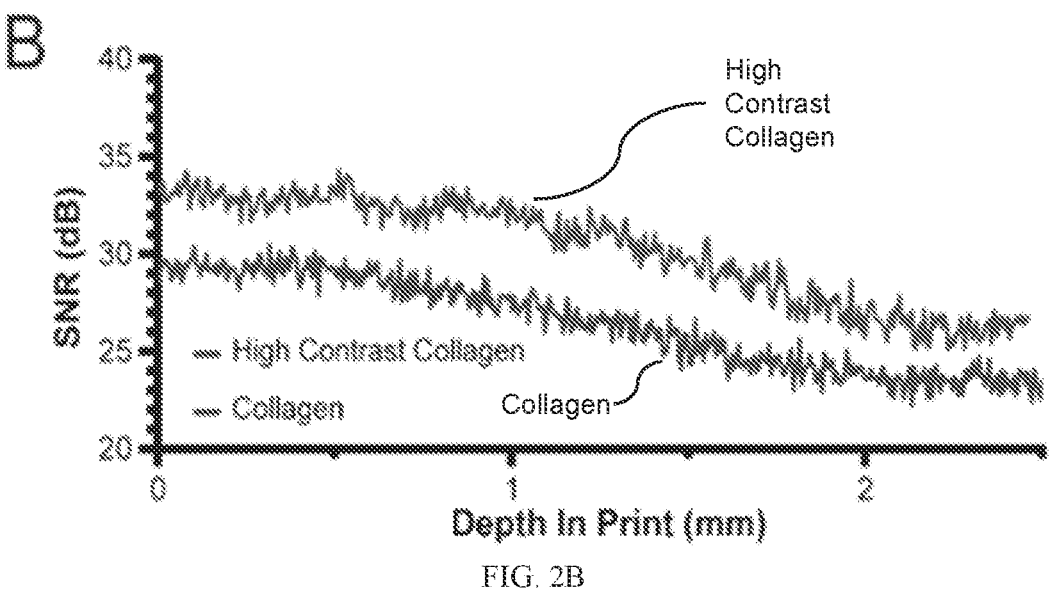
FIG. 2B is an OCT SNR analysis for a collagen and high contrast collagen benchmark model within the gelatin microparticle support bath. The two SNR curves are statistically significantly different from each other (p<0.0001, n=9 total measurements from 3 benchmark prints each, Wilcoxon signed-rank test).
Figure 2C:
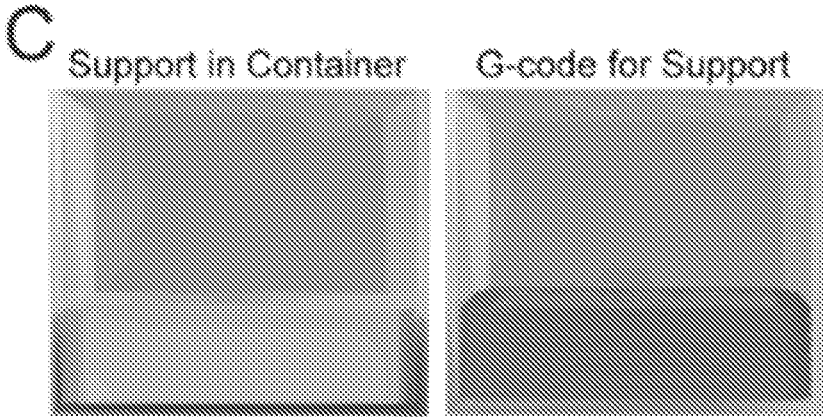
FIG. 2C is a 3D render of FRESH gelatin microparticle support bath within a print container (left) and layer-by-layer G-code (right).
Figure 2D:
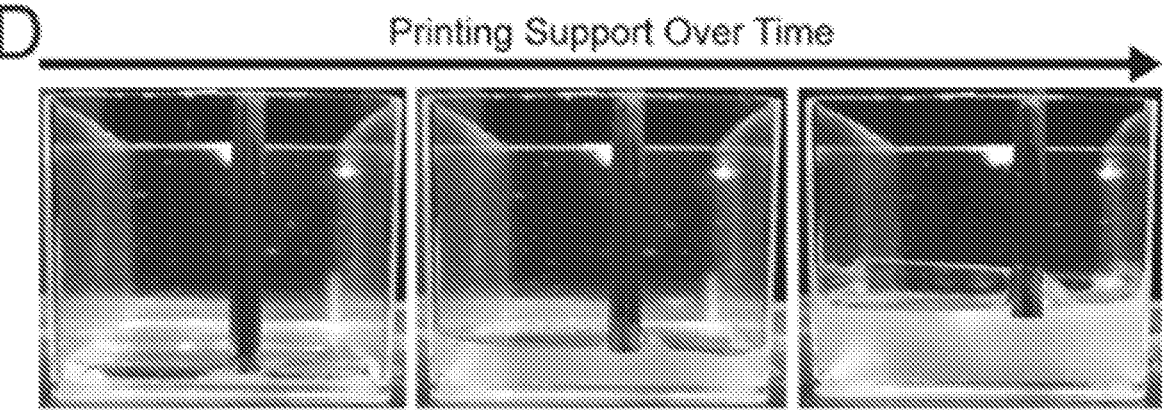
FIG. 2D is a time-lapse images of gelatin microparticle support bath printing.
Figure 2E:
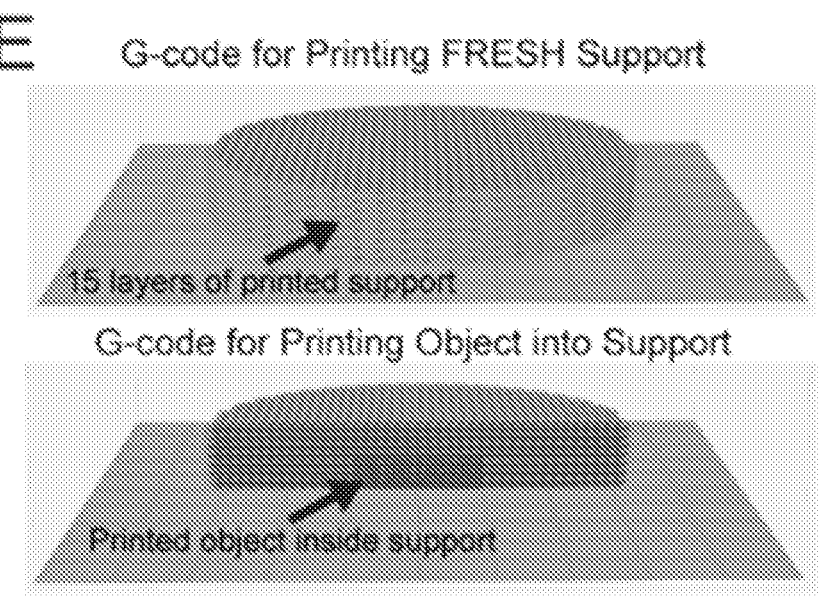
FIG. 2E is G-code for printing the gelatin microparticle support bath (top) and for printing an object inside of the gelatin microparticle support bath (bottom).
Figure 2F:
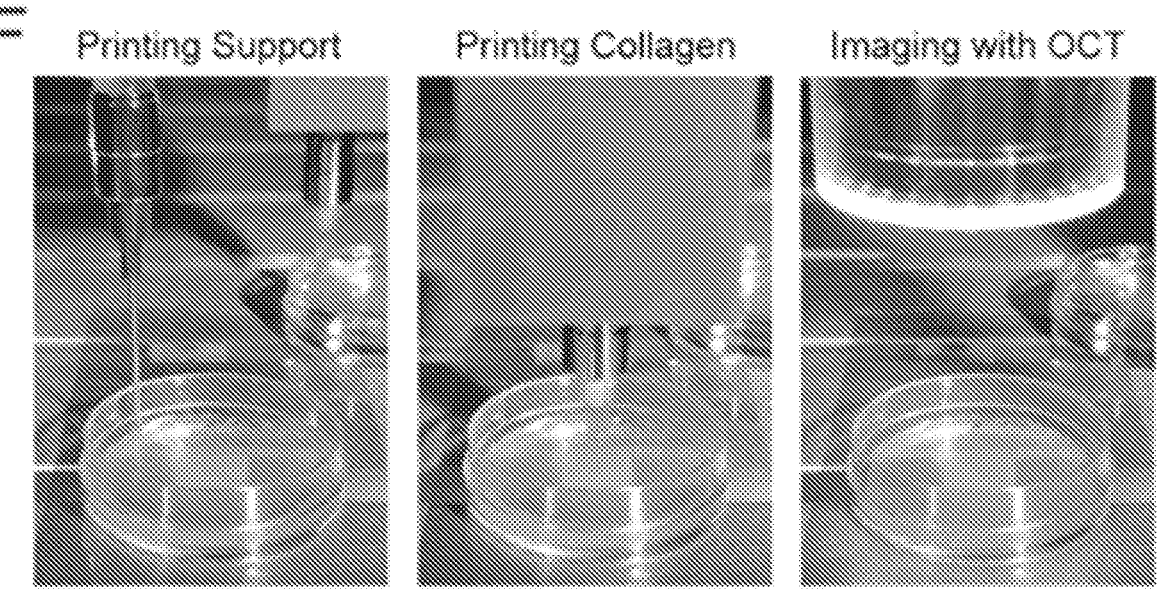
FIG. 2F is stepwise process of printing the support bath, printing a collagen construct inside of the support bath, and OCT image acquisition.
Figure 2H:
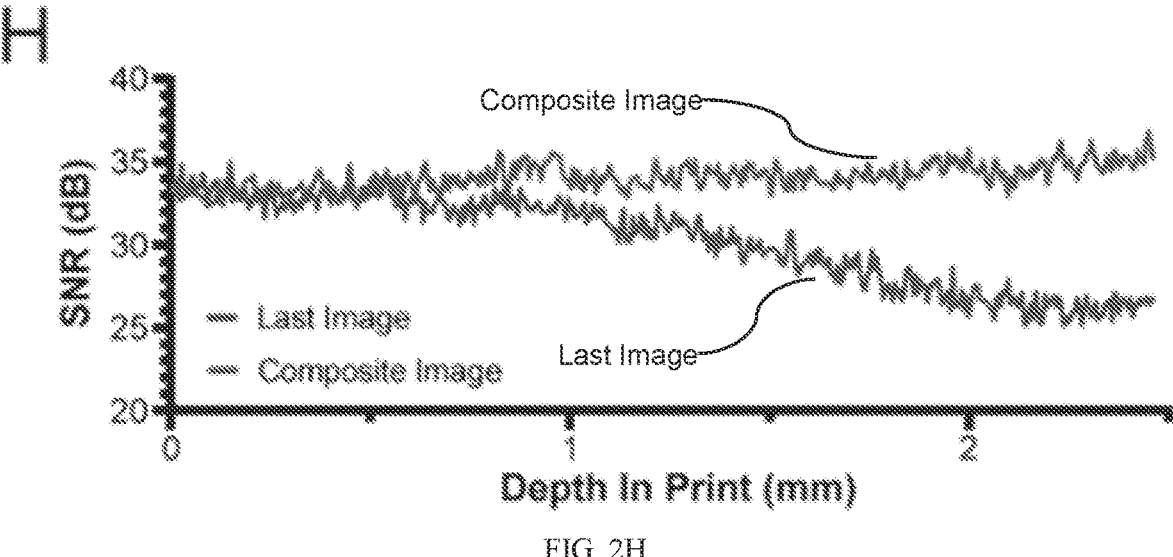
FIG. 2H is OCT SNR for image acquired at the end of print (Last Image) or by compositing in-process OCT images. The two SNR curves are statistically significantly different from each other (p<0.0001, n=9 total measurements from 3 benchmark prints each, Wilcoxon signed-rank test).
Figure 3G:
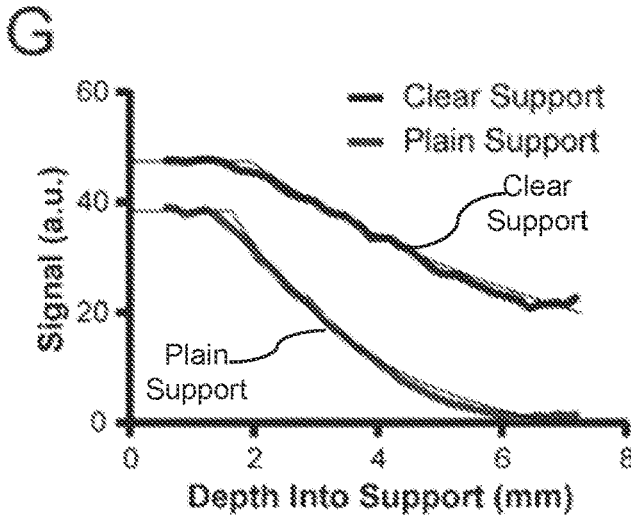
FIG. 3G is exponential fit graph and analysis of OCT signal penetration depth for plain (k=0.4135) and transparent gelatin microparticle support baths (k=0.1709). There is a significant difference between both curves at all depths (p<0.0003, n=4 containers each, two-way ANOVA with Tukey's multiple pair-wise comparisons).
Figure 3H:
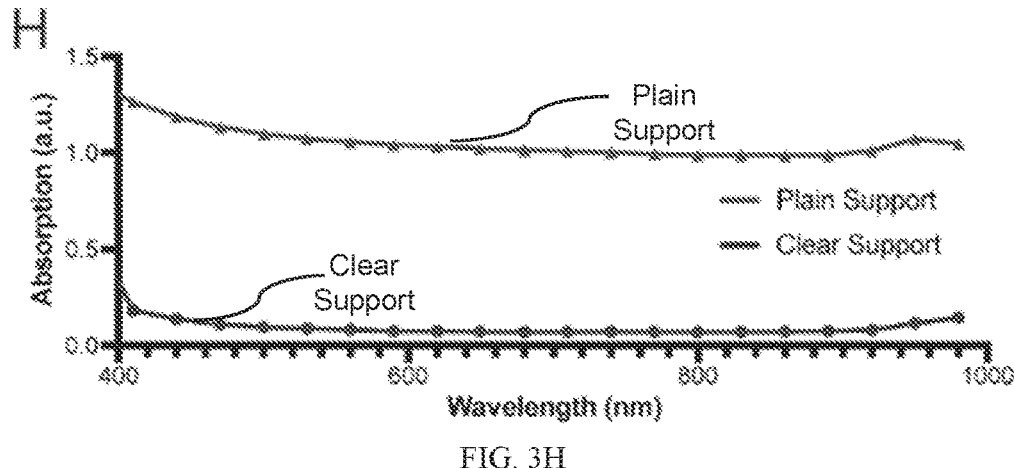
FIG. 3H is an absorption spectra for plain vs. transparent gelatin microparticle support baths. Both curves are significantly different at all wavelengths (p<0.0001, n=6 wells, 2-way ANOVA with Tukey's multiple comparisons).
Figure 3J:
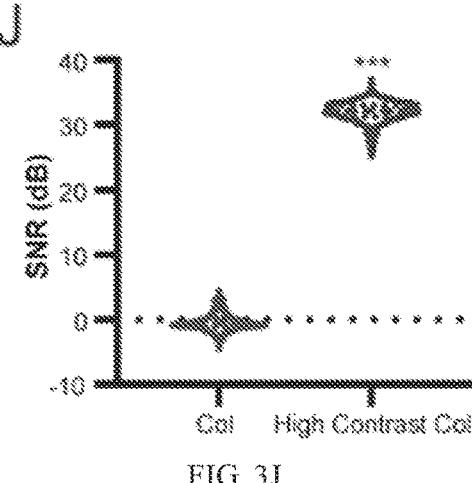
FIG. 3J is an analysis of the OCT SNR between collagen-I and high contrast collagen-I printed in transparent gelatin microparticle support bath (mean±STD.; n=374 measurements along filament, P<0.0001).
Figure 4A:
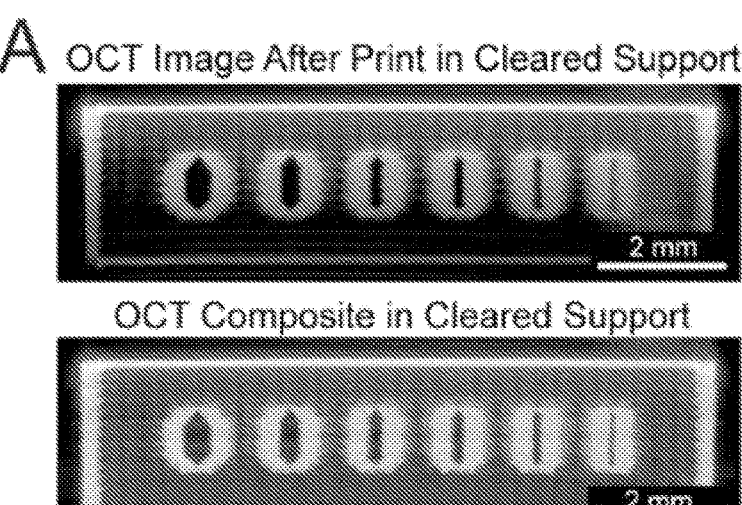
FIG. 4A is a comparison of OCT imaging in transparent gelatin microparticle support bath after print completion (top) or during in-process OCT imaging and composite image creation (bottom).
Figure 4B:
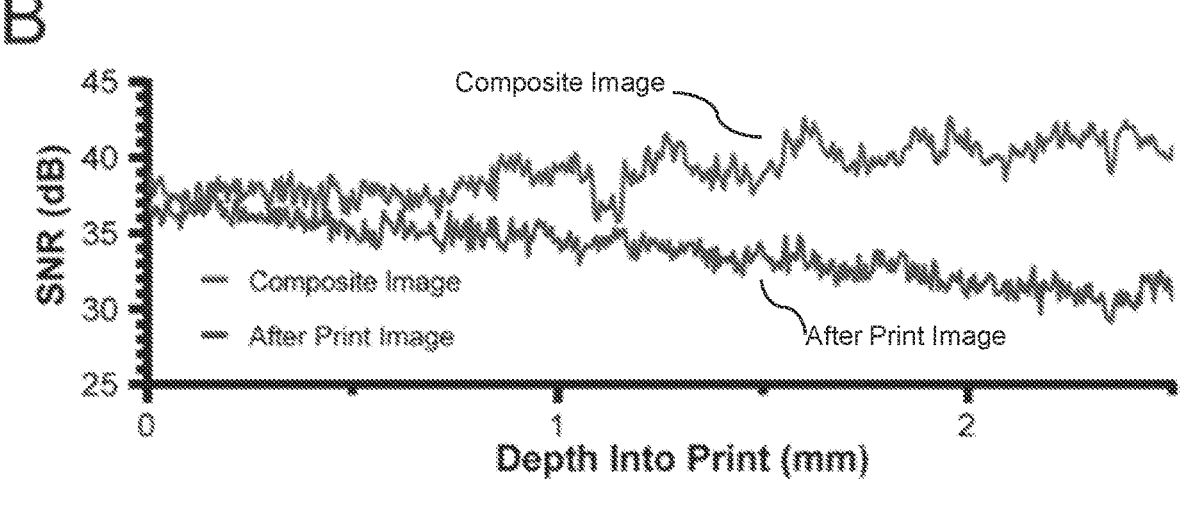
FIG. 4B is an analysis of OCT SNR after print imaging and during in-process imaging and composite image creation throughout the benchmark model depth. The two SNR curves are statistically significantly different from each other (p<0.0001, n=9 total measurements from 3 benchmark prints each, Wilcoxon signed-rank test).
Figure 7A:
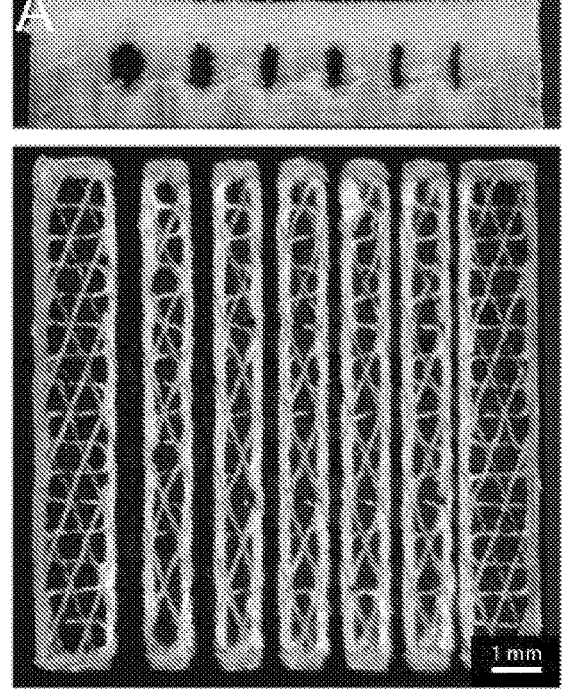
FIG. 7A illustrates an end on (above) and top down (below) view of a benchmark model printed using high contrast collagen I in printed plain gelatin microparticle support, after melting away the support.
Figure 7B:
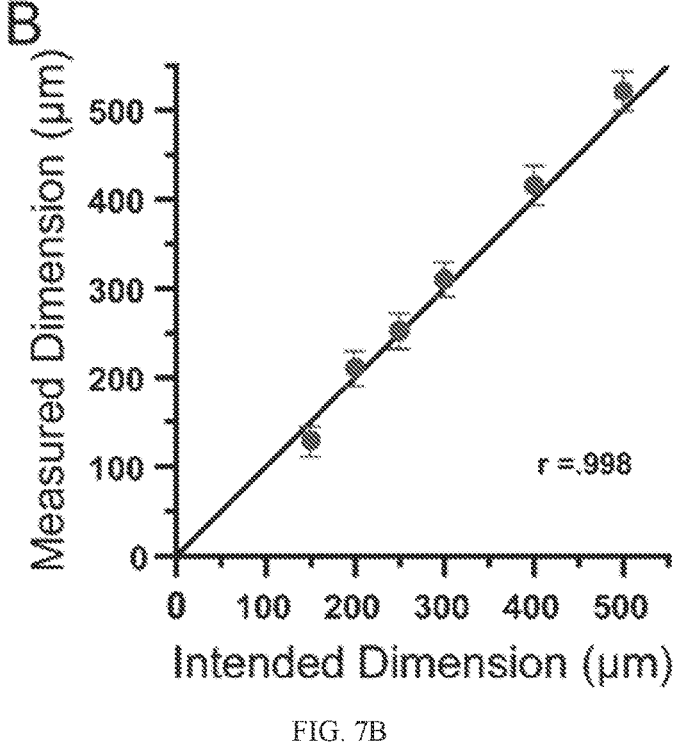
FIG. 7B illustrates a measured versus intended dimensions for the released print RMS error=14.9951 μm (mean±STD; n=1 print with 12978 measurements, Pearson correlation coefficient=0.998).
Figure 9A:
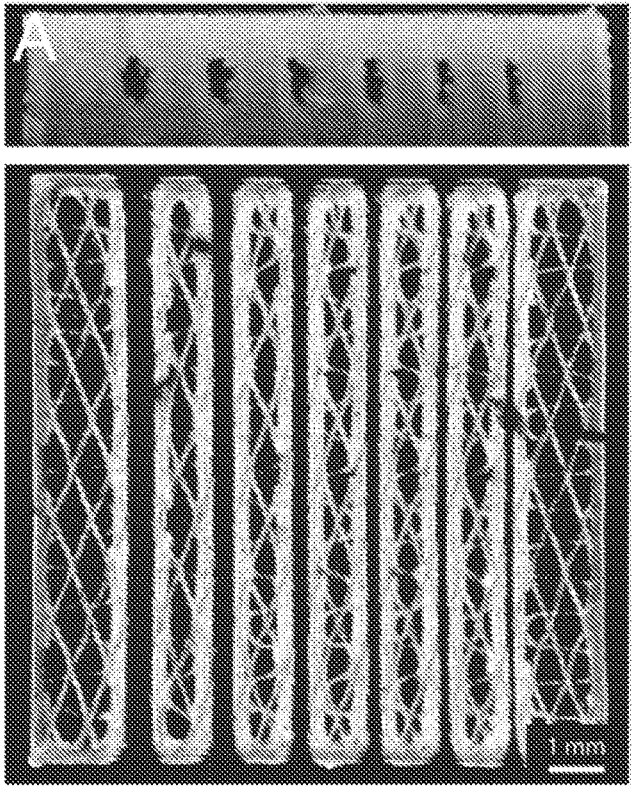
FIG. 9A illustrates an end on (above) and top down (below) view of a benchmark model printed using high contrast collagen I in clear support, after melting away the support.
Figure 9B:
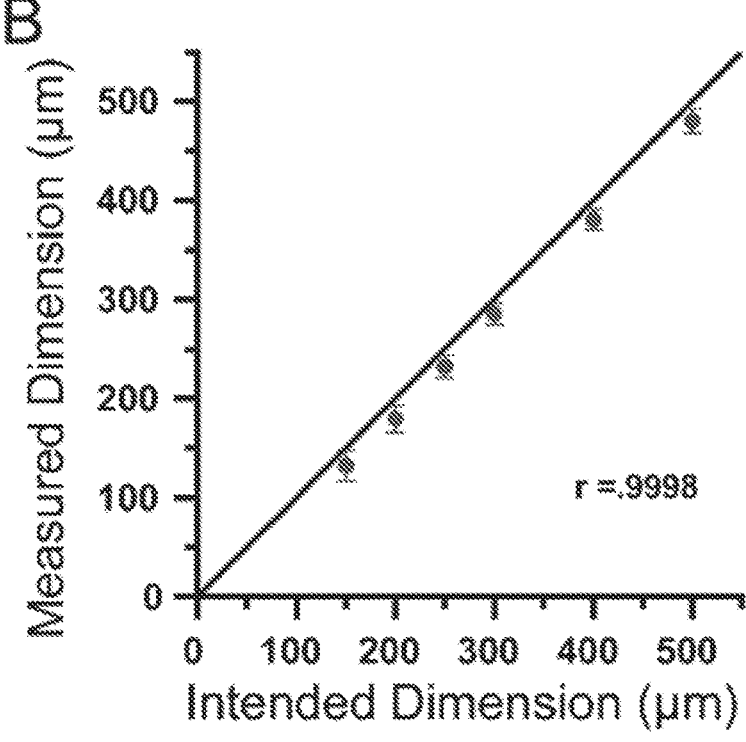
FIG. 9B illustrates measured versus intended dimensions for the released print RMS error=18.2884 μm (mean±STD; n=1 print with 9936 measurements, Pearson correlation coefficient=0.9998).
Figure 11A:
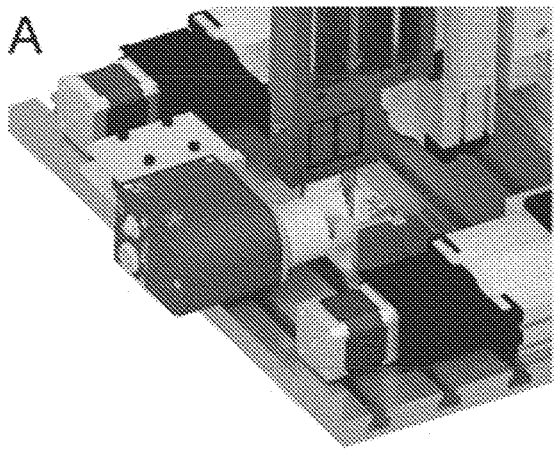
FIG. 11A illustrates an isometric view of the setup showing the OCT scanhead on its side with the objective aimed at a mirror mounted at a 45 degree angle.
Figure 11B:
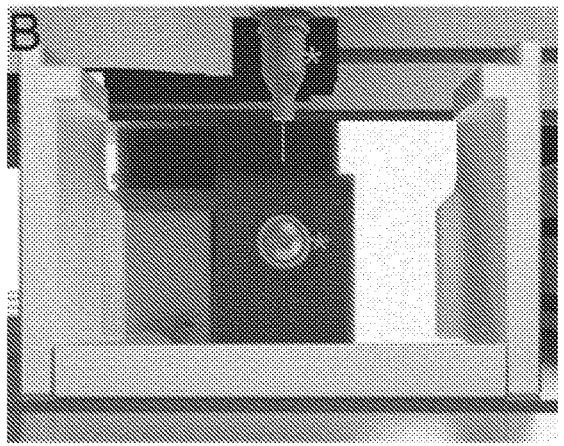
FIG. 11B illustrates a view aligned with the OCT objective aimed at the mirror. The needle seen above can be viewed end on in the mirror.
Figure 11C:
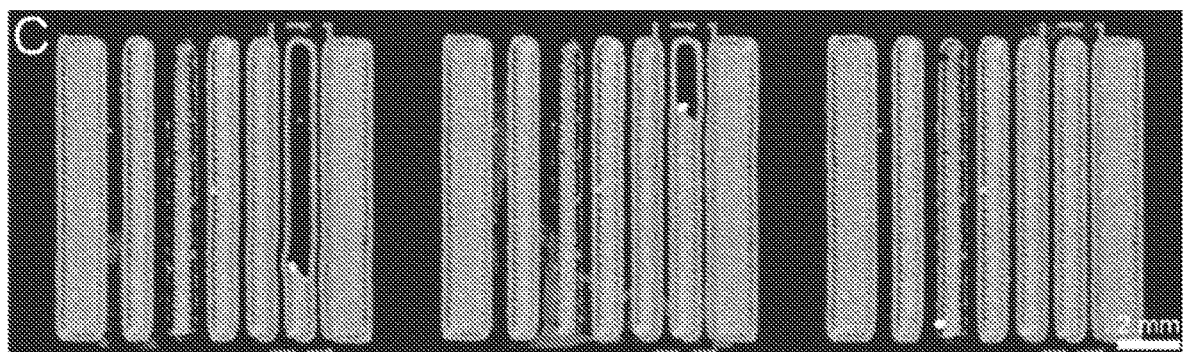
FIG. 11C illustrates a time-lapse representation of OCT images acquired during printing. The region bounded by the dashed rectangle is actively being printed.
Figure 11D:
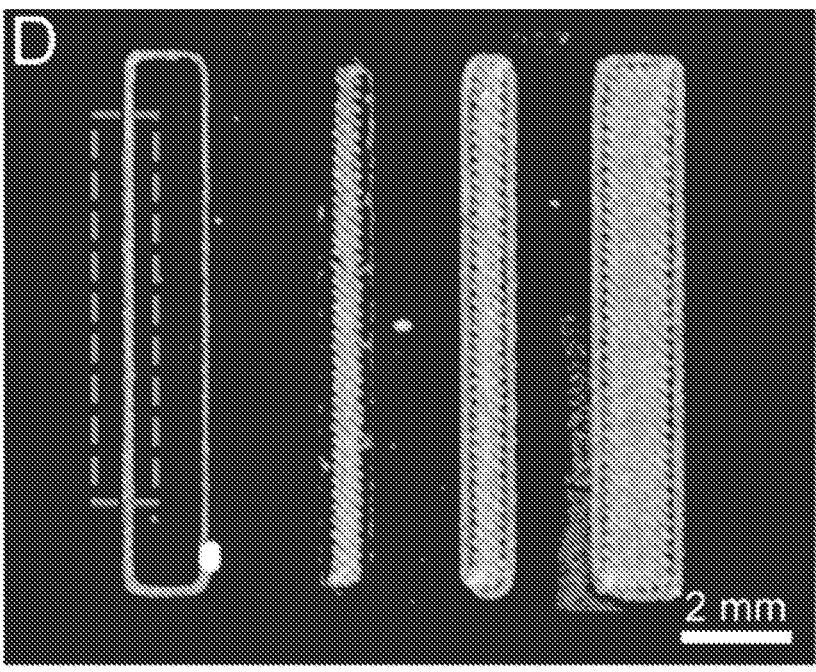
FIG. 11D illustrates imaging with the OCT allows for measurements of features, such as walls and filaments, as they are being assembled.
Figure 11E:
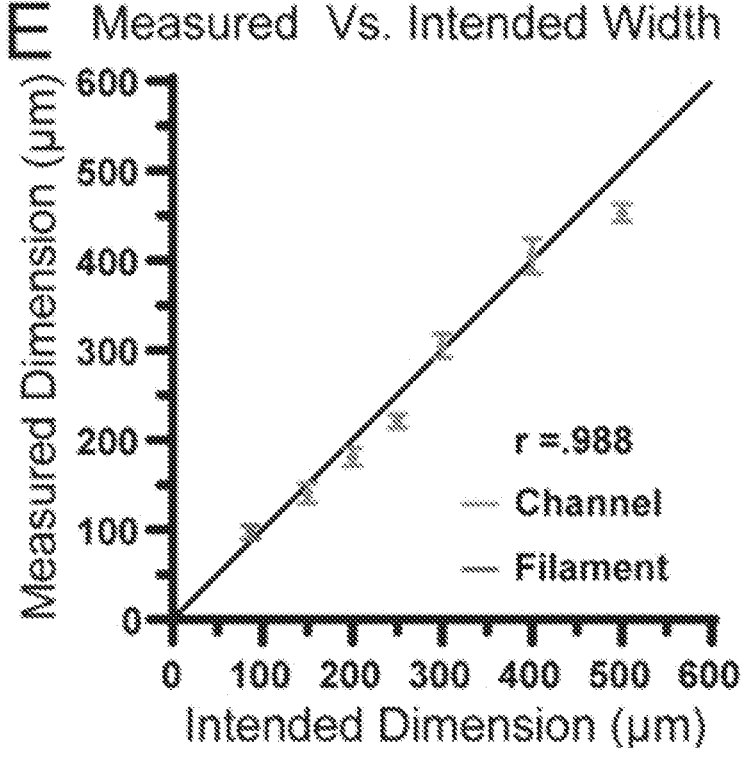
FIG. 11E illustrates a graph that shows using the images acquired while printing measurements can be taken to verify the dimensions RMS error=22.7909 μm (mean±STD; n=467 measurements of one channel/filament, Pearson correlation coefficient=0.988).

Statistical and graphical analyses were performed using Prism 9 (GraphPad) software and Excel (Microsoft v16). Statistical tests were chosen based on the experimental sample size, distribution, and data requirements. For comparison of SNR between benchmark models in plain gelatin microparticle support bath, gelatin, and water Wilcoxon paired signed-rank tests were used as illustrated in FIG. 1I. For analysis of measured width of a benchmark imaged in water the Pearson correlation coefficient was calculated as illustrated in FIG. 1J. For comparison of SNR between benchmark models in plain support using plain and high contrast collagen Wilcoxon paired signed-rank tests were used as illustrated in FIG. 2B. For comparison of SNR between last image and composite image of benchmark models in plain support using high contrast collagen Wilcoxon paired signed-rank tests were used as illustrated in FIG. 2H. For comparison of embedded and released dimensions of benchmarks printed in plain support Student's two-tailed unpaired t test was used as illustrated in FIGS. 2J to 2L). For comparison of OCT signal in plain and transparent gelatin microparticle support bath at all depths 2-way ANOVA with Tukey's multiple comparisons was used as illustrated in FIG. 3G. For comparison of absorbance in plain and transparent gelatin microparticle support bath at all depths 2-way ANOVA with Tukey's multiple comparisons was used as illustrated in FIG. 3H. For comparison of SNR of plain collagen and high contrast collagen in clear gelatin microparticle support bath Student's two-tailed unpaired t test was used as illustrated in FIG. 3J. For comparison of SNR between last image and composite image of benchmark models in clear gelatin microparticle support bath using high contrast collagen Wilcoxon paired signed-rank tests were used as illustrated in FIG. 4B. For analysis of measured width of a benchmark printed in printed support after release the Pearson correlation coefficient was calculated as illustrated in FIG. 7B. For analysis of measured width of a benchmark printed in clear gelatin microparticle support bath after release the Pearson correlation coefficient was calculated as illustrated in FIG. 9B. Preparation of figures and visuals was completed in Adobe Photoshop and Illustrator CS6 and CC. OCT images were edited in Fiji (ImageJ NIH) and Imaris 9.5.1 (Bitplane). 3D Reconstruction of OCT images was completed using 3D Slicer (http://www.slicer.org/). Gauging was accomplished using Cloud- Compare (http://www.cloudcompare.org/). Advanced image analysis and quantification was performed in MATLAB (Mathworks).

Example 1: High-Performance Bioprinter

Figure 1B:
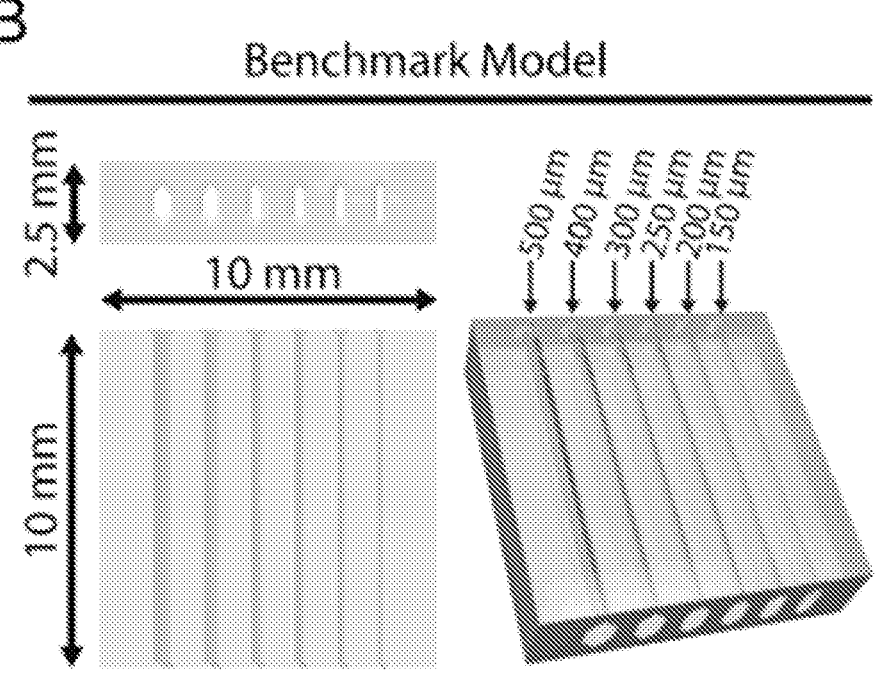
FIG. 1B is benchmark model with internal channels of varying widths to test printer performance, resolution capabilities, and imaging quality.
Figure 1C:
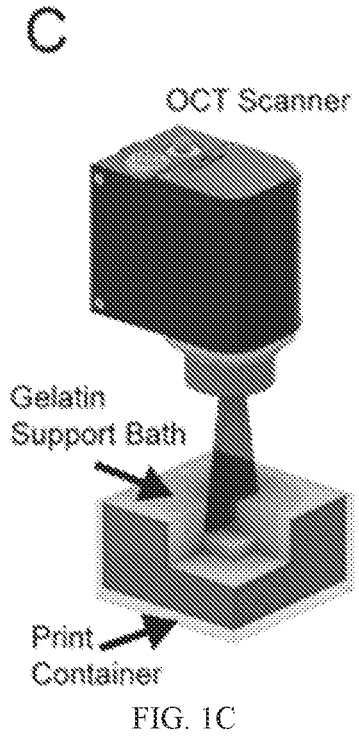
FIG. 1C is an example rendering of OCT imaging of a FRESH printed construct within the gelatin microparticle support bath.
Figure 1D:
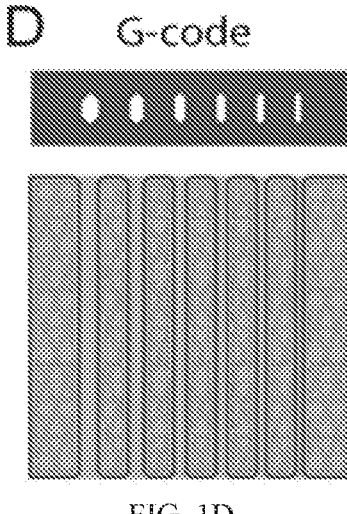
FIG. 1D is G-code 3D printer pathing of benchmark model channel cross section.
Figure 1E:
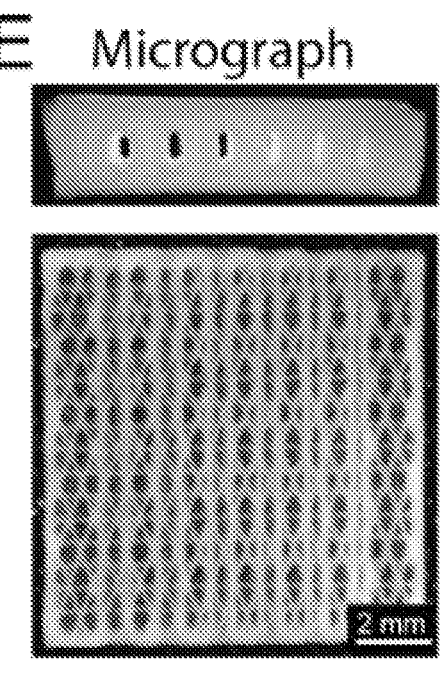
FIG. 1E is a photomicrograph of the benchmark model FRESH printed from collagen-I showing end on and top-down views.

A high-performance bioprinter with a dedicated OCT scan head for in-process imaging and validation to ensure that the specifications of our bioprinter did not limit our printing capabilities was developed as shown in FIGS. 1A and FIGS. 6A-C. In addition to the OCT scan head, the bioprinter incorporated two Replistruder syringe pump extruders and utilizes a gantry configuration of four high-precision stages with positional accuracy of 8 microns over their full 100 mm travel. To assess our printing resolution and OCT imaging capabilities, a benchmark model with both positive (regions of solid material) and negative (regions devoid of material) features were developed covering three orders-of-magnitude from 10 mm down to 100 µm, and six open channels ranging from 500 µm down to 150 µm in width as shown in FIG. 1B. This benchmark was imaged with the integrated OCT scan head during and after printing, and while embedded in the FRESH gelatin microparticle support bath as shown in FIG. 1C as well as in other media such as solidified gelatin and water. Before printing, the benchmark model was sliced into layer-by-layer G-code instructions for our bioprinter to execute as illustrated in FIG. 1D. The benchmark model was FRESH printed from a collagen type I and imaged via brightfield photography after melting and removal of the gelatin microparticle support bath as illustrated in FIG. 1E. The G-code features (infill) and channels from FIG. 1D were qualitatively well recapitulated, with all channels visibly open.

Figure 1F:
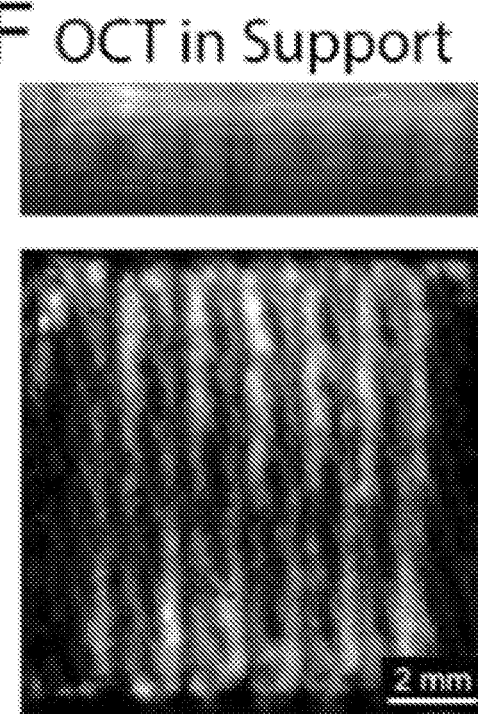
FIG. 1F is OCT imaging of the benchmark model in the gelatin microparticle support bath.

Next, the performance of the OCT imaging system was evaluated with the FRESH printed benchmark model in either the FRESH gelatin microparticle support bath, melted and resolidified gelatin, or water. An OCT image of the benchmark model was captured while it was still embedded in the highly light-scattering gelatin microparticle support bath as shown in FIG. 1F. The outlines of larger features and the channels are visible, but the fidelity of the image was not desirable. To reduce the support bath opacity, we melted and resolidified the gelatin microparticles and captured another OCT image of the benchmark model as shown in FIG. 1G. In this image more of the benchmark model's G-code features and the channel lumens can be clearly identified, but the signal decays throughout the depth of the print such that the bottom layers cannot be resolved to a desired level. The gelatin was removed and an OCT image of the benchmark model was captured while submerged in water as illustrated in FIG. 1H. In this image all the channels and features of the G-code are resolved throughout the depth of the print. A side-by-side comparison for the benchmark imaged in the support bath, resolidified gelatin, and water highlights the major scattering effects of the medium on the OCT quality. To quantify the signal quality of the OCT images acquired in different media as illustrated in FIG. 1F to FIG. 1H, the signal to noise ratio (SNR) formula was used.

SNR Formula $$SNR(dB) = 10\log_{10}\left(\left(\frac{\mu_{Sig} - \mu_{BG}}{\sigma_{BG}}\right)^2\right)$$

where $\mu_{Sig}$ is the average of the signal, $\mu_{BG}$ is the average of the background, and $\sigma_{BG}$ is the standard deviation of the background.

Figure 1K:
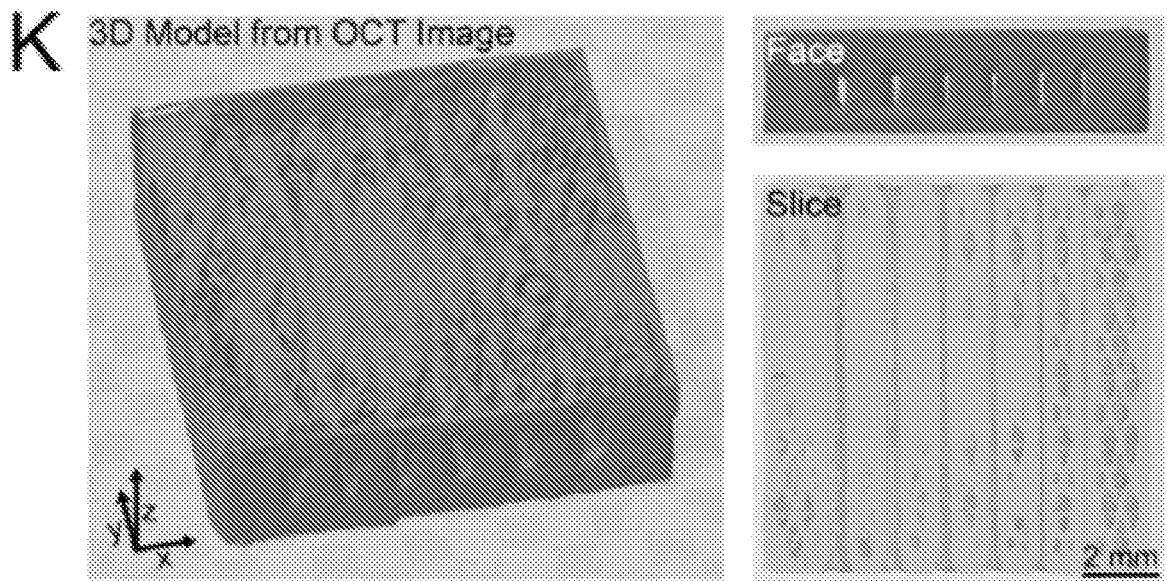
FIG. 1K is 3D OCT image data showing the full reconstruction, an end on view, and a cross-section through the internal channels.

This analysis shows a linear decay in SNR with an average 6.41 dB higher SNR in water compared to embedded in gelatin and an average 9.38 dB higher SNR in water compared to embedded in the gelatin microparticle support bath as illustrated in FIG. 1I. Since the SNR of the benchmark imaged with OCT in water as illustrated in FIG. 1H was sufficiently high, all channel widths were measured using a custom MATLAB image analysis script. The root mean squared (RMS) error of the measured width from the intended width for all channels was 12.52 μm and the Pearson correlation coefficient between measured and intended width was 0.9989 as illustrated in FIG. 1J. In addition to measuring individual channels, the 3D nature of the OCT images enabled use of segmentation to build a 3D reconstruction of the printed benchmark model as illustrated in FIG. 1K. The face-on and top-down views on the right in FIG. 1K show the infill pattern as well as the channels. The isometric view of the bottom layers on the left in FIG. 1K shows that the decay in SNR as illustrated in FIG. 1I can create difficulties when segmenting the full print, resulting in an incomplete reconstruction. Together these data show the accuracy of the bioprinter and that OCT can be a useful tool for analyzing FRESH printed constructs, but that signal quality in the gelatin microparticle support bath can still be improved for in-process imaging.

Example 2: Enhanced In-Process Image Quality with High Contrast Collagen and Sequential Imaging OCT images were acquired while printed objects are still embedded within the gelatin microparticle support bath as illustrated in FIG. 1F but it was desired to improve the image quality to those images of the objects submerged in water. To increase the OCT signal and improve contrast a contrast agent of titanium dioxide ($TiO_2$) was incorporate into the base collagen bioink. For example, 250 parts per million (PPM) of $TiO_2$ were incorporated into our collagen type I inks (high contrast collagen), which is a biologically safe concentration for drugs and medical devices according to the FDA (FDA e-CFR § 73.1575, § 73.3126). For comparison, a benchmark model was printed using our plain collagen and another with the high contrast collagen. The two benchmark models were imaged while still embedded at the end of printing as illustrated in FIG. 2A. This revealed a clear qualitative difference in the imaging quality throughout the full depth. To quantify the signal improvement, we again calculated SNR for both printed benchmarks which showed an average 3.78 dB increase in SNR with the TiO2 added across all depths as illustrated in FIG. 2B.

While increasing contrast of the collagen bioink improved SNR, it was observed that OCT image quality can also be improved by decreasing the scattering and absorption of the gelatin microparticle support bath. One approach to do this was to decrease the thickness of gelatin microparticle support bath that must be imaged through. To do this the gelatin microparticle support bath was printed using a second printhead as illustrated in FIG. 2C, which filled the dish over time as illustrated in FIG. 2D. Additionally, a custom MATLAB code was developed that interleaves the G-code for the gelatin microparticle support bath as illustrated in FIG. 2E at the top and the G-code for the object to be printed as illustrated in FIG. 2E at the bottom to allow for printing within the printed gelatin microparticle support bath. In sequential steps, the gelatin microparticle support bath is first deposited as illustrated in FIG. 2F on the left, then a section of the object is printed with high contrast collagen as illustrated in FIG. 2F in the middle, and finally the OCT scan head is positioned over the print to acquire an image as illustrated in FIG. 2F on the right. Throughout the printing process OCT image stacks of the printed object were acquired at evenly spaced z-height intervals. All of the acquired OCT stacks were then registered in 3D and stitched together to form a complete composite OCT image stack.

Figure 2G:
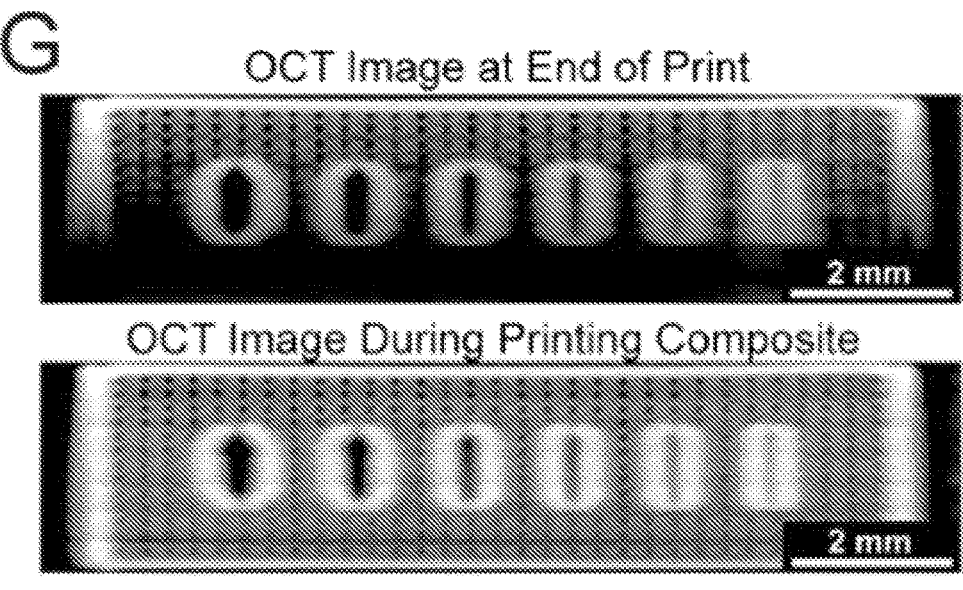
FIG. 2G is OCT imaging performed at the end of the print (top) or intermittently during printing to produce a composite image (bottom).

Comparison of the OCT image acquired at the end of the print as illustrated in FIG. 2G at the top to the composite OCT image resulting from in process OCT imaging as illustrated in FIG. 2G at the bottom shows a significant improvement in image signal quality, specifically as depth increases. By calculating the SNR at depth for the single and composite OCT images as illustrated in FIG. 2H, it was observed that for the composite the SNR no longer linearly decays and by 2 mm in depth the difference in SNR between the two images is up to 10.61 dB.

Figure 2I:
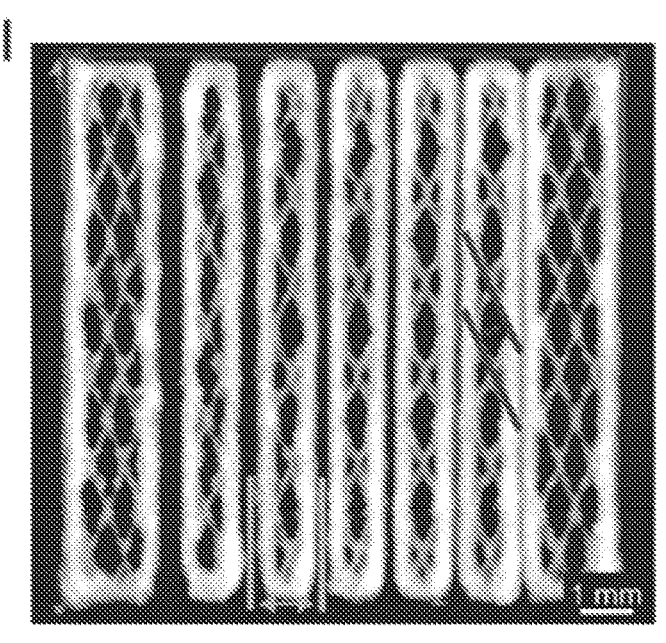
FIG. 2I is a composite OCT cross-section image for evaluation of print fidelity in terms of outer width, channel wall width, and filament spacing.
Figure 2J:
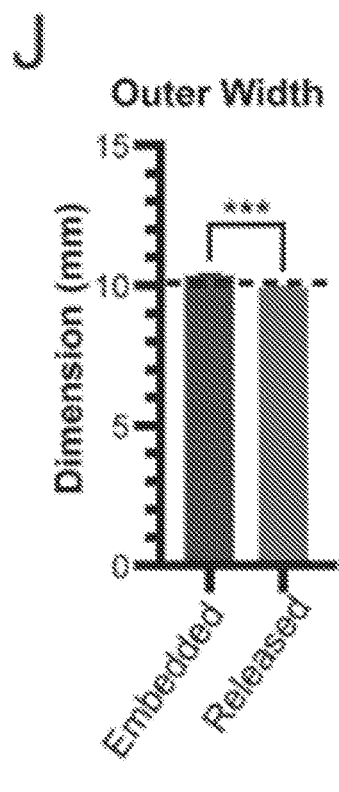
FIG. 2J is OCT measured outer width while the print was embedded in the gelatin microparticle support bath or following print release (mean±STD.; n=3 prints, measurement at every x linescan in yz stack, embedded vs. CAD P=0.0095, Released vs. CAD P=0.0606, Embedded vs. Released P=0.0004). Dashed line represents the 3D model expected value.
Figure 2K:
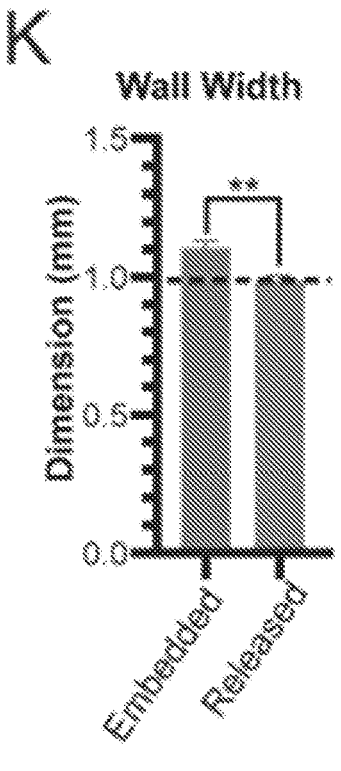
FIG. 2K illustrates a graph of OCT measured wall width while the print was embedded in the gelatin microparticle support bath or following print release (mean±STD.; n=3 prints, highlighted wall measured at every x linescan in yz stack, embedded vs. CAD P=0.0179, Released vs. CAD P=0.3448, Embedded vs. Released P=0.0026).
Figure 2L:
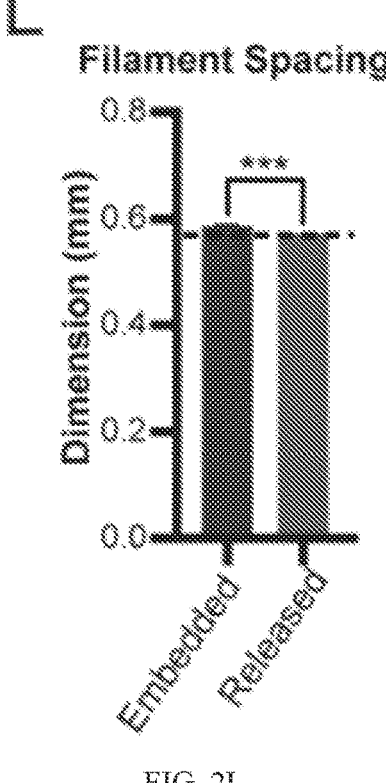
FIG. 2L illustrates a graph of OCT measured filament spacing while the print was embedded in the gelatin microparticle support bath or following print release (mean±STD.; n=3 prints, 12 filaments each, embedded vs. CAD P=0.0418, Released vs. CAD P=0.0002, Embedded vs. Released P=0.0008).

With the increase in SNR provided by high contrast collagen and enhanced OCT image quality due to in process imaging, we can quantitatively measure external and internal features of our prints such as the outer width as illustrated in FIG. 2I and FIG. 2J, the width of the inner walls as illustrated in FIG. 2I and FIG. 2K, and the spacing between filaments as illustrated in FIG. 2I and FIG. 2L. OCT images acquired after release show that printing the gelatin microparticle support bath did not affect the final printed dimensions, with no apparent change in print quality as illustrated in FIG. 7. These results, showing printing of micron scale features with minimal deviation from intended dimensions, demonstrate the high geometric precision and accuracy of the bioprinter and FRESH printing process. They also demonstrate the ability to combine high contrast collagen I bioink, printing of FRESH gelatin microparticle support bath, and sequential OCT imaging for in-process 3D imaging and dimensional analysis.

Figure 3A:
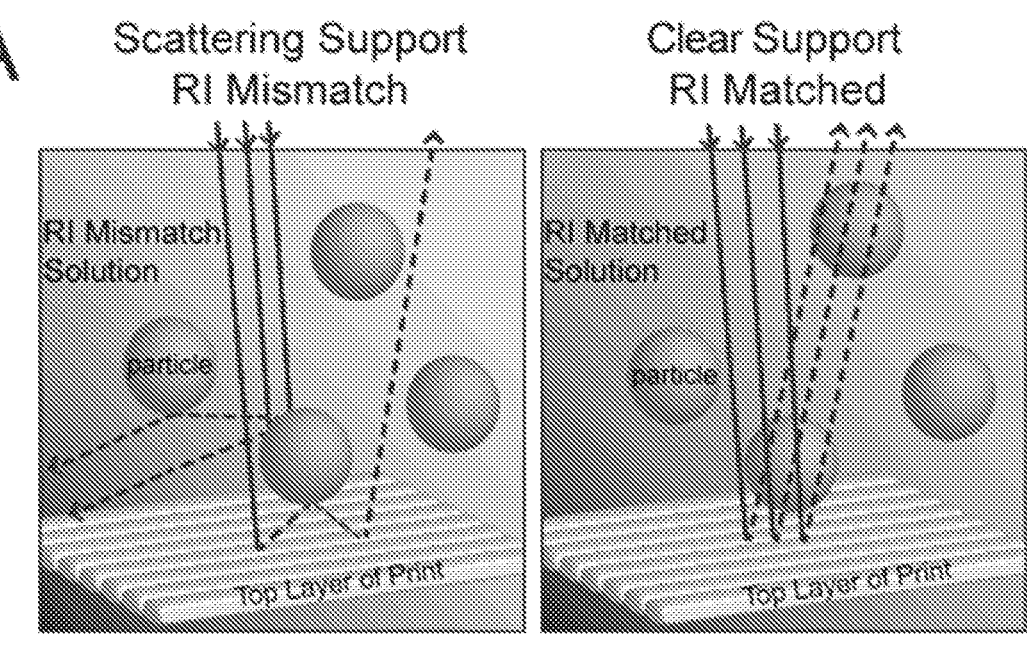
FIG. 3A illustrates a diagram for OCT of FRESH embedded printing where the gelatin microparticle support bath has an opaque appearance due to light scattering from the difference in RI between the particles and fluid phase solution and where the fluid phase RI matches the RI of the particles less light is scattered and absorbed which increases the gelatin microparticle support bath transparency.

Example 3: Increasing Transparency of Gelatin Microparticle Support Bath to Further Improve In-Process Image Quality The opacity of the typical FRESH gelatin microparticle support bath can make it challenging to visualize printed objects during the printing process, and to image prints while embedded. To solve this challenge and further improve OCT image quality, the transparency of the gelatin microparticle support bath was improved by decreasing the light scattering behavior. The majority of the opacity and light scattering for FRESH gelatin microparticles stems from a difference in the refractive indices (RI) of the gelatin microparticles themselves and the medium surrounding the particles. An effective approach to reduce this type of scattering and improve transparency is to match the RI of the surrounding media to the RI of the microparticles as illustrated in FIG. 3A on the right. Due to the FRESH gelatin microparticles inherent opacity when suspended in an aqueous buffer, it was believe that the RI of the microparticles was likely higher than the RI of water. Therefore, the aqueous buffer was initially replaced with a higher RI biologically compatible solution called histopaque (a mixture of polysucrose and sodium diatrizoate). Ideally, as the RI of the surrounding media approaches the RI of the FRESH gelatin microparticles the transparency should increase. However, the RI of the highest concentration of histopaque was 1.367, which was not sufficient to match the RI of the microparticles and only slightly improved transparency. To achieve a higher RI solution, we utilized high concentration polysucrose. However, at the higher concentrations necessary for RI>1.367, the solution viscosity increased considerably, and may be incompatible with the shear stress characteristics required for the FRESH gelatin microparticle support bath. Another component of histopaque, sodium diatrizoate, which is an iodinated x-ray contrast agent was evaluated. Instead of using sodium diatrizoate, which is not iso-osmolar, we chose a non-ionic, iso-osmolar contrast agent with high RI called iodixanol. Iodixanol is also cell and tissue safe, endotoxin free, and comes as a 60% solution in water at a RI of 1.429.

Figure 3B:
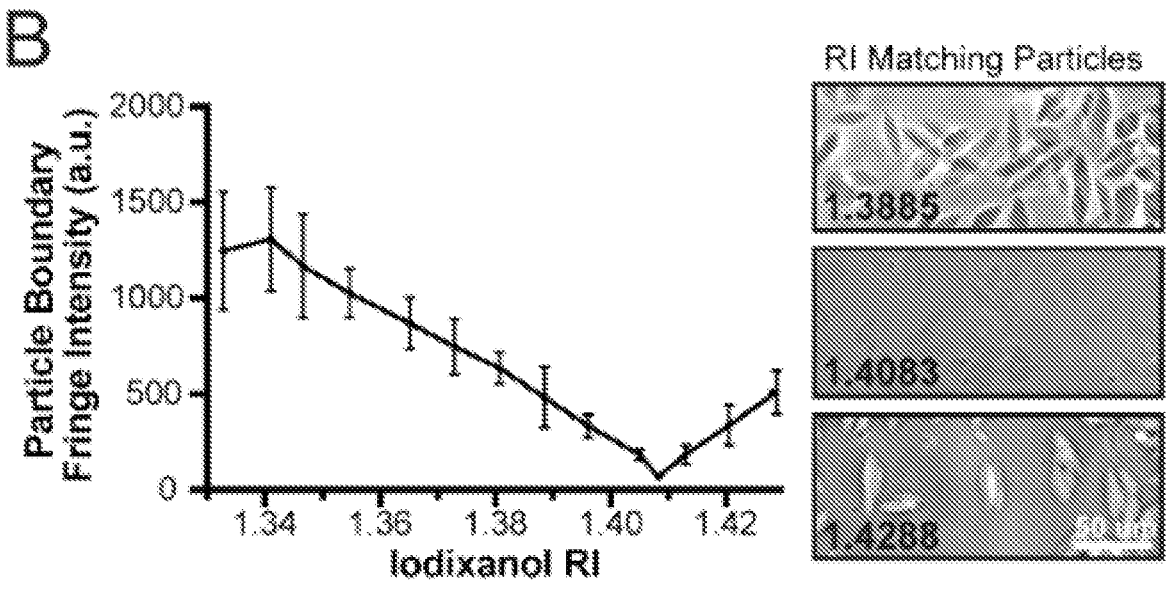
FIG. 3B is an analysis of phase contrast imaging of gelatin microparticles' boundary fringe intensity in solutions of iodixanol. Example images of gelatin microparticles in iodixanol at the RI inflection point.
Figure 3C:
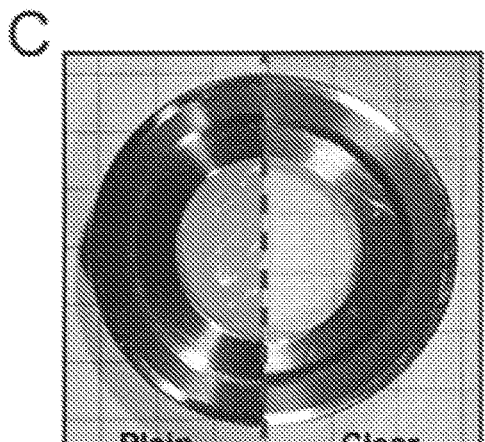
FIG. 3C is an image of a comparison of Plain (left) vs the "clear" (right) gelatin microparticle support bath.
Figure 8A:
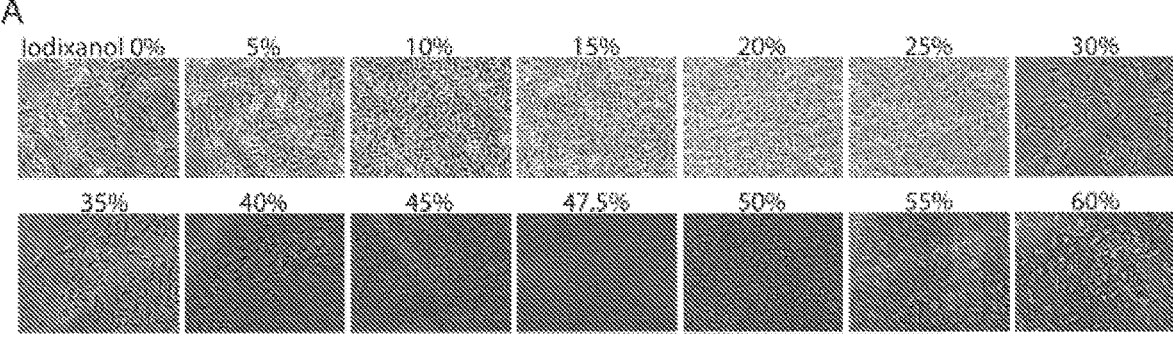
FIG. 8A illustrates gelatin microparticles suspended in concentrations of iodixanol varying from 0% to 60%, with corresponding refractive indices of 1.333 and 1.429.
Figures 8B, 8C:
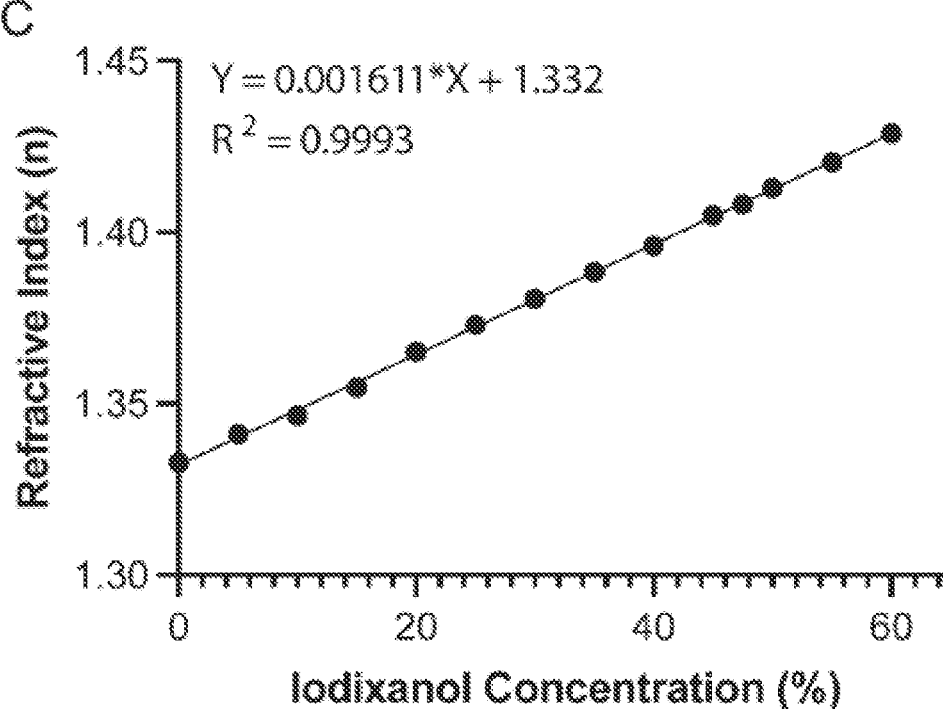
FIG. 8B illustrates a Table of Iodixanol concentrations with corresponding measured refractive indices.
FIG. 8C illustrates a index of refraction versus iodixanol concentration with linear fit.

To find the RI of the gelatin microparticles and achieve a transparent FRESH support bath the gelatin microparticles were placed within increasing concentrations of iodixanol with RI ranging from 1.333 to 1.429 and phase contrast images were captured. By analyzing the fringe boundaries of individual particles within these images as illustrated in FIG. 3B on the left a value of RI=1.4083 was identified, at which the RI of the microparticles and surrounding iodixanol solution are most closely matched. Images of these particles at a RI below and above the identified RI of the particles as illustrated in FIG. 3B on the right (top and bottom) show bright fringes, while at the particle RI as illustrated in FIG. 3B on the right (middle) the particles and fringes are difficult to see as illustrated in FIG. 8A-C. On a macroscale, when the gelatin microparticles are prepared for printing the difference is also visible between the plain support as illustrated in FIG. 3C on the left, which is opaque and blocks the checkered background, and the clear support as illustrated in FIG. 3C on the right, through which the checkered background can easily be seen. While the iodixanol improves clarity of the FRESH gelatin microparticle support bath at visible wavelengths, the clarity of OCT imaging and the image quality (1300 nm light) were also evaluated.

Figure 3D:
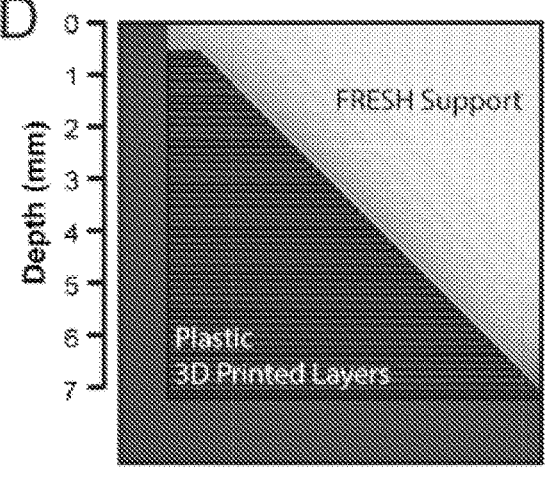
FIG. 3D is a depiction of a sloping 3D printed plastic well designed to determine the OCT penetration depth through gelatin microparticle support bath by visualizing the printed layers throughout the well depth.
Figure 3E:
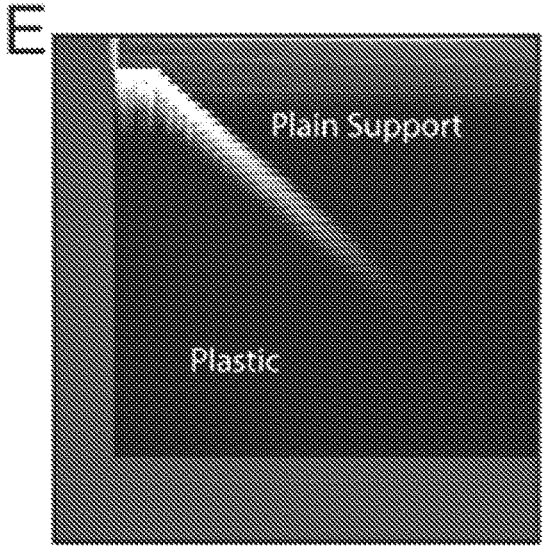
FIG. 3E is an OCT image through plain gelatin microparticle support bath.
Figure 3F:
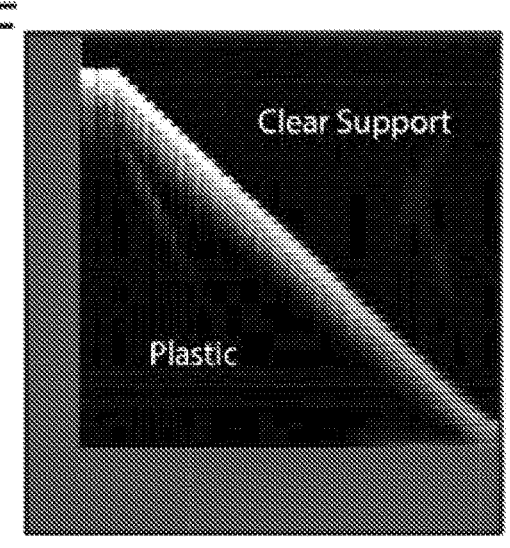
FIG. 3F is an OCT image through transparent gelatin microparticle support bath.
Figure 3I:
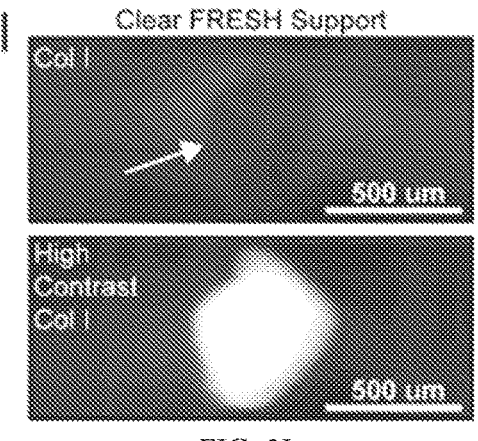
FIG. 3I is an image of FRESH printed collagen-I (top) and high contrast collagen (Col)-I (bottom) filaments printed in transparent gelatin microparticle support bath.

To evaluate OCT imaging performance in the transparent gelatin microparticle support bath a plastic container was 3D printed with a sloping bottom that once filled allows us to image the bottom of the dish through increasing depths of support bath as illustrated in FIG. 3D. When imaging through the plain gelatin microparticle support bath the image quality degrades after a few millimeters (e.g., 2-3 mm) and the deepest parts of the dish cannot be resolved as illustrated in FIG. 3E. In contrast, when imaging through the clear gelatin microparticle support bath the image quality is improved, and the deepest part of the dish can be resolved well as illustrated in FIG. 3F. The differences in signal intensity were quantified between these two conditions as illustrated in FIG. 3G. Both display an exponential decay, with the signal in the plain support decaying faster (k=0.4135) than in the clear gelatin microparticle support bath (k=0.1709). To further characterize the clear gelatin microparticle support bath's improved transparency throughout the visible-IR wavelengths of light we performed an absorbance spectral analysis as illustrated in FIG. 3H. There was an average decrease in absorption of 91.4±2.3% (mean±std) from the plain to the clear gelatin microparticle support bath. Finally, to determine the OCT SNR of the collagen I inks within the clear gelatin microparticle support bath filaments (400 μm diameter) were printed of plain collagen as illustrated in FIG. 3I at the top and high contrast collagen as illustrated in FIG. 3I at the bottom. The high contrast collagen showed a significant increase in SNR compared to plain collagen as illustrated in FIG. 3J. The combined increase in signal from the high contrast collagen and the improved transparency of the clear gelatin microparticle support bath can enable for the direct visualization of an embedded object during the printing process. Together these data show that the transparency of the gelatin microparticle support bath and the OCT image quality of embedded collagen constructs can be significantly improved by reducing light scattering using a RI matching approach and adding a contrast agent to the collagen I bioink.

Example 4: In-Process Imaging and Quality Assessment of FRESH Printed Constructs Experiment four focuses on the impact from the combine effect of a transparent support bath, high contrast collagen (structure material), and sequential OCT imaging throughout the printing process. Custom MATLAB code was used to generate G-code for the support bath printing and in-process OCT imaging was adapted to utilize sequential OCT imaging during the printing process, without printing support. In a container pre-filled with transparent gelatin microparticle support bath, several layers of the benchmark model were printed, then the OCT scan head was moved into position and the image was acquired; this process was repeated until the entire benchmark model was complete as illustrated in FIG. 4A. The images were combined into a composite as illustrated in the bottom of FIG. 4A, which resulted in mitigation of the linear decay in SNR when only acquiring the OCT image at print completion as illustrated in FIG. 4B. This recapitulates the results with high contrast collagen-I and printed plain gelatin microparticle support bath as illustrated in FIG. 2H, but with substantially higher SNR values, resulting in further improved image quality. Additionally, the printed benchmark model was released from the transparent gelatin microparticle support bath and OCT images were acquired to confirm that clearing with iodixanol did not affect the final printed dimensions or interfere with print release. The print released well and had no noticeable changes in terms of print quality or fidelity as illustrated in FIG. 9.

Figure 4C:
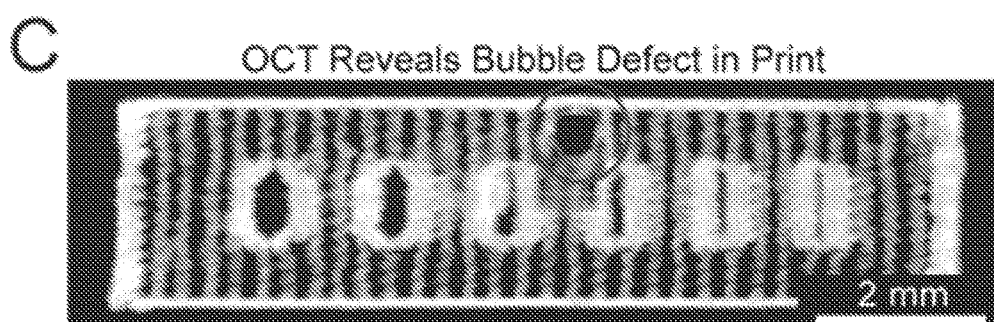
FIG. 4C is an image that show that in-process OCT imaging reveals an internal print defect due to an introduced air bubble.
Figure 4D:
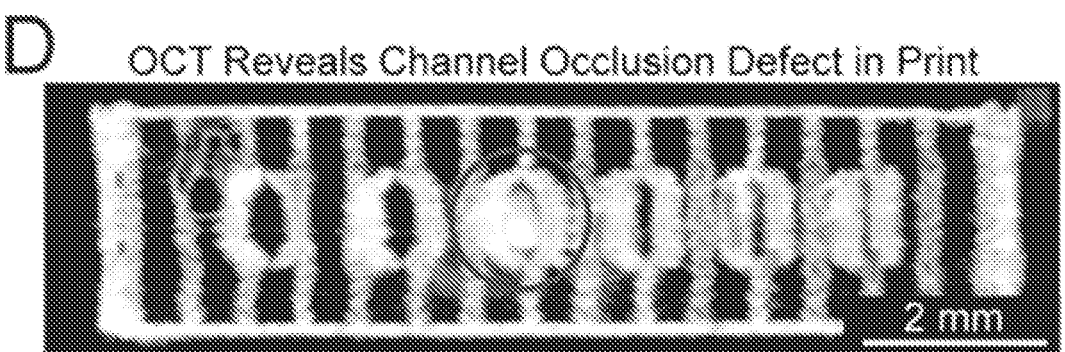
FIG. 4D is an image illustrating an unintentional channel occlusion detected by in-process OCT imaging.
Figure 4E:
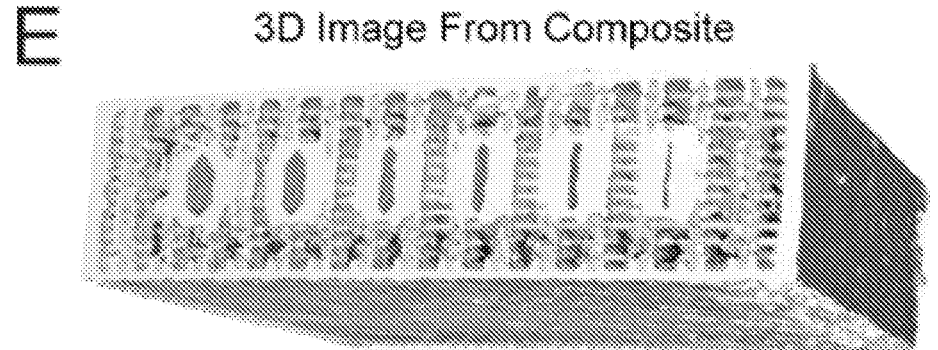
FIG. 4E is a 3D reconstruction using composite OCT image of a benchmark model.
Figure 4F:
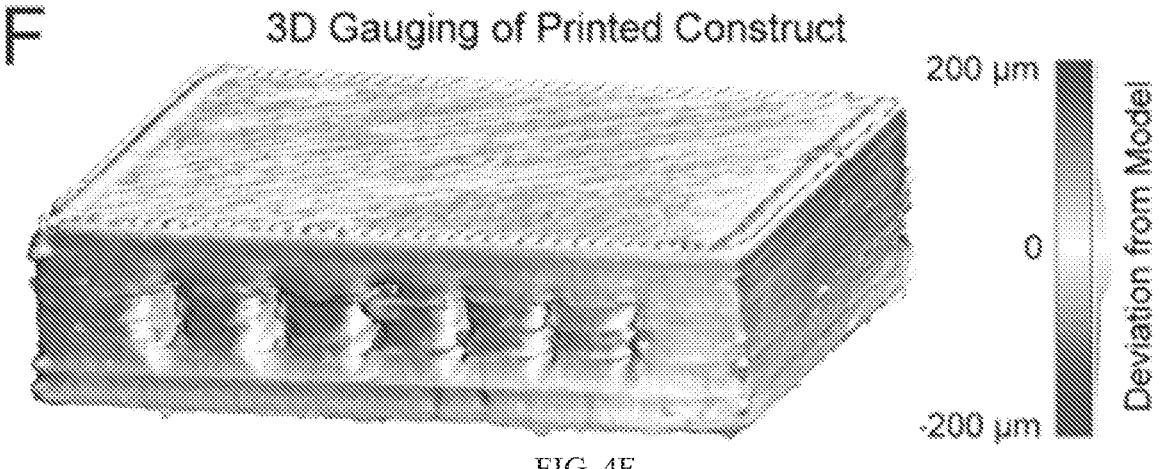
FIG. 4F is a quantitative 3D gauging analysis to detect deviations in the reconstruction of the printed model compared to the computer-generated model.

In terms of print validation, the combination of high contrast collagen and transparent gelatin microparticle support bath enables measurement of the quality of the prints and also the ability to detect errors and optionally correct the errors. For example, internal void space errors, such as a bubble trapped in the top of a print can be detected as illustrated in FIG. 4C. As most of the image below the bubble was captured before the bubble existed, the composite image does not show the bubble casting a large shadow on features beneath it, as would be the case with a single image acquired at the end of a print. We can also detect over extrusion errors, such as the blockage of a channel as illustrated in FIG. 4D. Due to the high SNR throughout the composite image automatic image segmentation can be used to produce a full 3D reconstruction of the printed object as illustrated in FIG. 4E. Using gauging software the surfaces of two 3D meshes were compared to measure deviations of the 3D reconstruction from the original 3D model, which for the benchmark model shown was an average of −20.9±60.4 μm as illustrated in FIG. 4E. While this 3D reconstruction was built using OCT images captured sequentially, time-lapse OCT imaging while the construct is being printed is also possible.

Figure 4G:
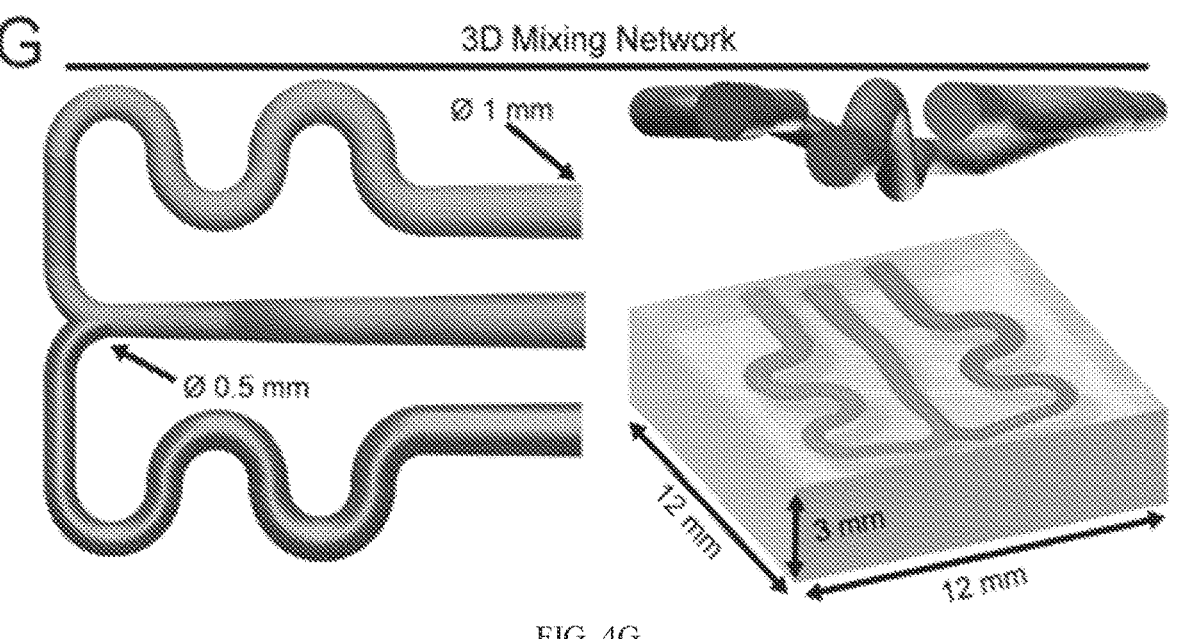
FIG. 4G is 3D renders of a computer-generated mixing network to highlight FRESH printing and OCT capabilities.
Figure 4H:
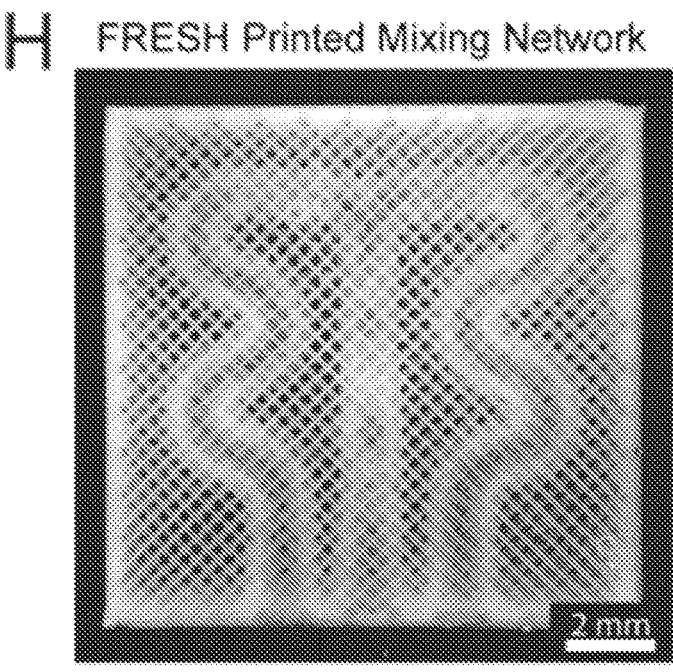
FIG. 4H is a top-down view of a FRESH printed 3D mixing network from collagen-I.
Figure 4I:
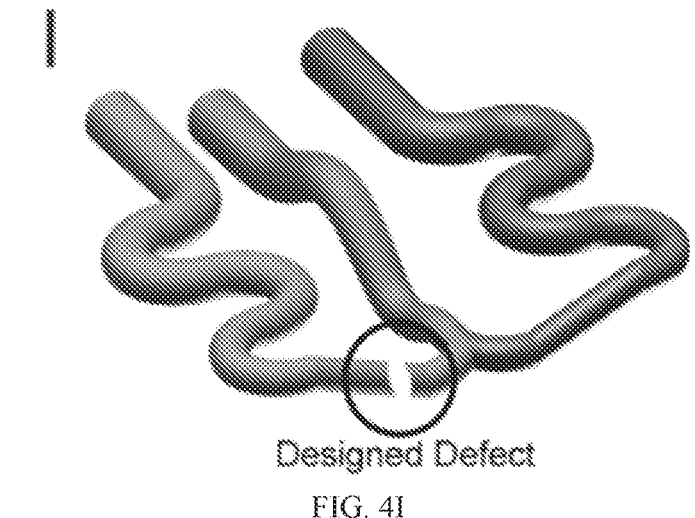
FIG. 4I is illustrates an engineered defect that was designed into the mixing network to mimic a blockage to test the OCT detection capabilities.
Figure 4J:
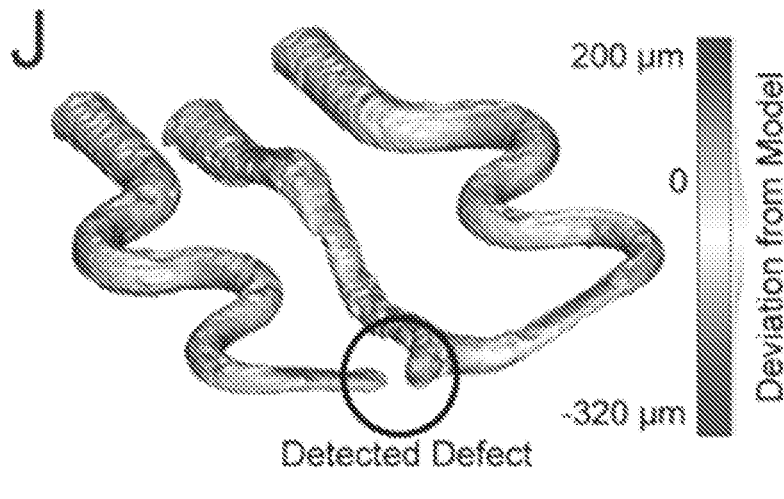
FIG. 4J illustrates quantitative 3D gauging analysis revealing a void at the location of the engineered defect.
Figure 4K:
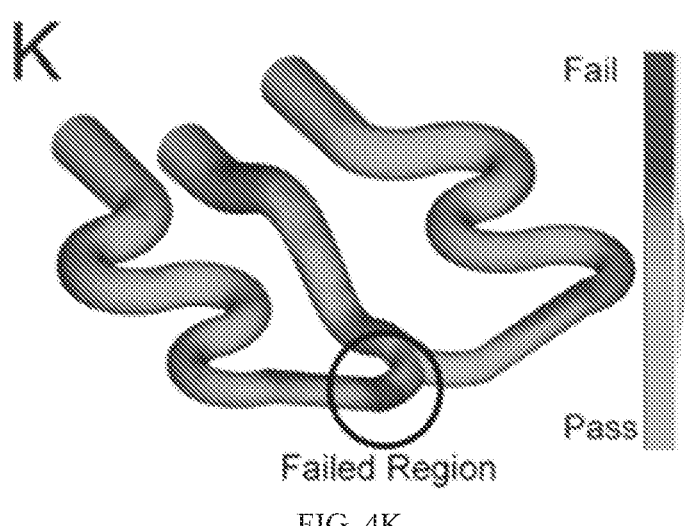
FIG. 4K illustrates a pass-fail deviation analysis was implemented to compare the printed and imaged 3D volume to the expected computer model for validation or rejection of the final printed construct.

In addition to detecting simple defects, in-process imaging can be used to systematically identify deviations in printed objects that would result in a loss of function. To demonstrate this, a 3D microfluidic mixing network was designed with features varying in all 3 axes and channels ranging in size from 0.5 to 1 mm within a collagen block as illustrated in FIG. 4G. A photomicrograph of the mixing network 3D printed using high contrast collagen shows recapitulation of the intended geometry in a top-down view as illustrated in FIG. 4H. To test our detection capabilities, we introduced a defect into the mixing network model that would block flow from one side of the network, rendering it non-functional as illustrated in FIG. 4I. After printing and imaging in the transparent gelatin microparticle support bath the OCT images were inverted to extract the internal network shape and quantitative 3D gauging was performed. Overall, the designed-defect mixing network showed an average deviation of –53.4±62.1 μm, and clearly revealed the presence of the defect as illustrated in FIG. 4J. By implementing a pass/fail criterion on the size of positive deviation we can automate the detection of this defect as illustrated in FIG. 4K. These data show that the combination of a transparent gelatin microparticle support bath, high contrast collagen bioink, and sequential imaging provides a high SNR that makes possible in-process monitoring and 3D error detection in an embedded bioprinting approach.

Example 5: In-Process Imaging and Dimensional Accuracy Analysis of Medical Imaging Derived Medical Imaging Models Example 5 was performed to determine if the sequential OCT images works with models derived from patient-specific medical imaging. In order to perform this test, a gelatin microparticle support bath, a high contrast collagen, and in-process imaging was used on such models. One anatomic structure printed was a segment of the vestibular apparatus from the inner ear as illustrated in FIG. 5A. This shape inherently stress-tests the printing and imaging systems due to the patent semicircular canals oriented in three mutually orthogonal planes. The embedded print was clearly visible and showed good reproduction of the model including patency of the three semicircular canals as illustrated in FIG. 5A. The 3D OCT image composited from multiple images acquired during printing showed high signal quality throughout the print depth as illustrated in FIG. 5A. This allowed generation of a 3D surface which reveals both external and internal features, with inner channels approximately 325 μm in diameter. To evaluate the overall print fidelity, we performed gauging analysis which showed an average deviation of 17.8±43.3 μm as illustrated in FIG. 5A. This small average deviation highlights the capabilities of the bioprinter and demonstrates that FRESH printing with transparent gelatin microparticle support bath is not affected by the clearing process.

Another organic structure that was printed was a segment of the circle of Willis, the arterial system of the brain as illustrated in FIG. 5B. An unsupported patent vascular network, like this, would be challenging to 3D bioprint without FRESH and would be almost impossible to image in an aqueous solution or air. This model demonstrates the ability to print, image, and segment tortuous patent tubular structures with high-aspect-ratio (long and thin) and out of plane features (posterior cerebral arteries). The embedded print showed good visual reproduction of the model including the vertebral arteries, the anterior spinal artery, the middle cerebral arteries, and the posterior and anterior cerebral arteries as illustrated in FIG. 5B. The 3D OCT composite image had a high SNR and no decrease in signal throughout the depth of the print. Automatic segmentation and 3D surface creation revealed the presence of both external and internal features, with the patent inner lumen of the right vertebral artery measuring approximately 450 μm in diameter. Gauging of the 3D surfaces compared to the original 3D CAD model created from medical imaging data showed a vascular network with an average deviation of 21.8±53.2 μm. The in-process imaging approach therefore allows for both the validation of print geometry and dimensions as well as the confirmation of a patent vascular network which is essential for perfusion applications.

Figure 5C:
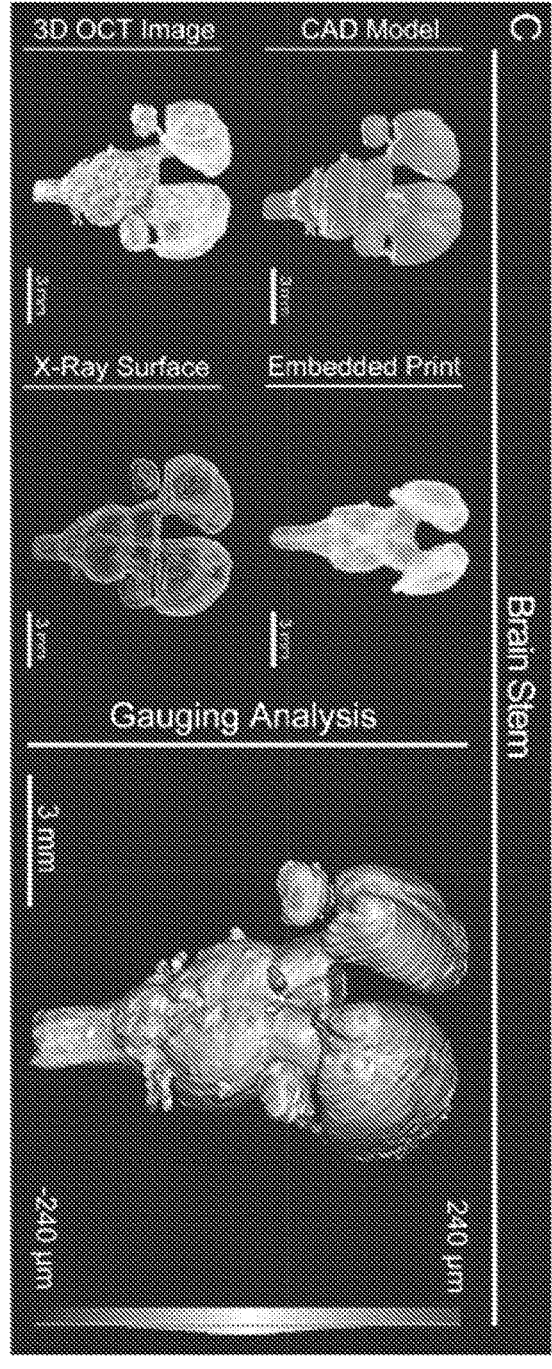
FIG. 5C illustrates a Brain Stem with thalami, midbrain, pons, medulla and cranial nerves.

Another organic structure that was printed was the brainstem as illustrated in FIG. 5C. This model can be difficult to print due to the extremely small size of the cranial nerves (~250 μm in diameter) and their close proximity to each other (~200 μm center to center) as well as the subtle surface features on the thalami (~300 μm in depth). Visually, the embedded construct was easy to see and displayed good visual reproduction of the CAD model including the thalami, the midbrain, the pons, and the medulla. The 3D OCT composited image again displayed high signal quality throughout the depth of the print with no apparent loss of signal. The 3D surface model exhibited both external and internal features, though in this case the internal surface is just an offset shell from the external surface, as the actual brain stem is not hollow. Gauging of the 3D surfaces revealed reproduction of the cranial nerves and subtle surface features of the thalami with an overall average deviation of 21.4±63.1 μm which is an order of magnitude below the smallest distinct feature within the model.

Figure 5D:
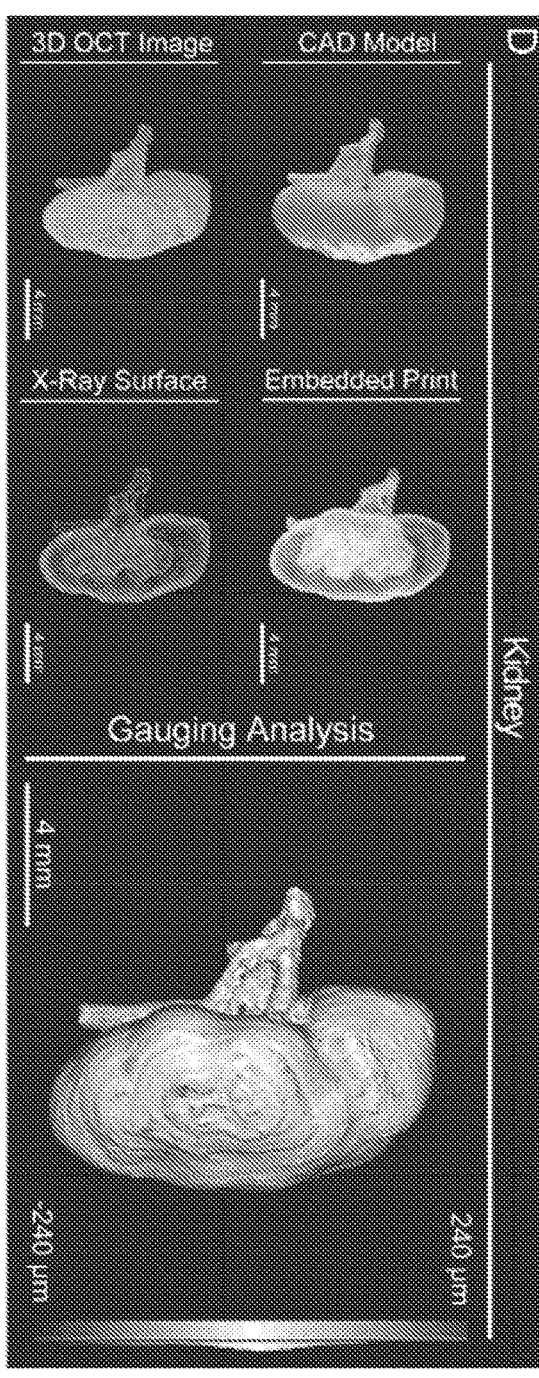
FIG. 5D illustrates a Kidney demonstrating internal calyces, ureter, and blood supply.
Figure 6A:
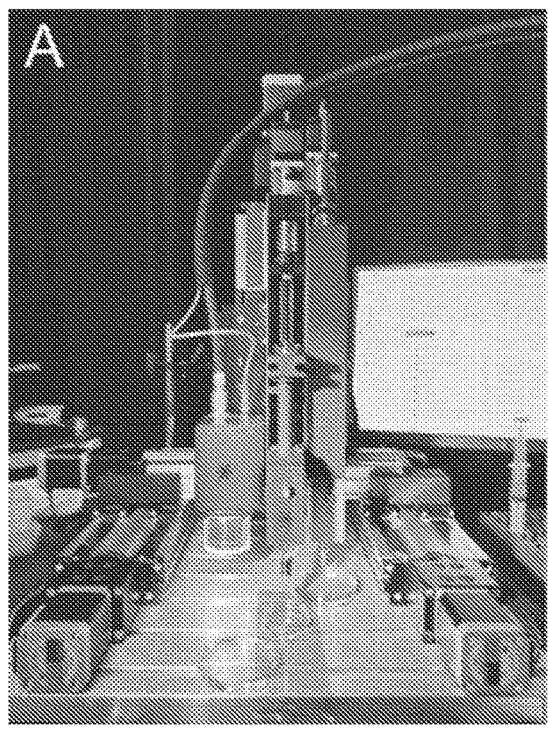
FIG. 6A illustrates a front on view showing the gantry configuration of the printer with OCT scan head on the left and two Replistruder syringe pumps on the right.
Figure 6B:
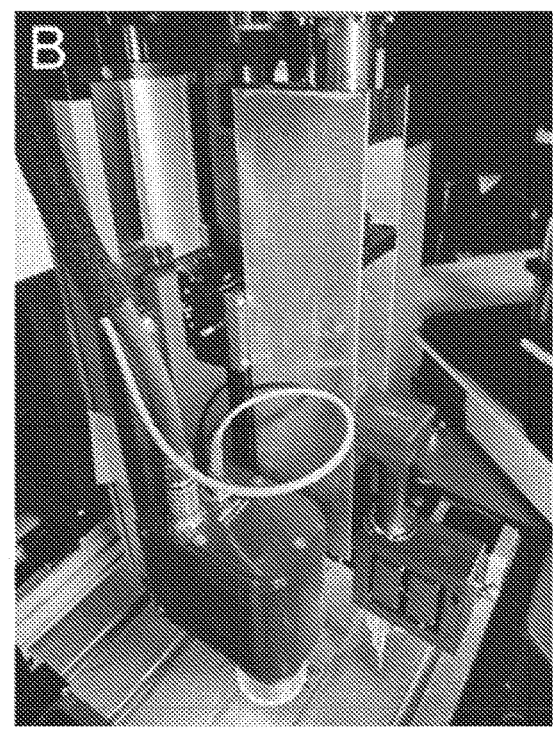
FIG. 6B is an angled view showing the z stage, a closer view of the OCT scan head and the Replistruder assigned to gelatin microparticle support printing.
Figure 6C:
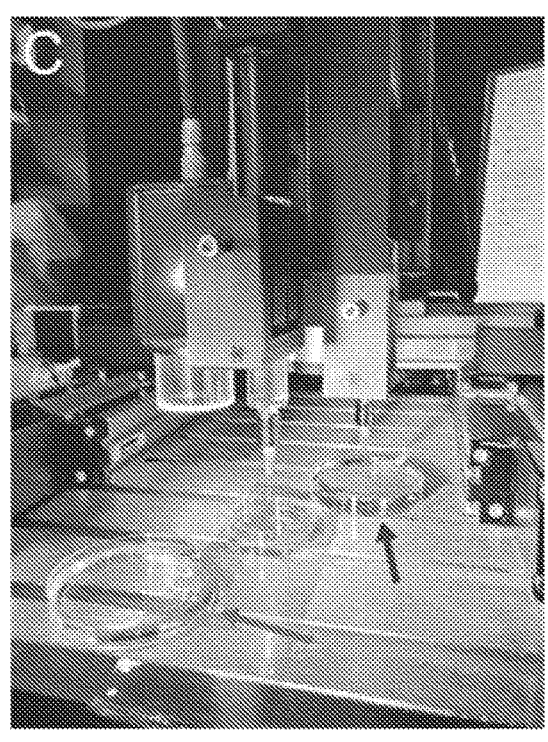
FIG. 6C is a right side view of the printer set up for printing high contrast collagen I in printed plain gelatin support. The left syringe is filled with gelatin microparticle support bath and the right with high contrast collagen I. The dishes diagonally aligned are filled with 50 mM HEPES (left) and DI water (right).

Another organic structure that was printed was a kidney as illustrated in FIG. 5D. This structure illustrated the ability to print and image complex internal structures (renal artery, renal vein, calyces, and ureter) within a larger construct (the whole kidney). While embedded, the print showed good visual reproduction of the CAD model with visible internal calyces as well as the renal artery, vein, and ureter. The 3D OCT image composited from multiple in-process images showed a high SNR throughout the depth of the print and even revealed the individual filaments that comprised the layers of the print. The 3D OCT data was then segmented into a 3D surface which enhanced visualization of both external and internal features, including the open ureter, with an inner diameter of approximately 300 μm. Lastly, we evaluated the OCT performance and print fidelity via gauging analysis which revealed recapitulation of the complex internal structures and an average deviation of –23.8±121.9 μm. In all, the various organic tissues printed here highlight the ability to fabricate accurate ECM scaffolds from medical imaging data using FRESH bioprinting and demonstrate the high-resolution 3D imaging achieved using in-process OCT acquisition in combination with a high contrast structure material and a transparent support material.

In FRESH printing the similar RI of collagen and gelatin can make them difficult to differentiate using OCT, as there is limited reflection at the boundary between the printed filaments and the transparent gelatin microparticle support material. The addition of $TiO_2$ as a contrast agent significantly improved the signal to noise ratio of the bioinks. While the addition of an exogenous contrast agent could affect the print characteristics of the bioink in some way, since the amount of $TiO_2$ added to the bioinks was so small, no change in gelation or printability was observed. Further, $TiO_2$ does not create a barrier for clinical translation and has the benefit of being classified by the FDA as bio-inert and safe for use in drugs and medical devices (FDA e-CFR § 73.1575, § 73.3126).

Example 6

Figure 14A:
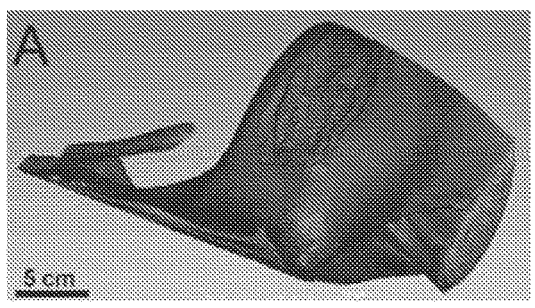
FIG. 14A is imaging data from a computed tomography scan shows a wound in a dog's rear right leg (red bounding box).
Figure 14B:
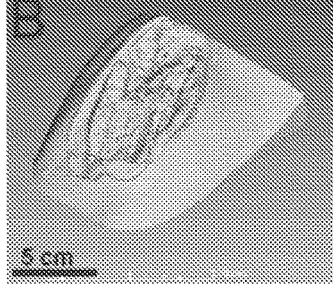
FIG. 14B illustrates image segmentation to build a model of the wound bed.
Figure 14C:
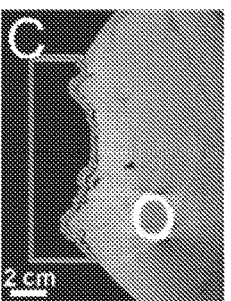
FIG. 14C illustrates a shell is built using the surface of the wound.
Figure 14D:
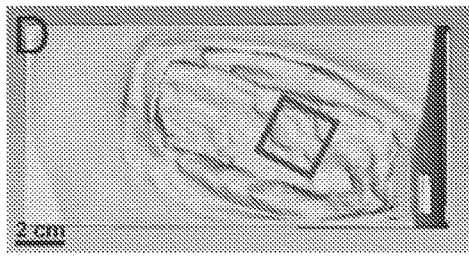
FIG. 14D illustrates a section of the wound filling model is selected.
Figure 14E:
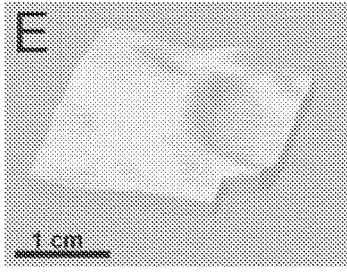
FIG. 14E illustrates an isometric view of the section of wound filling patch, with a registration notch.
Figure 14F:
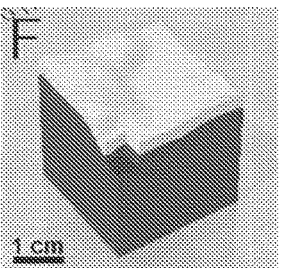
FIG. 14F illustrates a matching section of the wound is isolated and is conformal with the wound filling patch.
Figure 14G:
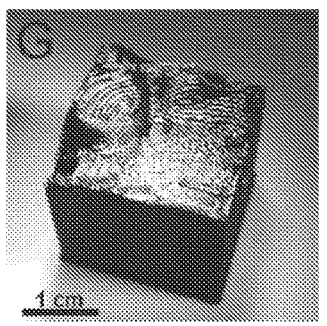
FIG. 14G illustrates a wound model printed in black plastic.
Figure 14H:
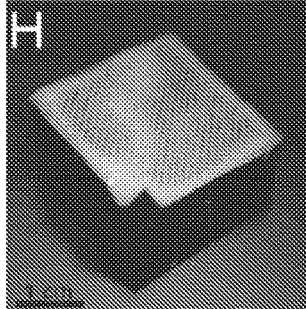
FIG. 14H illustrates the wound filling patch in FIG. 14E printed using decellularized urinary bladder matrix ECM bioink. It is conformal with the wound model from FIG. 14G.
Figure 14I:
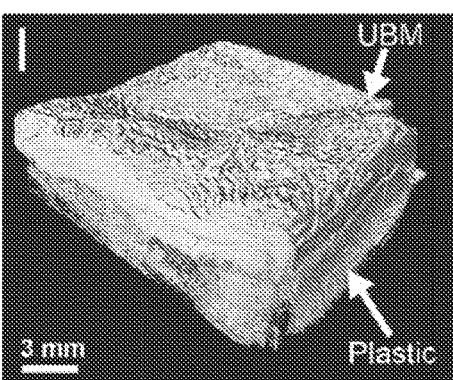
FIG. 14I illustrates an imaging volume captured with tile-scan optical coherence tomography (OCT) shows the patch and the plastic wound model.
Figure 14J:
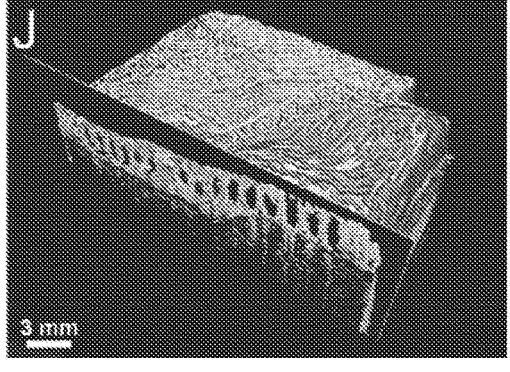
FIG. 14J illustrates a cross section cut of the OCT image volume showing the interior of the ECM wound patch.
Figure 14K:
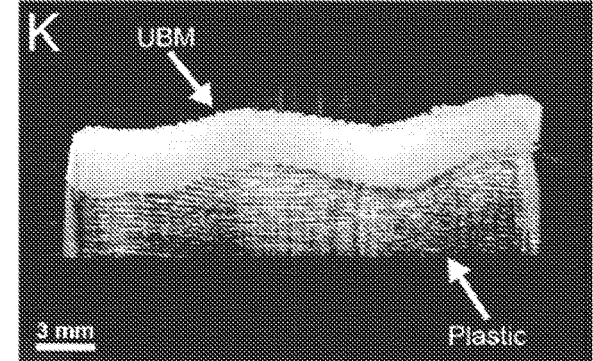
FIG. 14K illustrates a side view of the OCT image volume shows that the ECM patch is conformal with the wound model.

In addition to imaging constructs that can fit within the field of view of the OCT we can image larger constructs by using a motorized stage and a tiled image capture sequence with post-capture image stitching. An example of this can be seen in FIGS. 14A-14K. 3D models of a wound were created and a wound-filling scaffold was generated. The wound itself was printed in practice as illustrated in FIG. 14G while the wound-filling scaffold is printed in an extracellular matrix hydrogel as illustrated in FIG. 14H. To show that the wound-filling scaffold fits into the wound and is conformal with its surface they were imaged together using OCT. The assembly is 24 mm×24 mm, which is larger than the 15 mm×15 mm field of view of the usual objective used on the OCT. Therefore, to image this assembly 4 separate image volumes were captured in a staggered, zig zag manner, which enables combination of them later in post-processing. This enables building of a 3D image of the wound-filling scaffold and wound model. Internal features of the wound-filling scaffold are also illustrated in FIG. 2J. Using this imaging it can be observed that the wound-filling scaffold is conformal with the wound model as illustrated in FIG. 2K.

Example 7

The support bath can be barely translucent and scattering as illustrated in FIG. 15A and the gelatin microparticles can obscure the embedded objects printed within it. By creating the FRESH support material and incorporating different densities of commercially available polysucrose solutions (Sigma-Aldrich, St. Louis, MA, USA), the support bath was optically cleared.

Several densities of polysucrose solutions were tested and a 1.105 g/ml density solution was selected based on absorption spectra, showing that the cleared FRESH support material has reduced adsorption over the entire visible light range and extending into the infrared range of our OCT system as illustrated in FIG. 15B. To better understand the decrease in absorption, the index of refraction of the polysucrose solutions was measured to determine the optimal index of refraction that improves clarity. A dilution series of polysucrose solutions were prepared and the index of refraction was measured using a refractometer as illustrated in FIG. 15C. The index of refraction decreased linearly with increasing polysucrose concentration. Though the clarity of the support increased with higher concentrations of Ficoll the ability to compact it sufficiently for use during printing may be compromised beyond 220 g/L.

Figure 15E:
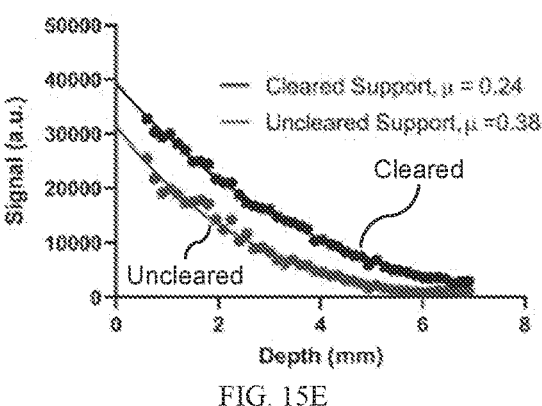
FIG. 15E illustrates a graph showing quantification of the OCT signal penetration depth showing that the cleared support has a higher signal at all depths.

To quantify the improvements in image quality that can be achieved using clear support material we developed a dish with a slanted bottom that allowed for imaging through thicker and thicker layers of support as illustrated in FIG. 15D. Using this dish, the plain support material and 200 g/l Ficoll cleared support material were imaged. There was a visible improvement in the resolved depth and feature clarity in the cleared versus uncleared. To quantify these improvements, intensity at increasing depths was measured in both images. Both signals decrease exponentially, but the intensity in cleared support is statistically significantly greater at all depths (P<0.0001) and attenuates more slowly (exponential attenuation constant −0.24 vs −0.38 for plain support) as illustrated in FIG. 15E. This demonstrates that the transparent support material offers a large improvement over the uncleared for OCT imaging To increase the depth at which the OCT can image the transparent gelatin microparticle support was printed in discrete shallow layers. Typically, constructs are printed in a dish that is filled with the gelatin microparticle support prior to printing. In this case the thickness that must be imaged through is greater at the beginning of the print and less at the end of the print. Furthermore, the image intensity will decrease exponentially as shown in FIG. 15E. A strategy for overcoming these limitations is to decrease the thickness of support material that must be penetrated to acquire an image of the printed object. In order to achieve this, the support material was printed as needed. This worked very similarly to printing any other bioinks, except that the goal is to fill the print dish (e.g., material deposition region).

To print a collagen object using this process support material can be laid down and several layers of our actual collagen print can be printed and then repeat the process. This presents some challenges with Simplify3D, as it was designed for plastic printing. During plastic printing it is challenging, if not impossible, to print one object within another that has already been printed. In this case the plastic extruder would collide with the already printed object. In the case of FRESH, however, the needle of the syringe pump extruding collagen is always within the support bath and can move in and out of it. To overcome the software limitation, a custom MATLAB G-code was written. This code effectively implemented the step-by-step process described herein. It allows the user to select the thickness lapse of the support material being printed into a container. It also allows the user to choose how many layers of the collagen print will be printed after a new layer of support is deposited; together these determine the amount of shear stress shieling shielding between the gelatin needle and the printed object and the thickness of the support material that must be imaged through. The script can also be set up to move the OCT to center on the print dish, focus on the printed collagen, and pause for image acquisition.

In order to implement the in-process OCT imaging, a way to move the OCT into the proper position in between print layers was developed. This proceeds similarly to printing the gelatin support alone, however after the last layer of collagen is printed and prior to a new layer of support being deposited the OCT printer pauses and moves the OCT scanhead to the correct X, Y, and Z locations (based on prior tool offsets, focal length, and print geometry as calculated by a Matlab script). At this point the user can utilize the OCT system's software to capture an image of the printed construct. Utilizing this process multiple images are acquired throughout the print process (at a user determined increment of collagen layers). These images are high signal to noise due to the thinner layer of clear support, but also due to the fact that the OCT's gaussian focal plane is always focused on the most recently printed collagen layers. Once the print is completed the in focus image stacks were concatenated to produce a compiled image of the complete collagen object that is in focus everywhere, similar to focal stacking in photography. This allows for creation of an image that has equivalent signal to noise throughout its depth, as opposed to the exponential decay seen when a single OCT volume is acquired after the print process is complete.

Figure 16A:
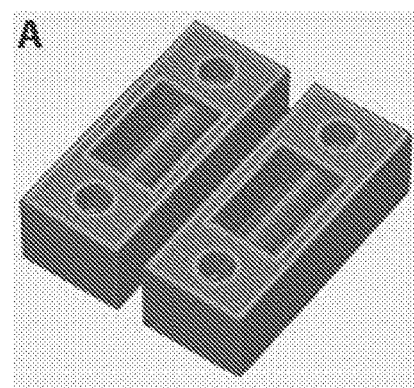
FIG. 16A is an external isometric view of two microfluidic models with single 400 micron I. D. tubes that does not reveal the internal defect in the right model.
Figure 16B:
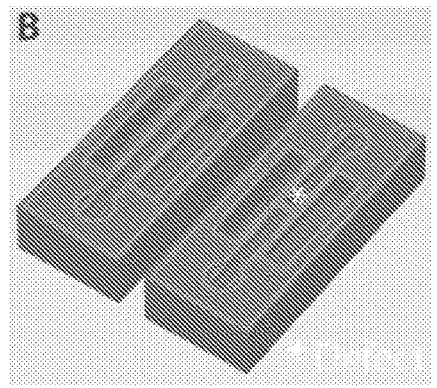
FIG. 16B is a cut section of the same models that reveals the defect
Figure 16C:
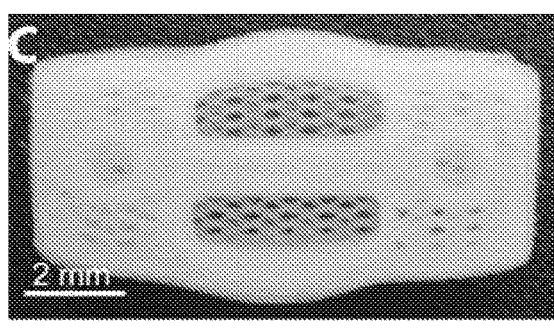
FIG. 16C is a defect-free tube model is printed in collagen type I.
Figure 16D:
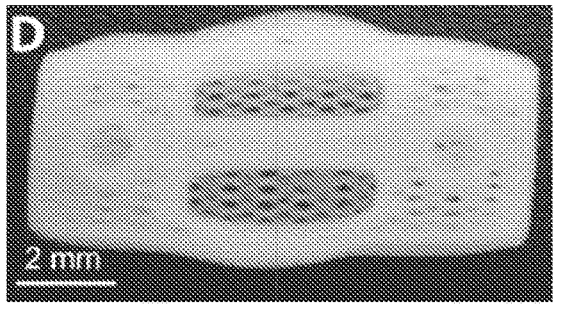
FIG. 16D is a defect tube model printed in collagen type I.
Figure 16E:
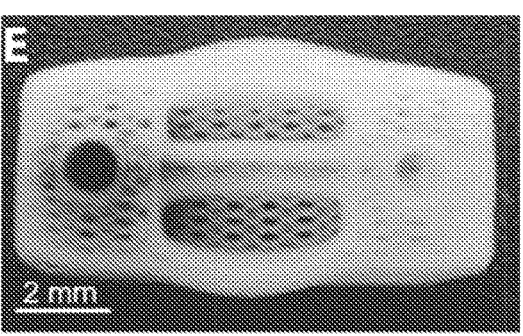
FIG. 16E illustrates a defect-free model with dye perfused through the model.

Using this approach, two model perfusion tubes were designed to detect an intentional occlusion within one of the models as illustrated in FIG. 16A and FIG. 16B. The perfusion tubes with an inner diameter of 400 μm were FRESH printed from collagen as illustrated in FIG. 16C and FIG. 16D. Blue dye was pertused to show that one model was patent as illustrated in FIG. 16E and that the other was occluded as illustrated in FIG. 16F. In-process OCT imaging was performed revealing an open tube lumen as illustrated in FIG. 16G and a central tube defect as illustrated in FIG. 16H. The results demonstrate the ability to print small micron scale features and to detect errors within a print during the printing process using the integrated OCT platform. With postprocessing of these image stacks, such as average intensity projection, an automated defect detection could be used to differentiate an open lumen as illustrated in FIG. 17A from a blocked lumen as illustrated in FIG. 17B during the print process.

Any patent, publication, or other disclosure material identified herein is incorporated herein by reference in its entirety unless otherwise indicated but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussions are intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

38

What is claimed is:

1. An additive manufacturing method comprising:
depositing, by a nozzle, a structure material into a support material based on a first computer model of an object, thereby forming a first portion of the object in the support material, wherein the support material comprises a hydrogel comprising particles in a diluent, wherein the diluent comprises a first index of refraction, wherein the particles comprise a second index of refraction, and wherein the difference between the first index of refraction and the second index of refraction is no greater than 0.05;
obtaining, by a detector, first image data of at least the first portion of the object;
comparing, by a processor, the first image data to the first computer model; and
repeating, by the nozzle, the depositing of the structure material as necessary to additively form the object.

2. The method of claim 1, wherein obtaining the first image data is performed during depositing of the structure material, after depositing the structure material, or a combination thereof.

3. The method of claim 1, further comprising obtaining image data a plurality of times at different stages of the depositing of the structure material, including obtaining, by the detector, a second image data of at least a second portion of the object after depositing, by the nozzle, additional structure material into the support material based on the computer model of the object, thereby forming the second portion of the object.

4. The method of claim 3, further comprising combining the first image data and the second image data to create a second computer model of the object.

5. The method of claim 1, further comprising, based on the comparing the first image data to the first computer model, modifying the first computer model, modifying a print parameter, modifying machine path instructions for an additive manufacturing machine that comprises the nozzle, aborting the additive formation of the object, indicating a discrepancy between the structure material and the computer model, indicating validation of a shape of the structure material, or a combination thereof.

6. The method of claim 5, wherein the print parameter comprises a flow rate of the structure material through the nozzle, a structure material removal instruction, an alignment parameter, a cell deposition parameter, a direction of extrusion, an infill parameter, a translation rate of the nozzle, a layer height, a direction of translation of the nozzle, a print pattern, a cure parameter, or a combination thereof.

7. The method of claim 1, further comprising
creating machine path instructions for the first computer model, wherein depositing the structure material into the support material is based on the machine path instructions for the first computer model; and
modifying the machine path instructions in response to comparing the first image data to the first computer model.

8. The method of claim 1, wherein obtaining the first image data comprises scanning the portion of the object with a light-based camera scan, a brightfield microscope scan, a fluorescence microscope scan, computerized tomography (CT) scan, a magnetic resonance imaging (MRI) scan, an optical coherence tomography (OCT) scan, a laser scan, an ultrasound scan, or a combination thereof.

9. The method of claim 1, further comprising curing the structure material after depositing.

10. The method of claim 1, wherein the structure material comprises a polymer and the polymer comprises a hydrogel, a thermoset polymer, thermoplastic polymer, or a combination thereof.

11. The method of claim 10, wherein the polymer comprises a collagen material, an alginate material, a decellularized extracellular matrix material, a fibrinogen material, a fibrin material, a hyaluronic acid material, a protein material, a polysaccharide hydrogel material, a synthetic gel material, an elastomeric polymer material, a rigid polymer material, a Matrigel, or a combination thereof.

12. The method of claim 1, wherein the structure material comprises a fluid that transitions to a solid or semi-solid state after deposition.

13. The method of claim 1, wherein:
the support material comprises a thermoreversible material; and
the method further comprising removing the support material by heating the support material to a threshold temperature at which the support material transitions from a solid or semi-solid state to a liquid state.

14. The method of any of claim 1, wherein the support material comprises a hydrogel comprising gelatin microparticles in a diluent.

15. The method of claim 1, wherein the support material is configured to physically support the structure material during deposition of the structure material and the support material is stationary at an applied stress level below a threshold shear stress level and flows at an applied shear stress level at or above the threshold shear stress level.

16. The method of claim 1, wherein the particles comprise gelatin and the diluent is aqueous.

17. The method of claim 1, wherein the diluent comprises polysucrose, ficoll, iodixanol, or a combination thereof.

18. The method of claim 17, wherein the diluent comprises polysucrose in a range of 0.5 grams (g)/milliliter (ml) to 2 g/ml based on the total volume of the diluent, ficoll in a range of 100 grams (g)/liter to 250 g/liter based on the total volume of the diluent, iodixanol in a range of 5% to 60% by volume based on the total volume of the diluent, or a combination thereof.

19. The method of claim 1, wherein the particles comprise gelatin and the diluent is non-aqueous.

20. The method of claim 1, wherein the structure material comprises an index of refraction, wherein the support material comprises an index of refraction, and wherein the difference between the index of refraction of the structure material and the index of refraction of the support material is no greater than 0.05.

21. The method of claim 1, wherein the structure material comprises a contrast agent and the contrast agent comprises titanium dioxide, barium sulfate, casein, or a combination thereof.

22. The method of claim 1, wherein the structure material has an index of refraction greater than 0.1 different than an index of refraction of the support material.

23. The method of claim 1, further comprising:
depositing a first layer of the support material into a material deposition region;
depositing the structure material into the first layer of the support material based on the first computer model, thereby forming the first portion of the object; and
depositing a second layer of the support material onto the first layer of the support material in the material deposition region.

24. The method of claim 23, further comprising depositing additional structure material into the second layer of the support material based on the first computer model, thereby forming a second portion of the object.

25. An additive manufacturing system comprising:
an extruder assembly comprising a nozzle, the nozzle configured to deposit, according to a first computer model, structure material into a support material to additively form an object made of the structure material in the support material;
a material deposition region configured to hold the support material; and
a detector connected to the extruder assembly and configured to obtain first image data of the structure material in the material deposition region during the additive formation of the object, wherein the support material comprises a hydrogel comprising particles in a diluent, wherein the diluent comprises a first index of refraction, wherein the particles comprise a second index of refraction, and wherein the difference between the first index of refraction and the second index of refraction is no greater than 0.05.

26. The additive manufacturing system of claim 25, further comprising a processor that is in communication with the extruder assembly and the detector, wherein the processor is programmed to compare the first image data from the detector to the first computer model.

27. The additive manufacturing system of claim 26, wherein the processor is further programmed to control the extruder assembly based on the comparison of the first image data to the first computer model.

28. The additive manufacturing system of claim 26, wherein the processor is programmed to control the detector such that the detector obtains the first image data of at least a first portion of the object during deposition of the structure material, after deposition of the structure material, or a combination thereof.

29. The additive manufacturing system of claim 25, wherein processor is programmed to combine the first image data and a second image data to create a second computer model of the object, wherein the second image data are obtained by the detector at a different time in the additive formation of the object than the first image data.

30. The additive manufacturing system of claim 25, further comprising a processor programmed to modify the first computer model, modify a print parameter of the extruder assembly, modify machine path instructions for the extruder assembly, abort the additive formation of the object, indicate a discrepancy between the structure material and the first computer model, indicate validation of a shape of the structure material, or a combination thereof based on the comparison of the first image data of a first portion of the object to the first computer model.

31. The additive manufacturing system of claim 30, wherein the print parameter comprises a flow rate of the structure material through the first nozzle, a structure material removal instruction, an alignment parameter, a cell deposition parameter, a direction of extrusion, an infill parameter, a translation rate of the first nozzle, a layer height, a direction of translation of the first nozzle, a print pattern, a cure parameter, or a combination thereof.

32. The additive manufacturing system of claim 26, wherein the processor is programmed to:
create machine path instructions for the first computer model, wherein deposition of the structure material into the support material is based on the machine path instructions for the first computer model; and modify the machine path instructions in response to comparison of the first image data to the first computer model.

33. The additive manufacturing system of claim 25, wherein the detector comprises a detector selected from the group consisting of a light-based camera, a brightfield microscope, a fluorescence microscope, a computerized tomography (CT) scanner, a magnetic resonance imaging (MRI) scanner, an optical coherence tomography (OCT) scanner, a laser scanner, and an ultrasound scanner.

34. The additive manufacturing system of claim 25, further comprising a second extruder assembly comprising a second nozzle, the second nozzle configured to deposit, support material into the material deposition region.

35. The additive manufacturing system of claim 34, further comprising a processor programmed to:

control the second nozzle such that the second nozzle deposits a first layer of the support material into the material deposition region;

control the first nozzle such that the first nozzle deposits the structure material into the first layer of the support material based on the first computer model, thereby form a first portion of the object in the first layer of the support material; and control the second nozzle such that the second nozzle deposits a second layer of the support material onto the first layer of the support material in the material deposition region.

36. The additive manufacturing system of claim 35, wherein the processor is further programmed to control the second nozzle such that the second nozzle deposits additional structure material into the second layer of the support material based on the first computer model, thereby forming a second portion of the object in the second layer of the structure material.

37. A product fabricated by the method of claim 1.

38. A support material for additive manufacturing, the support material comprising a hydrogel comprising particles in a diluent, wherein the diluent comprises a first index of refraction, wherein the particles comprise a second index of refraction, and wherein a difference between the first index of refraction and the second index of refraction is no greater than 0.05.

39. The support material of claim 38, wherein the particles comprise gelatin and the diluent is aqueous.

40. The support material of claim 38, wherein the diluent comprises polysucrose, ficoll, iodixanol, or a combination thereof.

41. The support material of claim 38, wherein the particles comprise gelatin and the diluent is non-aqueous.

42. An assembly comprising the support material of claim 38 and a structure material.

43. The assembly of claim 42, wherein the structure material comprises an index of refraction, wherein the support material comprises an index of refraction, and wherein a difference between the index of refraction of the structure material and the index of refraction of the support material is no greater than 0.05.

44. The assembly of claim 42, wherein the structure material has an index of refraction greater than 0.1 different than a index of refraction of the support material.

45. The assembly of claim 42, wherein the structure material comprises a polymer and the polymer comprises a hydrogel, a thermoset polymer, a thermoplastic polymer, or a combination thereof.

46. The assembly of claim 45, wherein the polymer comprises a collagen material, an alginate material, a decelluarized extracellular matrix material, a fibrinogen material, a fibrin material, a hyaluronic acid material, a protein material, a polysaccharide hydrogel material, a synthetic gel material, an elastomeric polymer material, a rigid polymer material, a Matrigel, or a combination thereof.

47. An additive manufacturing method comprising:

depositing, by a nozzle, a structure material into a support material based on a first computer model of an object, thereby forming a first portion of the object in the support material;

obtaining, by a detector, first image data of at least the first portion of the object;

comparing, by a processor, the first image data to the first computer model; and repeating, by the nozzle, the depositing of the structure material as necessary to additively form the object, wherein the support material comprises a hydrogel comprising particles in a diluent, and wherein the diluent comprises polysucrose in a range of 0.5 grams (g)/milliliter (ml) to 2 g/ml based on the total volume of the diluent, ficoll in a range of 100 grams (g)/liter to 250 g/liter based on the total volume of the diluent, iodixanol in a range of 5% to 60% by volume based on the total volume of the diluent, or a combination thereof.

* * * * *